US010029828B2

(12) United States Patent
Savenok

(10) Patent No.: US 10,029,828 B2
(45) Date of Patent: Jul. 24, 2018

(54) CONTAINER LID ASSEMBLY AND INSERT CONSTRUCTIONS

(71) Applicant: Pavel Savenok, Wheaton, IL (US)

(72) Inventor: Pavel Savenok, Wheaton, IL (US)

(*) Notice: Subject to any disclaimer, the term of this patent is extended or adjusted under 35 U.S.C. 154(b) by 25 days.

(21) Appl. No.: 14/838,343

(22) Filed: Aug. 27, 2015

(65) Prior Publication Data
US 2016/0058223 A1 Mar. 3, 2016

Related U.S. Application Data

(60) Provisional application No. 62/042,520, filed on Aug. 27, 2014.

(51) Int. Cl.
| | |
|---|---|
| *A47G 19/22* | (2006.01) |
| *B65D 43/02* | (2006.01) |
| *G01F 11/26* | (2006.01) |
| *B65D 47/26* | (2006.01) |
| *B65D 51/24* | (2006.01) |

(52) U.S. Cl.
CPC ..... *B65D 43/0212* (2013.01); *A47G 19/2272* (2013.01); *B65D 47/265* (2013.01); *B65D 51/24* (2013.01); *G01F 11/262* (2013.01); *B65D 2543/00046* (2013.01); *B65D 2543/0074* (2013.01); *B65D 2543/00092* (2013.01); *B65D 2543/00231* (2013.01); *B65D 2543/00296* (2013.01); *B65D 2543/00351* (2013.01); *B65D 2543/00527* (2013.01); *B65D 2543/00537* (2013.01); *B65D 2543/00638* (2013.01); *B65D 2543/00685* (2013.01); *B65D 2543/00796* (2013.01)

(58) Field of Classification Search
CPC ...... A47G 19/2272; B65D 2543/00231; B65D 2543/0024; B65D 47/265; G01F 11/262; G01F 11/263
USPC ................................................ 220/253, 254.1
See application file for complete search history.

(56) References Cited

U.S. PATENT DOCUMENTS

| | | | | |
|---|---|---|---|---|
| 3,100,589 A | * | 8/1963 | Love, Jr. ............... | B65D 47/265 222/480 |
| 5,036,993 A | * | 8/1991 | Ramsey ............... | B65D 47/265 220/254.3 |

(Continued)

*Primary Examiner* — Anthony Stashick
*Assistant Examiner* — Mollie Impink
(74) *Attorney, Agent, or Firm* — Christopher J. Scott

(57) ABSTRACT

A beverage container lid assembly and insert enable a user to selectively control contained beverage movements when outfitted upon a beverage container. The lid assemblies include a primary lid form having a primary beverage outlet and a circular transverse cross-section and a secondary lid attachment cooperably engaged with the primary lid form for providing certain beverage flow diversion structure. The secondary lid attachment is rotatable relative to the primary lid form about a lid axis of rotation. The lid assembly may be attached to a beverage container such that the user may manually rotate the secondary lid attachment relative to the primary lid form for manually and selectively positioning the beverage flow diversion structure relative to the primary beverage outlet. The container insert includes a container-engaging first portion and a beverage-damping second portion. The second portion extends inwardly relative to the first portion for deflecting upwardly directed beverage.

17 Claims, 54 Drawing Sheets

(56) References Cited

U.S. PATENT DOCUMENTS

| | | | |
|---|---|---|---|
| 5,294,014 A * | 3/1994 | Wyatt | B65D 47/265 |
| | | | 220/253 |
| 5,873,493 A | 2/1999 | Robinson | |
| 6,176,390 B1 | 1/2001 | Kemp | |
| 6,488,173 B2 | 12/2002 | Milan | |
| 6,732,895 B2 | 5/2004 | Poliquin et al. | |
| 7,448,510 B2 | 11/2008 | Pavlopoulos | |
| 8,528,768 B2 | 9/2013 | D'Amato | |
| 2003/0089713 A1 * | 5/2003 | Belt | B65D 47/265 |
| | | | 220/253 |
| 2007/0062943 A1 | 3/2007 | Bosworth | |
| 2010/0264150 A1 | 10/2010 | Leon | |
| 2010/0320220 A1 | 12/2010 | Hussey | |
| 2012/0205384 A1 | 8/2012 | Savenok | |
| 2013/0256394 A1 | 10/2013 | Moutty | |
| 2015/0090730 A1 | 4/2015 | Savenok | |
| 2015/0144646 A1 | 5/2015 | Savenok | |
| 2016/0058223 A1 | 3/2016 | Savenok | |

\* cited by examiner

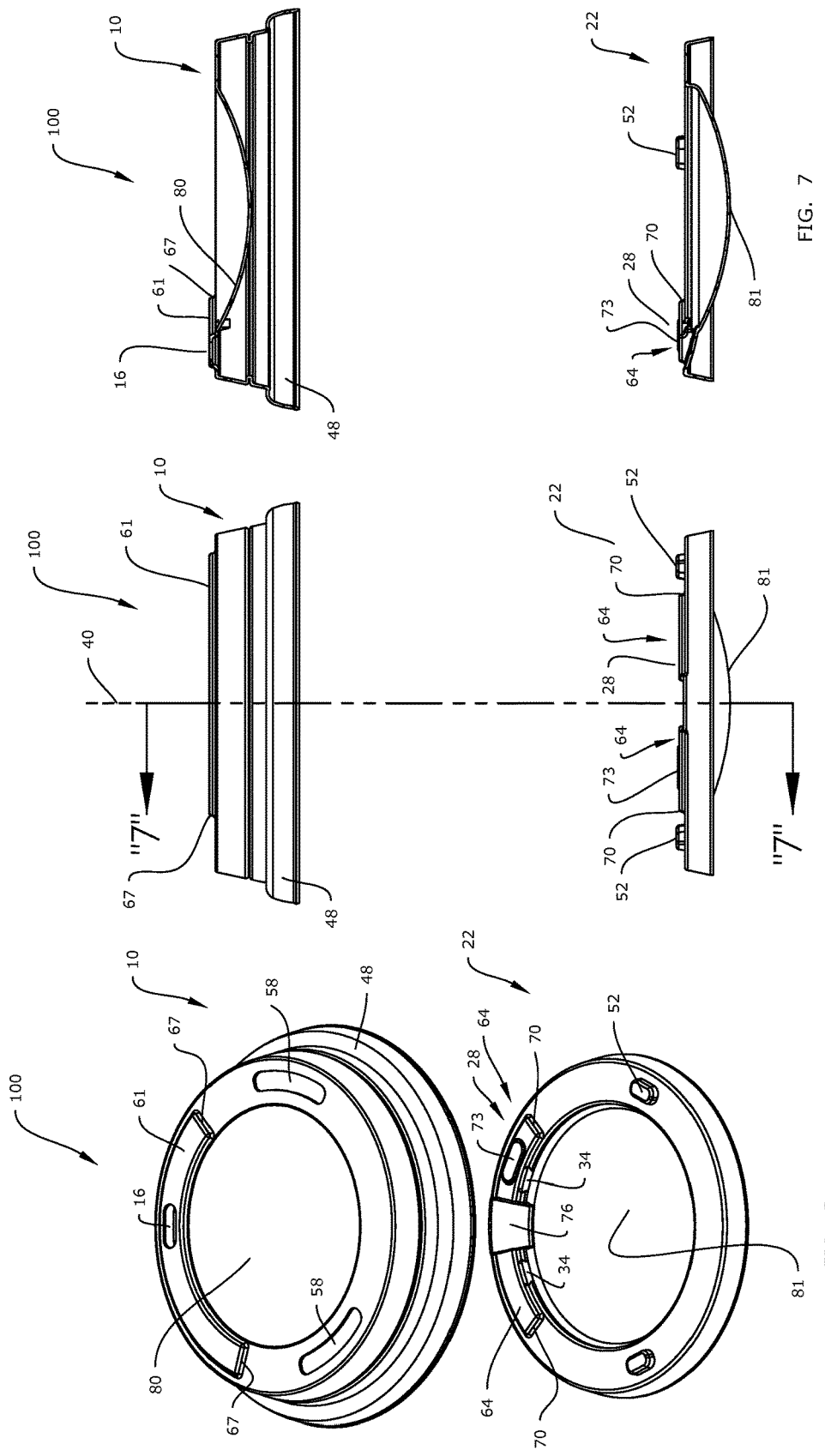

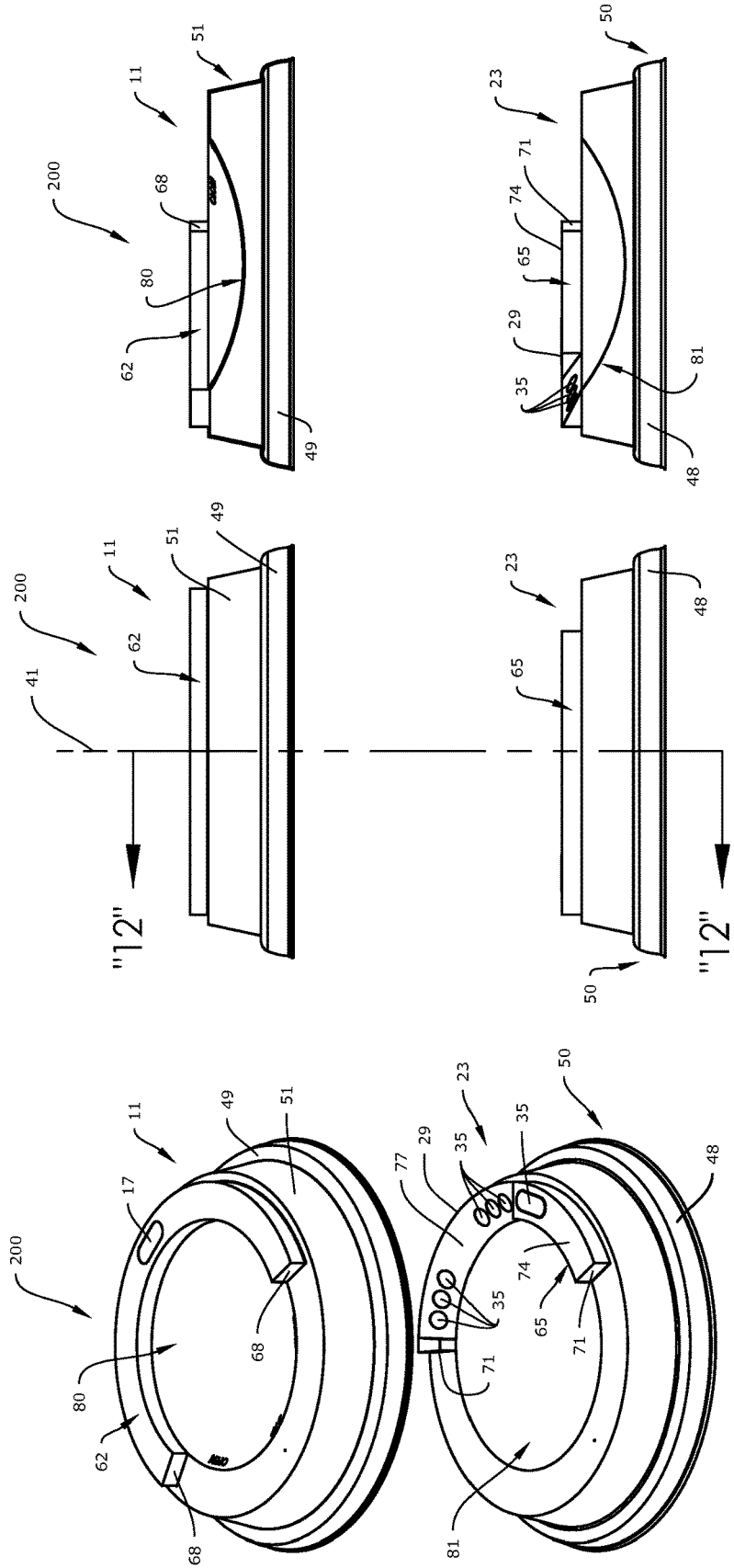

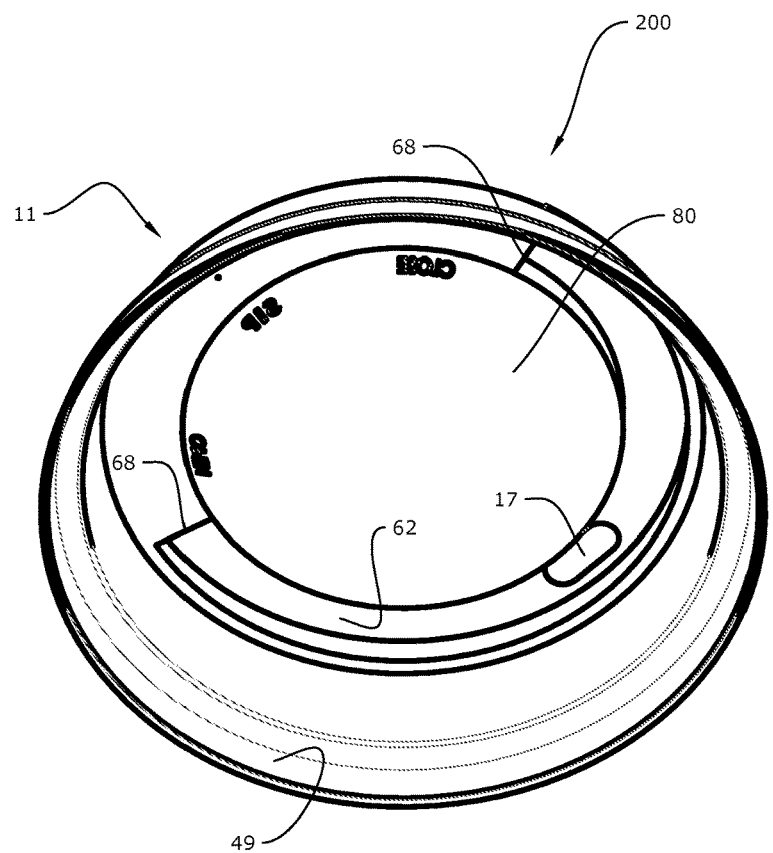
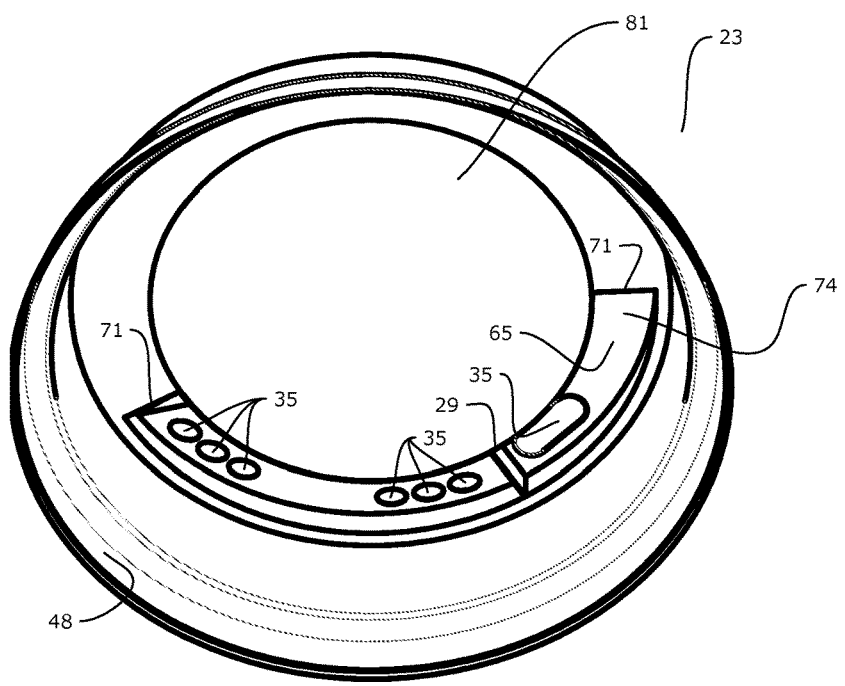
FIG. 14

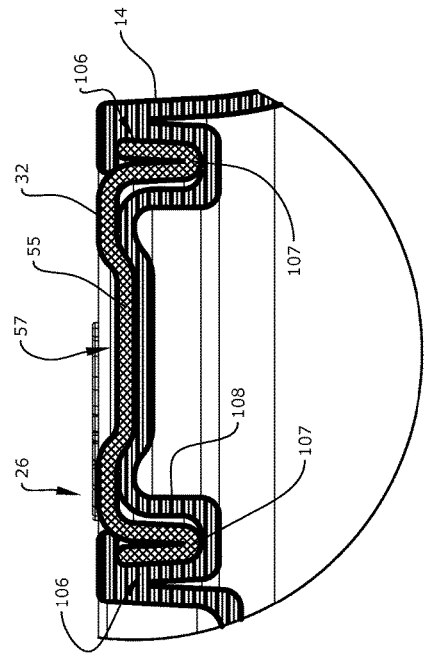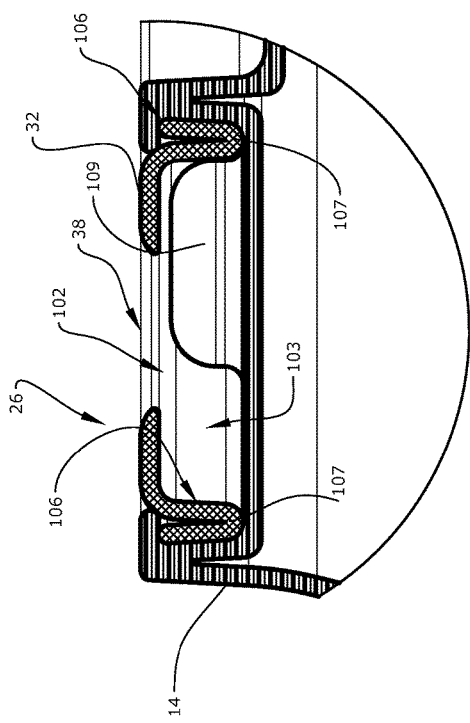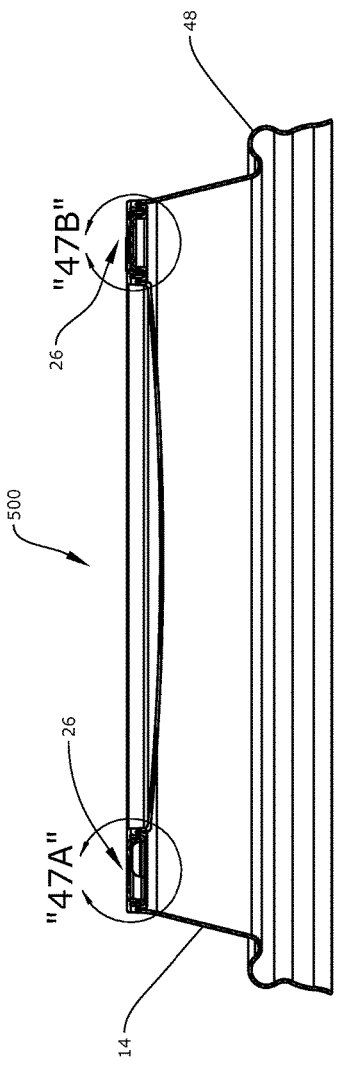
FIG. 47A
FIG. 47B
FIG. 47

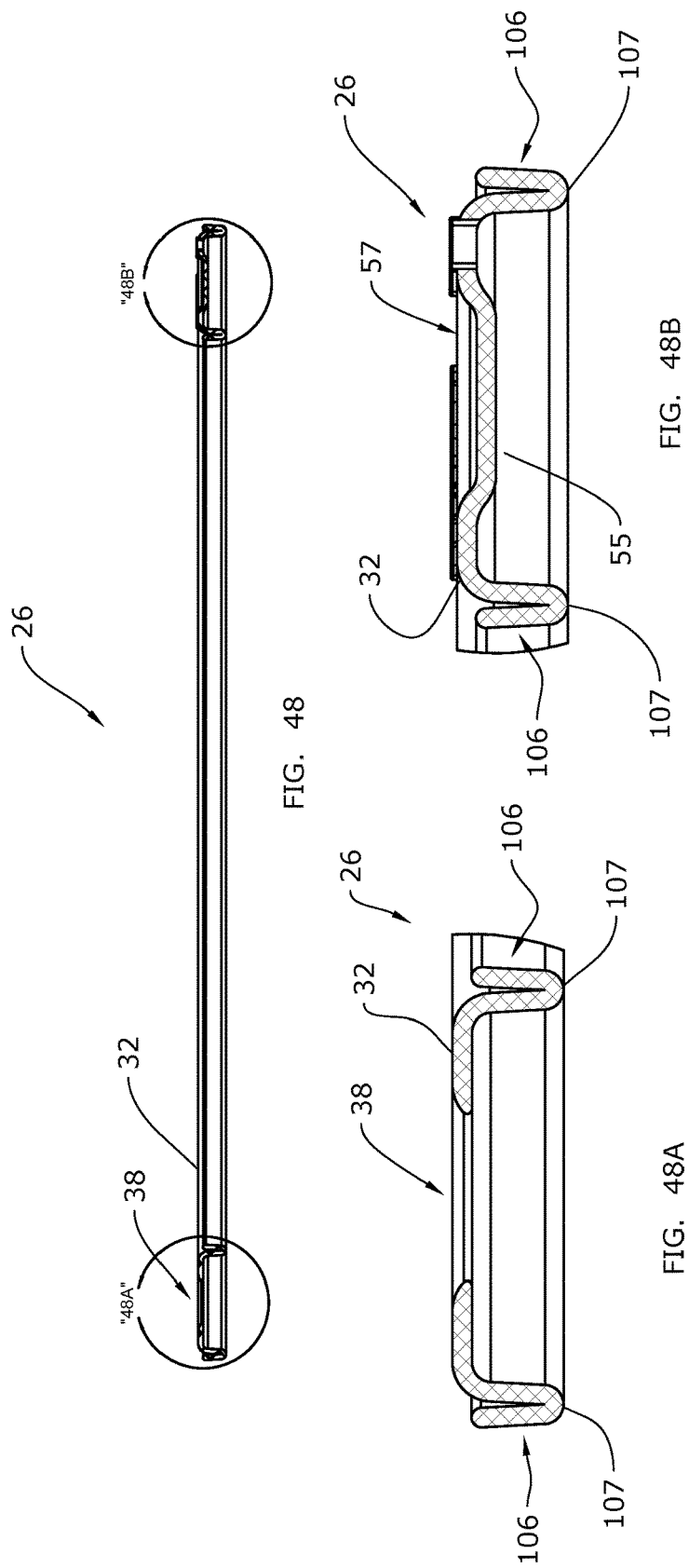

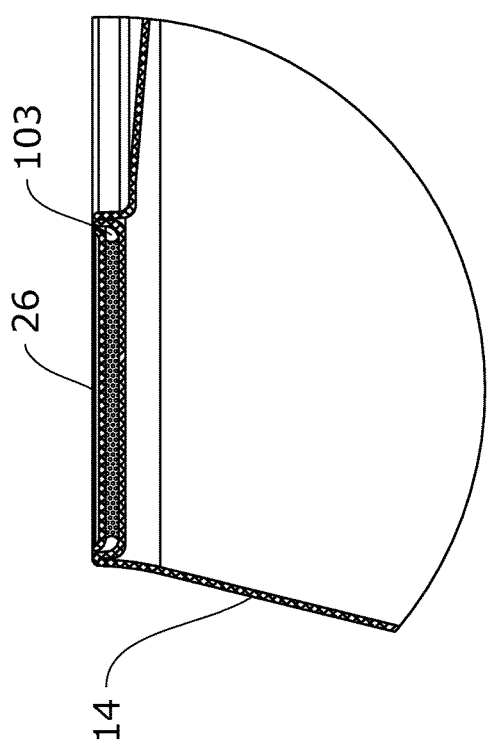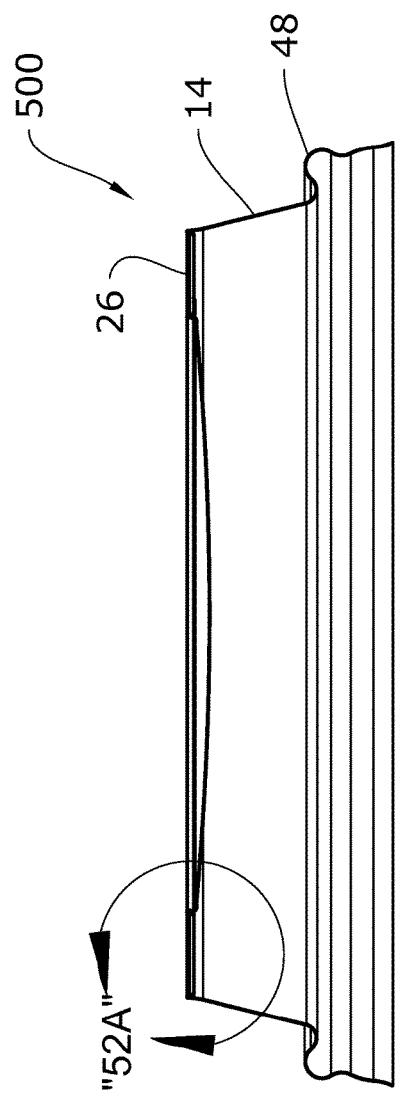

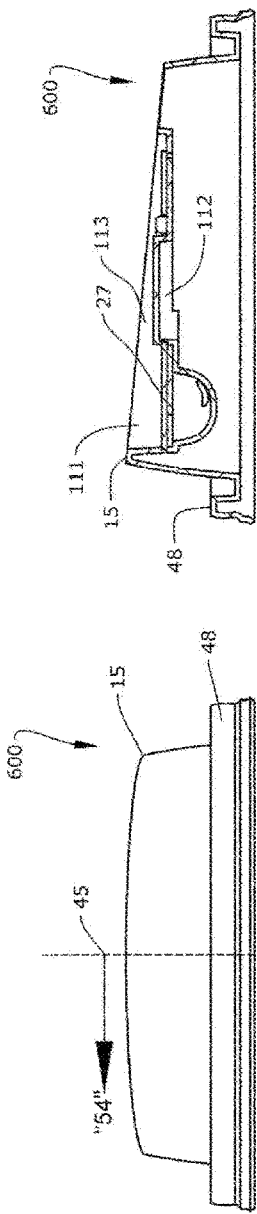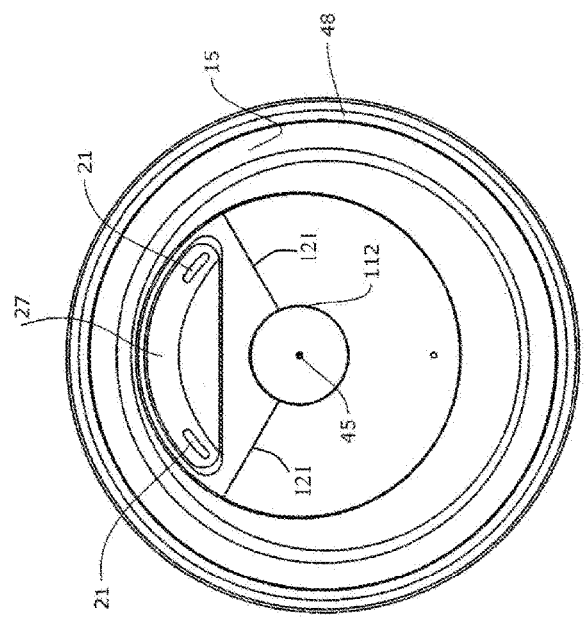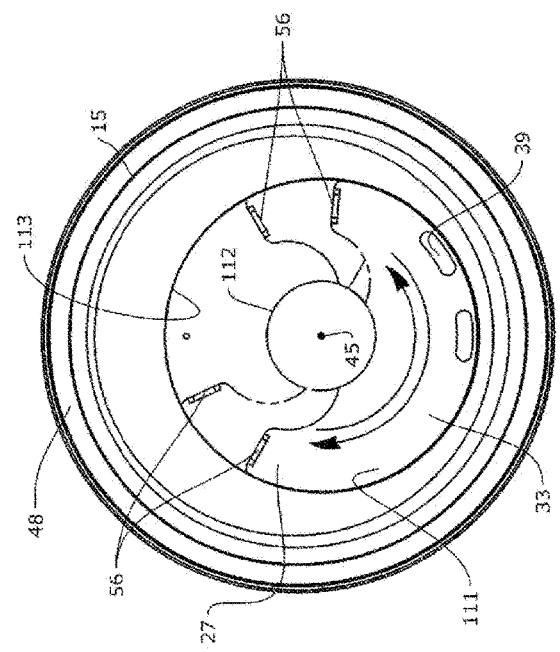

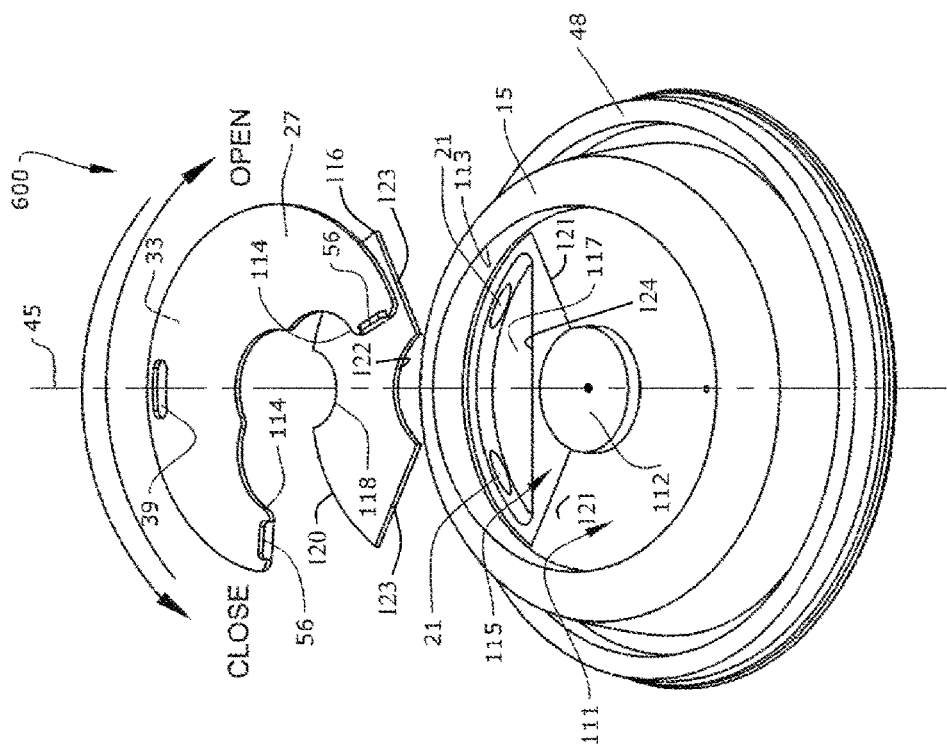
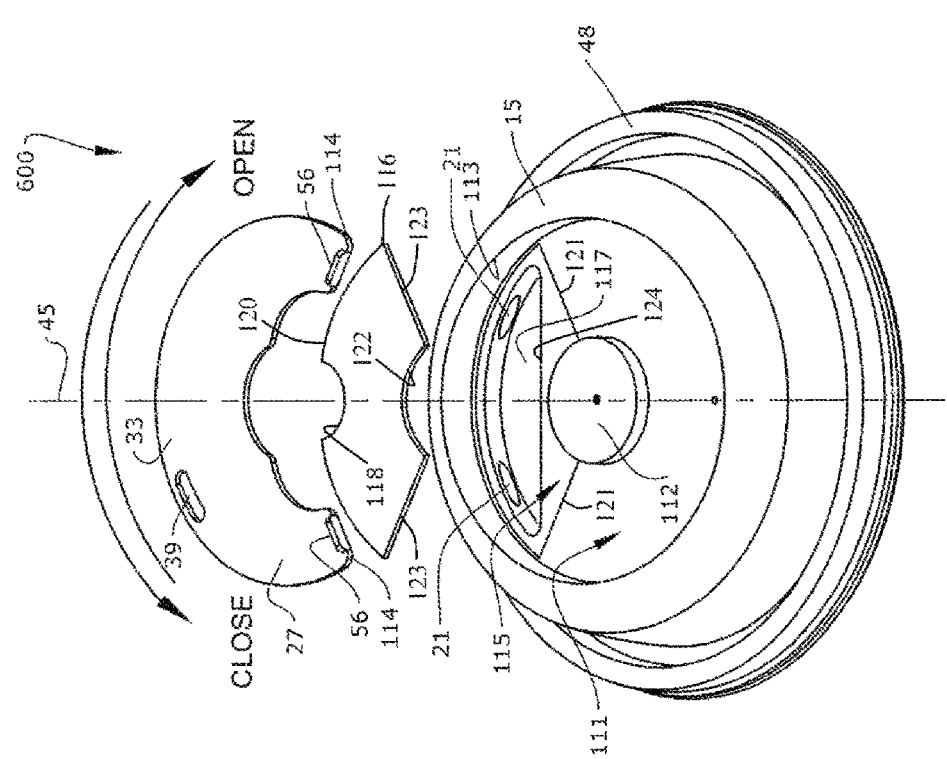

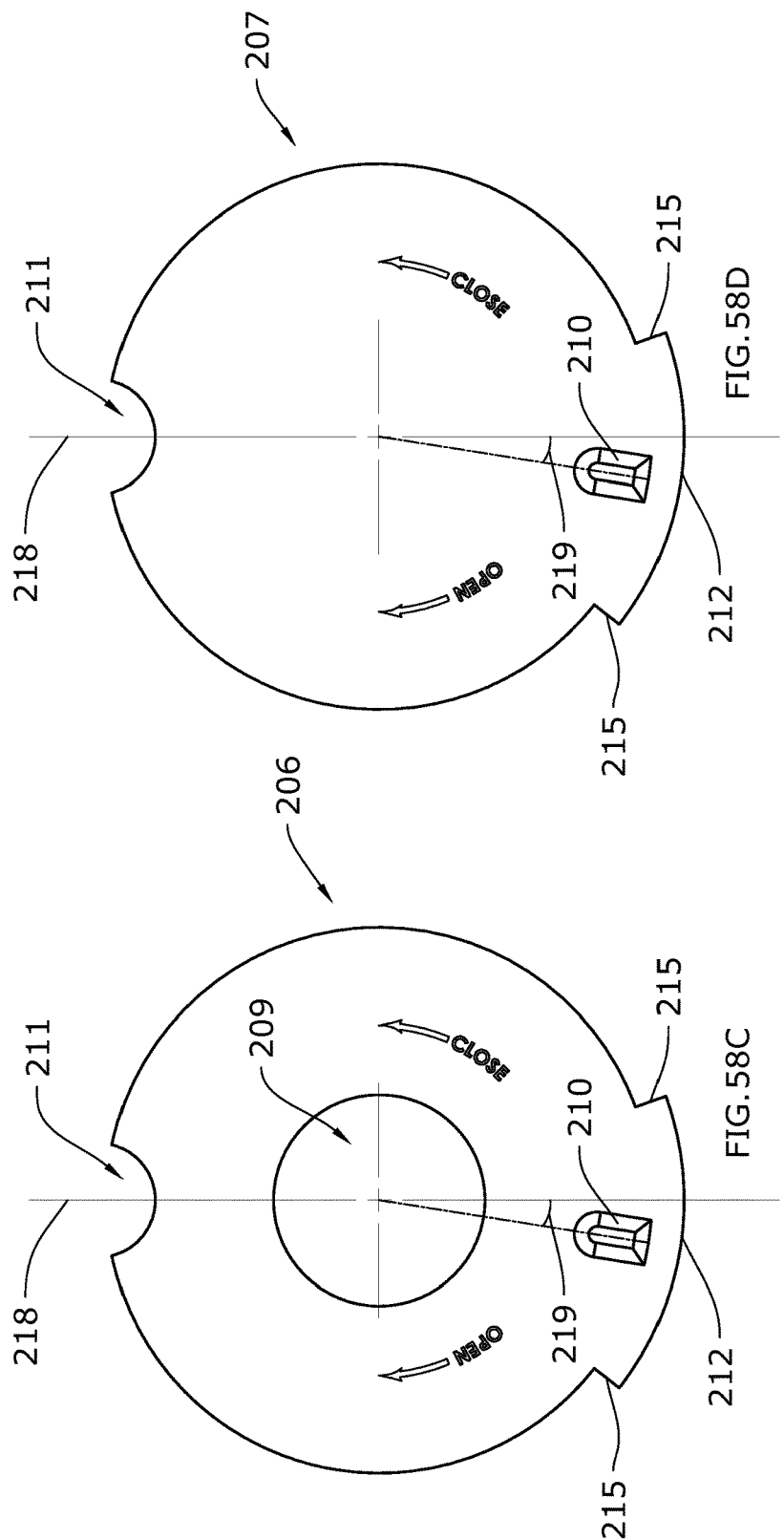

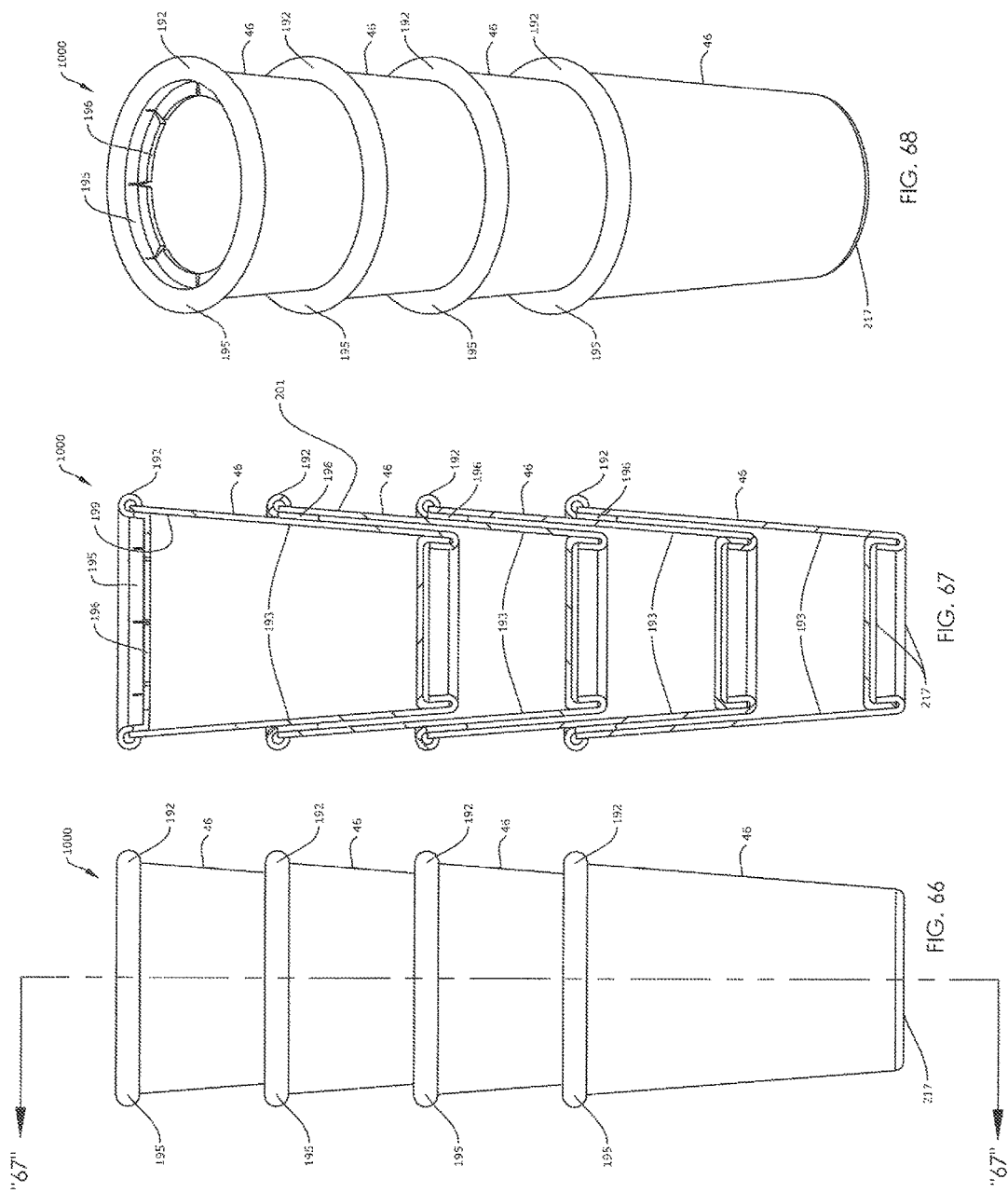

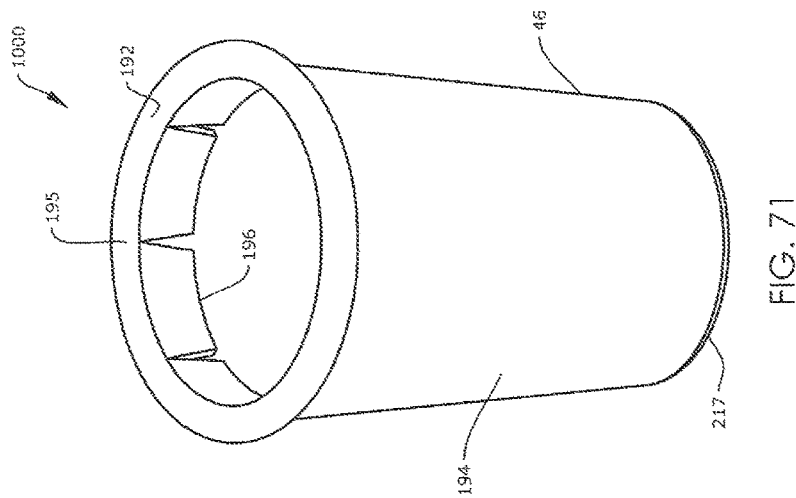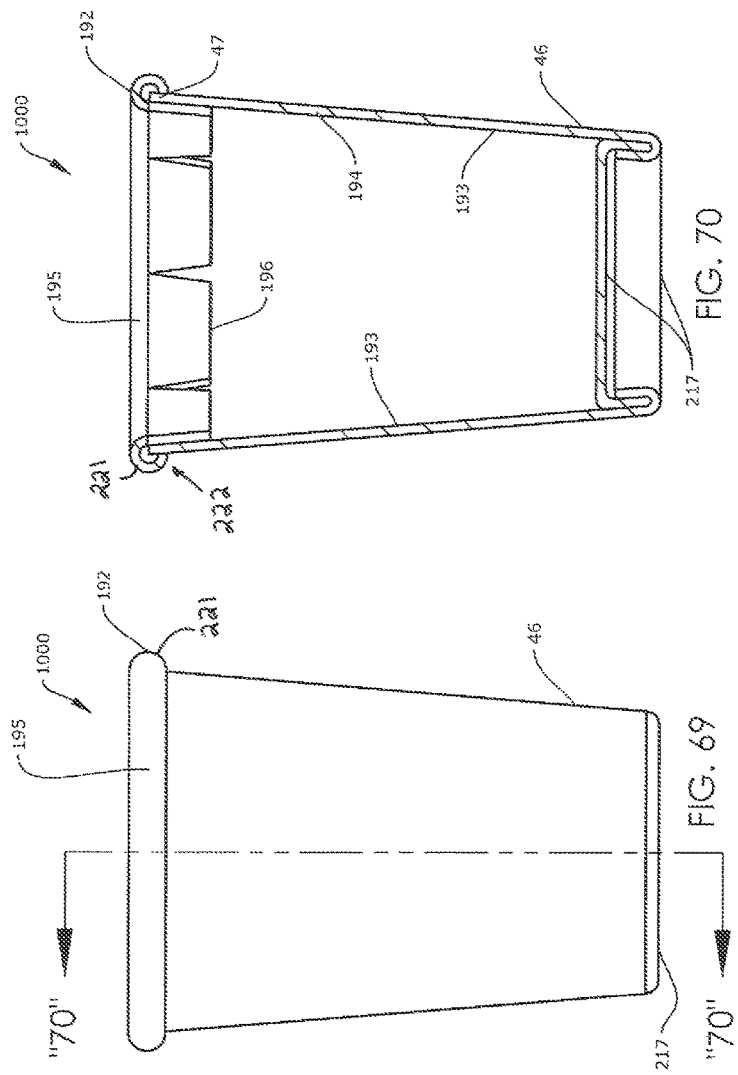

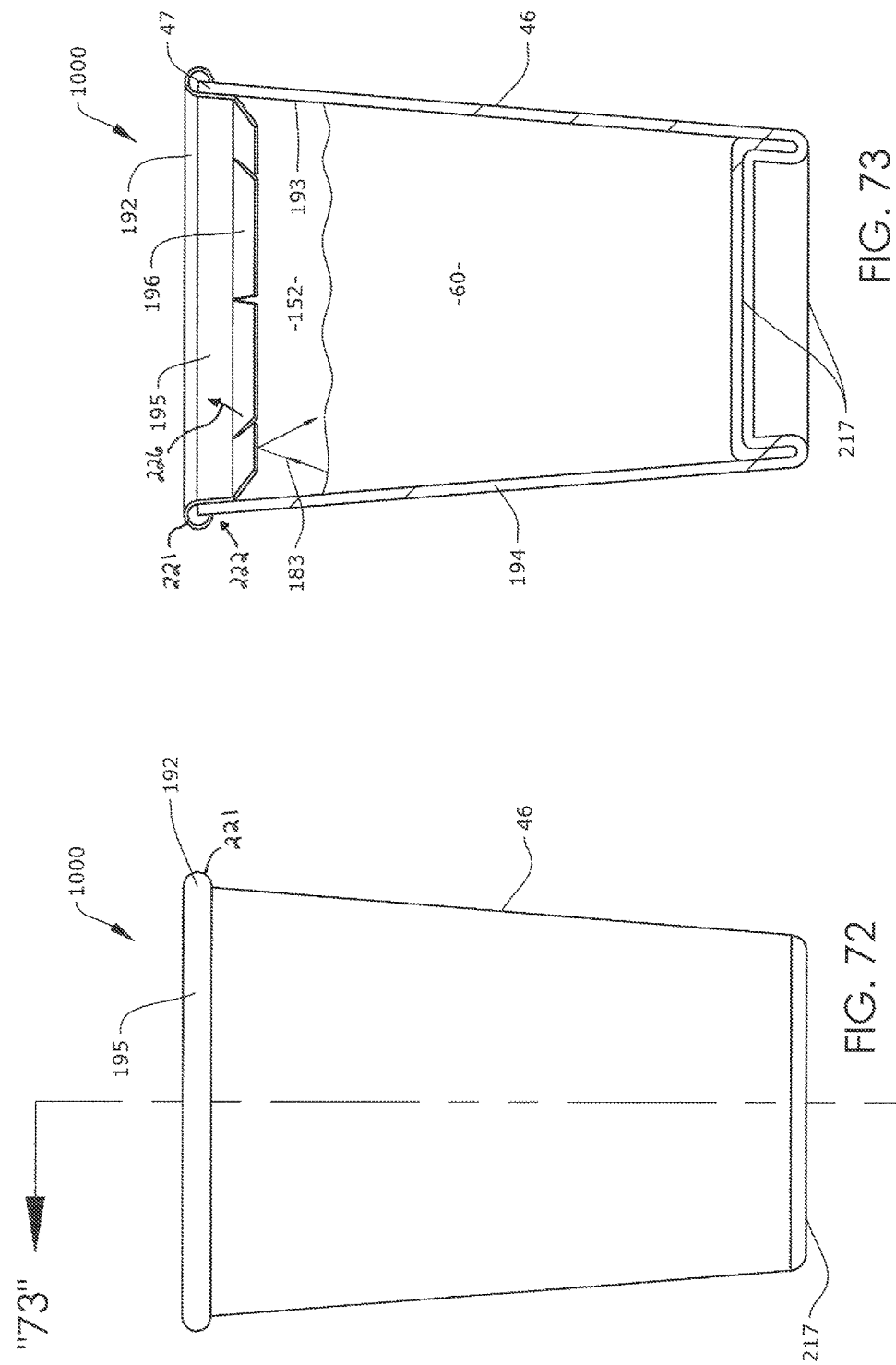

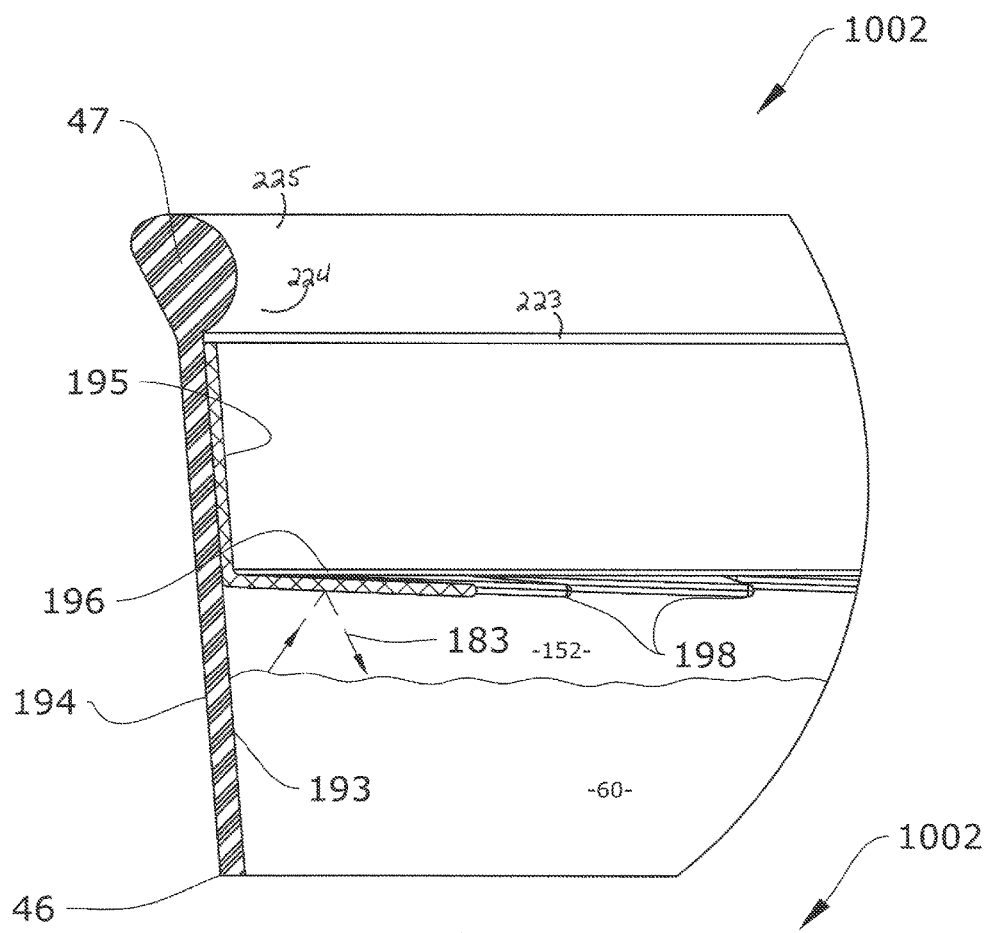
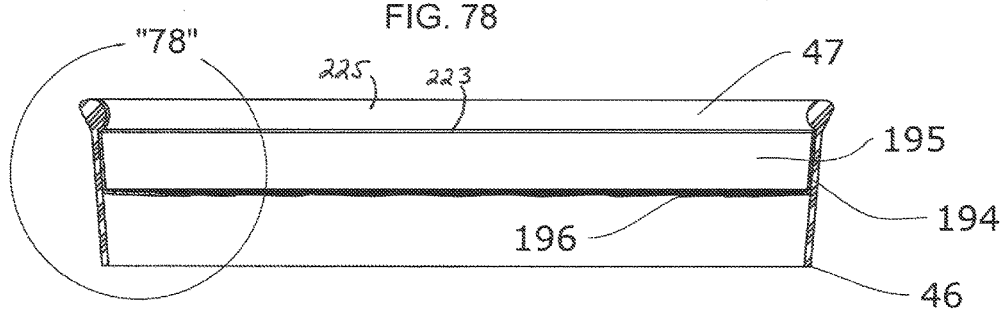

CONTAINER LID ASSEMBLY AND INSERT CONSTRUCTIONS

PRIOR HISTORY

This application claims the benefit of or priority to (1) U.S. Provisional Patent Application No. 62/042,520 filed in the United States Patent and Trademark Office (USPTO) on 27 Aug. 2014 and (2) U.S. patent application Ser. No. 14/547,287 filed in the USPTO on 19 Nov. 2014.

BACKGROUND OF THE INVENTION

Field of the Invention

The present invention relates generally to a lid construction or assembly for outfitting a hot beverage container. More particularly, the present invention relates to a combination lid-insert construction or assembly for outfitting a hot beverage container for enabling the drinker to selectively transfer heat from a hot beverage prior to consumption, controlling beverage movements from a lid-outfitted beverage container and preventing spillage of beverage from such an outfitted beverage container.

Brief Description of the Prior Art

The broad field of lids for hot beverage containers and hot beverage container assemblies inclusive of lids is exceedingly well-developed. The art relating to means for cooling hot beverages prior to consumption by way of a lid construction or assembly is a bit more limited. In any case, it is most difficult to pinpoint with precision the most pertinent art relevant to the present invention given the wide swath of art swept by beverage container constructions and developments in the field of art generally. Nevertheless, some of the more pertinent prior is believed to be briefly described hereinafter.

U.S. Pat. No. 5,873,493 ('493 patent), which issued to Robinson, for example, discloses an Integrally Molded Measurer Dispenser. The '493 patent describes a closure providing a side wall having first and second distal ends, an inner surface and an outer perimeter. A cone-shaped divider projects inwardly and upwardly from a lower perimeter of the side wall and includes a drain-back orifice therethrough. The cone-shaped divider further includes an apex having an opening therethrough. The closure further provides a lid pivotally attached at an outer diameter thereof to the outer perimeter of the side wall first distal end by an integral hinge. The lid includes a shaped substantially conforming to the side wall perimeter.

U.S. Pat. No. 6,176,390 ('390 patent), which issued to Kemp, discloses a Container Lid with Cooling Reservoir. The '390 patent describes a container lid with a cooling reservoir for releasably covering a disposable cup containing a hot beverage. The cooling reservoir includes a side wall with a small opening to allow a small volume of the hot beverage to pass into the cooling reservoir in which the beverage sufficiently cools down to enable the consumer to sip the beverage.

U.S. Pat. No. 6,488,173 ('173 patent), issued to Milan, discloses a Beverage container lid having baffle arrangement for liquid cooling. The '173 patent describes a removable beverage container lid wherein the lid has a substantially enclosed space defined between an exterior cover and an interior cover. At least one inlet opening is formed in the interior cover directing a hot beverage to flow into the substantially enclosed space. Attached to the interior cover at the forward edge of the inlet opening is a partition or wall assembly having a height extending to be located substantially against the exterior cover and a length at least equal to the length of the inlet opening. Between the partition or wall assembly and the peripheral edge of the exterior cover is located a gap area. Connected with the gap area is a dispensing opening formed in the exterior cover. Hot beverage is required to flow around the partition or wall assembly and into the gap area prior to flowing through the dispensing opening exteriorly of a beverage container.

U.S. Pat. No. 6,732,895 ('895 patent), issued to Smith et al., discloses a Reclosable Container Lid. The '895 patent describes a reclosable lid for a beverage container comprising a first piece or cover, and a movable second piece or disk. The cover has a top wall, a side wall and a mounting portion for connecting the lid on the container. The cover has an opening adapted to permit the flow of the substance through the lid. The cover further includes a slot located in the top wall. The disk has at least one aperture, a post, and a projection.

The aperture and the projection are each cooperatively dimensioned with the opening. The post is adapted to be received by the slot in the cover. The disk is movable between a first position wherein at least a portion of the projection is received in the opening in the first position, and a second position wherein the aperture is aligned with the opening in the second position. A support ledge and a support edge on an inner surface of the cover are adapted to provide rotatable support to the disk.

U.S. Pat. No. 7,448,510 ('510 patent), which issued to Pavlopoulos, discloses a Cup Assembly having a Cooling Compartment. The '510 patent describes a cup assembly comprising a cup and a lid to define therebetween a first passage and a second passage to allow a liquid cooling compartment between the lid and the cup to be filled with liquid contained in the cup when the first passage is clear and the second passage is blocked and the liquid in the liquid cooling compartment is able to flow out of an outlet in communication with the liquid cooling compartment when the second passage is clear and the first passage is blocked.

U.S. Pat. No. 8,528,768 ('768 patent), issued to D'Amato, discloses a Reclosable Lid for a Container. The '768 patent describes a lid for a paper cup type container. The lid is detachably mountable onto the edge of an opening of the container. The lid comprises a lower lid part with an inner outlet opening, and an upper lid part with an outer outlet opening. In an assembled position, the upper lid part is mounted rotatable relative to the lower lid part between at least two positions, such that the outlet openings are mutually aligned in one position and are without any overlap in the other position. The lower lid part has a circumferential mounting flange for overlapping the opening edge of the container, and the upper lid part has a circumferential mounting flange for overlapping the mounting flange of the lower lid part.

United States Patent Application Publication No. 2007/0062943, authored by Bosworth, Sr., describes a container lid for a cup-type beverage which includes within the lid a disc-shaped media in which the lid is adapted to be releasably affixed to the beverage container and where the lid is protected from the beverage within the container and wherein the disc may be removed from the lid and utilized for entertainment purposes.

United States Patent Application Publication No. 2010/0264150, authored by Leon et al., describes a disposable beverage cup a disposable beverage cup that comprises a ledge between the cup's rim and the grasping portion of the cup that is commonly held in the user's hand. The ledge, which comprises a curb, a horizontal plane, and one or more indentations, acts as a barrier between the user's hand and other objects, preventing a lid that has been press fit onto the cup's rim from being dislodged. In order to remove the lid, the user must insert a finger and/or thumb into the indentation(s) and press upward on the lid. The cup has a contour between the ledge and the grasping portion with ergonomic features to increase the user's comfort in handling the cup.

United States Patent Application Publication No. 2010/0320220, which was authored by Hussey et al., describes a plastic lid for a drinks container, for example, a coffee cup. The plastic lid is provided with an ancillary access facility in the form of an opening or a part of the lid easily removable to form an opening. The ancillary access facility allows a person to drink from the container without removal of the lid. After the ancillary access facility has been cleaned or de-contaminated it is protected by the application of a protective cover.

The protective cover may have a variety of shapes, for example, it may cover the entire lid or it may cover only a selected part of the lid, for example, only the area of the lid involving the ancillary access facility. The protective cover protects the ancillary access facility from the inadvertent transfer of germs to the drinking area by the person dispensing the drinks as they push the lid down with their hands to seal the lid to the container top. The protective covers are arranged to be easily stripped from the lid by the application of mere finger pressure.

United States Patent Application Publication No. 2013/0256394, authored by Moutty, describes a paper cup comprising a sidewall member having an upper edge, a lower edge, a pair of opposite side edges, a front surface and a back surface. Each of the side edges and the upper edge define upper corners. The side edges are overlapped and are sealed together along an overlapping side seam. A bottom member comprises a peripheral lip sealed to the lower edge of the sidewall member. The Moutty paper cup construction is remarkable in that it further comprises at least one rigid or semi-rigid rim structure attached to the upper edge of the side wall member and in that the paper weight of the bottom member is greater than the paper weight of the sidewall member.

From a consideration of the foregoing, it will be noted that the prior art perceives a need for a low cost lid assembly and/or container insert usable in combination with a hot beverage container so as to enable the user to selectively transfer heat from the hot beverage via the lid elements outfitted upon the container prior to beverage consumption and for preventing spillage of (hot) beverage from the container.

More particularly, the prior art further perceives a need for a beverage container lid assembly or assemblies comprising low cost secondary lid attachments rotatably cooperable with primary lid forms for enabling the user to more effectively control beverage movements through such an assembly. Further, the prior art perceives a need for a beverage container insert that lends overall rigidity to the beverage container while simultaneously providing beverage-damping or beverage-deflecting functionality for the prevention of splashing, for instance, and thus enhancing beverage movement control of the outfitted beverage container as summarized in more detail hereinafter.

SUMMARY OF THE INVENTION

Among the many objectives of this invention is the provision of a number of beverage container lid assemblies or container insert constructions for enabling a user to selectively and/or manually control beverage movement(s) from the stage of beverage containment to beverage consumption. The various lid assembly embodiments attempt to provide a user with an enhanced ability to control beverage movements for the purpose of effecting enhanced heat transfers and spillage prevention. Key categorical embodiments summarized hereinafter include a number of embodiments incorporating manual means for effecting rotation of a secondary lid element relative to a primary lid element and a number of means for damping beverage oscillations or redirecting beverage movements within a beverage container.

To achieve these and other readily identifiable objectives, the present invention provides a number of different embodiments of lid assemblies and container inserts. In certain embodiments, the basic invention may be said to essentially teach or disclose a beverage or liquid container lid assembly for enabling a user to selectively control beverage or liquid movement(s) therethrough.

The beverage or liquid container lid assembly according to the present invention may be said to essentially comprise a primary lid form; a secondary lid attachment rotatable relative to the primary lid form; container attachment means for non-rotatably attaching either the primary lid form or the secondary lid attachment to a beverage or liquid container; and manually operable means for enabling the user to manually rotate the secondary lid attachment relative to the primary lid form.

The primary lid form essentially comprises a primary beverage outlet and the secondary lid attachment essentially comprises at least one beverage flow diversion structure. The secondary lid attachment is cooperably engaged with the primary lid form and provides at least one beverage flow or liquid diversion structure having at least one letting aperture. The secondary lid attachment is rotatable relative to the primary lid form about a lid axis of rotation.

The container attachment means are preferably exemplified by a rim-engaging groove and function to non-rotatably attach a select structure to a beverage or liquid container depending on the particular embodiment in question. Thus, the select structure may be preferably selected from the group consisting of the primary lid form and the secondary lid attachment. Manually operable means operable via outer lid surfacing enable the user to manually locate via rotation of the secondary lid attachment relative to the primary lid form the beverage or liquid diversion structure relative to the primary beverage or liquid outlet.

When the container attachment means non-rotatably attach the secondary lid attachment to the beverage or liquid container, the manually operable means are preferably defined by outer lid surfacing of the primary lid form. When the container attachment means non-rotatably attaching the primary lid form to the beverage or liquid container, the manually operable means are preferably defined by outer surfacing of the secondary lid attachment exemplified by at least one protuberance.

In the case of certain lid assemblies, the primary lid forms and the secondary lid attachments each comprise a radially centralized, downwardly-bowed portion, and the secondary lid attachment is structurally engaged in inferior adjacency with the primary lid form. The radially centralized, downwardly-bowed portions of the primary lid form and the secondary lid attachment provide an upper lid boundary and a lower lid boundary such that the upper and lower lid boundaries define a beverage-receiving flow channel for effecting heat transfer from beverage received therein prior to outletting via the primary beverage outlet.

In the case of certain lid assemblies, the primary lid forms all comprise a raised upper arc length form and the secondary lid attachments all comprise a raised lower arc length form. The raised upper and lower arc length forms are nestable and comprise opposed (upper and lower) arc length termini. The opposed arc length termini together cooperably provide rotational stop structure for limiting rotation of the secondary lid attachments relative to the primary lid forms.

In the case of certain lid assemblies, the lower arc length forms both comprise a radially directed flow return slope structure for directing beverage flow toward the beverage-receiving flow channel. The raised lower arc length form may preferably comprise circumferentially spaced rail portions intermediate the opposed arc length termini. The opposed arc length termini of the raised upper arc length form comprise rail-receiving notches, and the circumferentially spaced rail portions are received in the rail-receiving notches and guided thereby for enhancing the user's ability to selectively open and close the beverage container lid assembly.

In the case of one beverage container lid assembly, the secondary lid attachment is ring-shaped and the primary lid form comprises an annular, ring-receiving channel. The ring-shaped secondary lid attachment is received in the ring-receiving channel in inferior adjacency to the primary lid form. The beverage flow or liquid diversion structure provides a radially peripheral beverage-receiving flow channel for effecting heat transfer from beverage received therein prior to outletting via the primary beverage outlet.

The radially peripheral beverage-receiving flow channel is preferably sloped downwardly and radially outwardly for maximizing flow volume peripherally and thus enhances heat transfer from beverage prior to outletting via the primary beverage outlet. The secondary lid attachment of one lid assembly is preferably radially double-walled. The radially double-walled secondary lid attachment provides resilient attachment-to-form engagement within the ring-receiving channel for enhancing beverage flow or liquid diversion control of the lid assembly.

In the case of a second lid assembly, the secondary lid attachment is also ring-shaped and the primary lid form also comprises an annular, ring-receiving channel. In structural distinction to the first lid assembly, the secondary lid attachment of the second lid assembly is received in the ring-receiving channel in superior adjacency to the primary lid form thereby forming an upper, peripheral, beverage-receiving flow channel for effecting heat transfer from beverage received therein. Similar to the first lid assembly, the second lid assembly preferably comprises a secondary lid attachment that is radially double-walled for providing resilient attachment-to-form engagement within the ring-receiving channel.

Certain other alternative lid assemblies are believed to all be essentially characterized by an insert-receiving depression formed in the primary lid form into which depression the respective secondary lid attachments are pivotally received. Whereas certain assemblies may be characterized by a ring-shaped secondary lid attachments and an attachment-locating hub also formed as part of the primary lid form within the depression, another alternative lid assembly eliminates the attachment-locating hub.

A primary beverage container insert assembly according to the present invention provides a beverage container insert for use in combination with a beverage container and for controlling beverage movements within the beverage container. The beverage container insert according to the present invention preferably and essentially comprises a container-engaging first portion and a beverage-damping second portion. The beverage-damping second portion is extendable inwardly relative to the wall-engaging first portion and basically functions to deflect upwardly directed beverage for controlling beverage movement within an insert-outfitted beverage container.

Certain preferable options for the beverage container insert include a serrated or sectioned beverage-damping second portion for enabling beverage or liquid to flow through beverage-letting or liquid-letting troughs formed in the serrated beverage-damping second portion. The beverage-damping second portion may be resiliently actuable relative to the container-engaging first portion, and thus the beverage-damping second portion may be (a) resiliently actuable for enabling a stacked insert-outfitted beverage container arrangement, and (b) resiliently relaxable for deflecting upwardly directed beverage.

Other objects of the present invention, as well as particular features, elements, and advantages thereof, will be elucidated or become apparent from, the following description and the accompanying drawing figures.

BRIEF DESCRIPTIONS OF THE DRAWINGS

Other features and objectives of my invention will become more evident from a consideration of the following brief descriptions of patent drawings.

FIG. 5 is an exploded top perspective view of the first beverage container lid assembly according to the present invention showing the upper primary lid form exploded from the lower secondary lid attachment of the first beverage container lid assembly.

FIG. 6 is an exploded anterior edge elevational view of the first beverage container lid assembly according to the present invention showing the upper primary lid form exploded from the lower secondary lid attachment of the first beverage container lid assembly.

FIG. 7 is an exploded lateral cross-sectional view of the first beverage container lid assembly according to the present invention showing a lateral cross-section of the upper primary lid form exploded from a lateral cross-section of the lower secondary lid attachment of the first beverage container lid assembly as sectioned from FIG. 6.

FIG. 10 is an exploded top perspective view of a second beverage container lid assembly according to the present invention showing an upper primary lid form exploded from a lower secondary lid attachment of the second beverage container lid assembly.

FIG. 11 is an exploded anterior edge elevational view of the second beverage container lid assembly according to the present invention showing the upper primary lid form exploded from the lower secondary lid attachment of the second beverage container lid assembly.

FIG. 12 is an exploded lateral cross-sectional view of the second beverage container lid assembly according to the present invention showing a lateral cross-section of the upper primary lid form exploded from a lateral cross-section of the lower secondary lid attachment of the first beverage container lid assembly as sectioned from FIG. 11.

FIG. 14 is an enlarged exploded bottom perspective view of the second beverage container lid assembly according to the present invention showing the upper primary lid form exploded from the lower secondary lid attachment of the second beverage container lid assembly.

Figure 16:
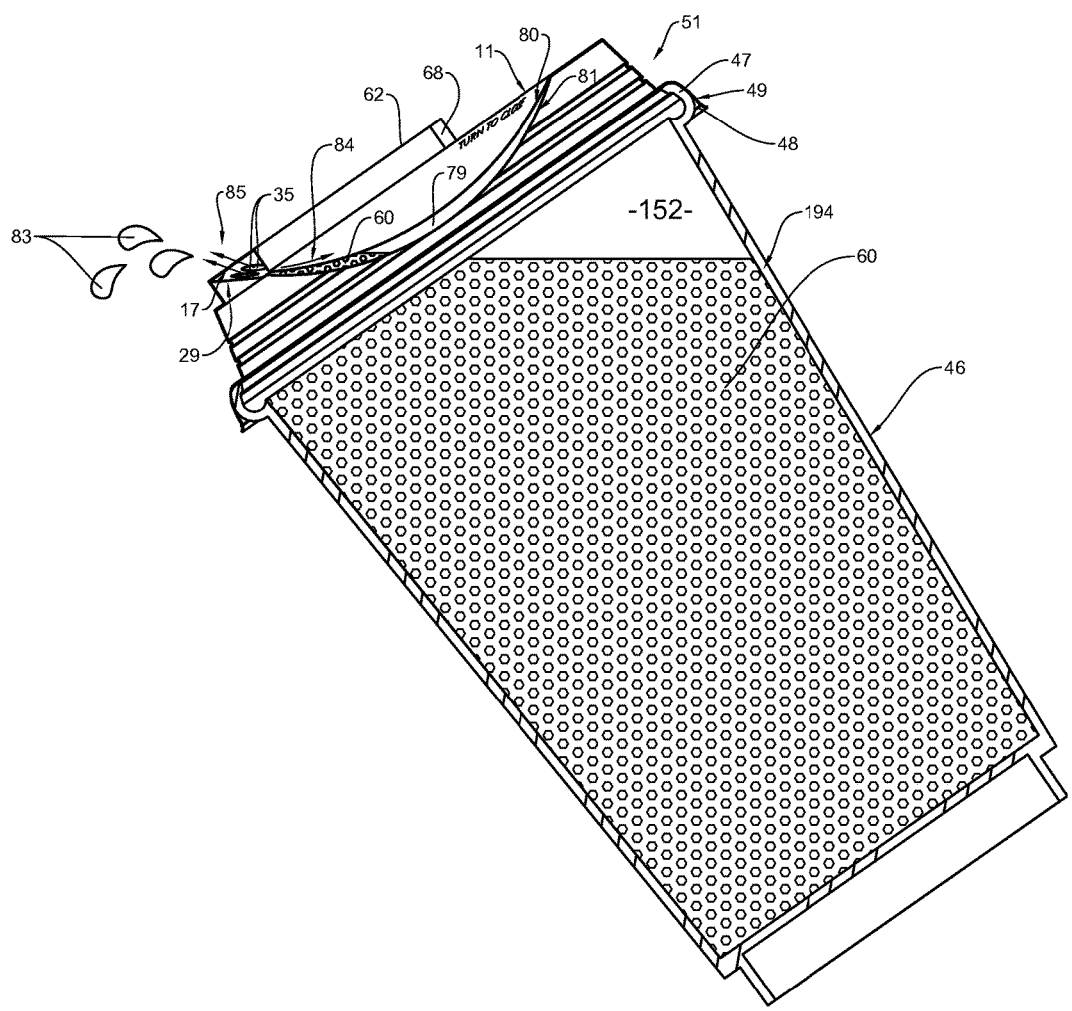

FIG. 16 is a second sequential schematic longitudinal cross-sectional type depiction of a beverage container outfitted with the second beverage container lid assembly according to the present invention shown in a first angle of inclination off of a vertical orientation for inletting beverage via letting apertures formed in the secondary lid attachment into a beverage-receiving flow channel of the second beverage container lid assembly.

Figure 17:
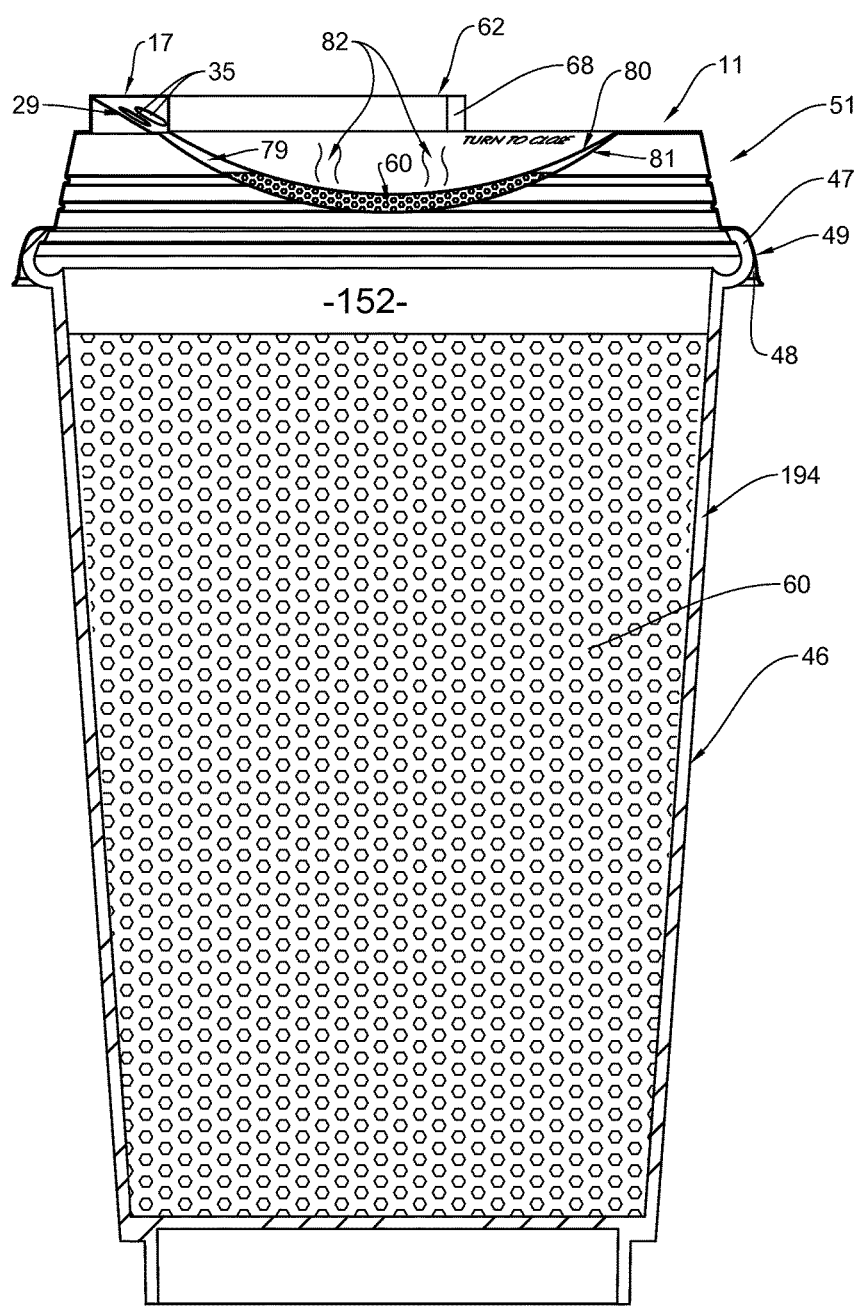

FIG. 17 is a third sequential schematic longitudinal cross-sectional type depiction of a beverage container outfitted with the second beverage container lid assembly according to the present invention shown in a vertical orientation with beverage received and pooled within the beverage-receiving flow channel of the second beverage container lid assembly.

Figure 18:
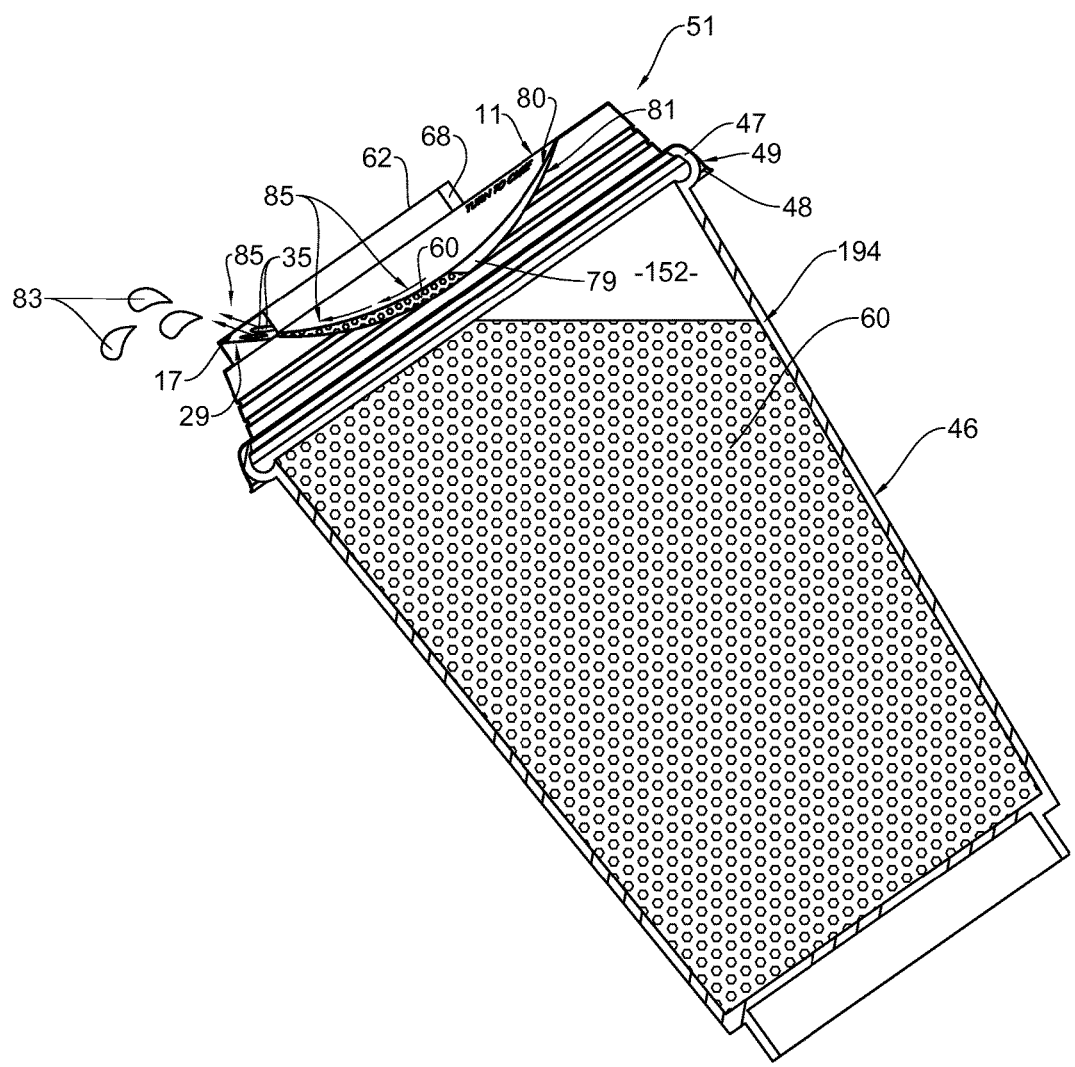

FIG. 18 is a fourth sequential schematic longitudinal cross-sectional type depiction of a beverage container outfitted with the second beverage container lid assembly according to the present invention shown in a second angle of inclination off of a vertical orientation for outletting cooled beverage via the primary beverage outlet of the primary lid form of the second beverage container lid assembly.

Figure 19:
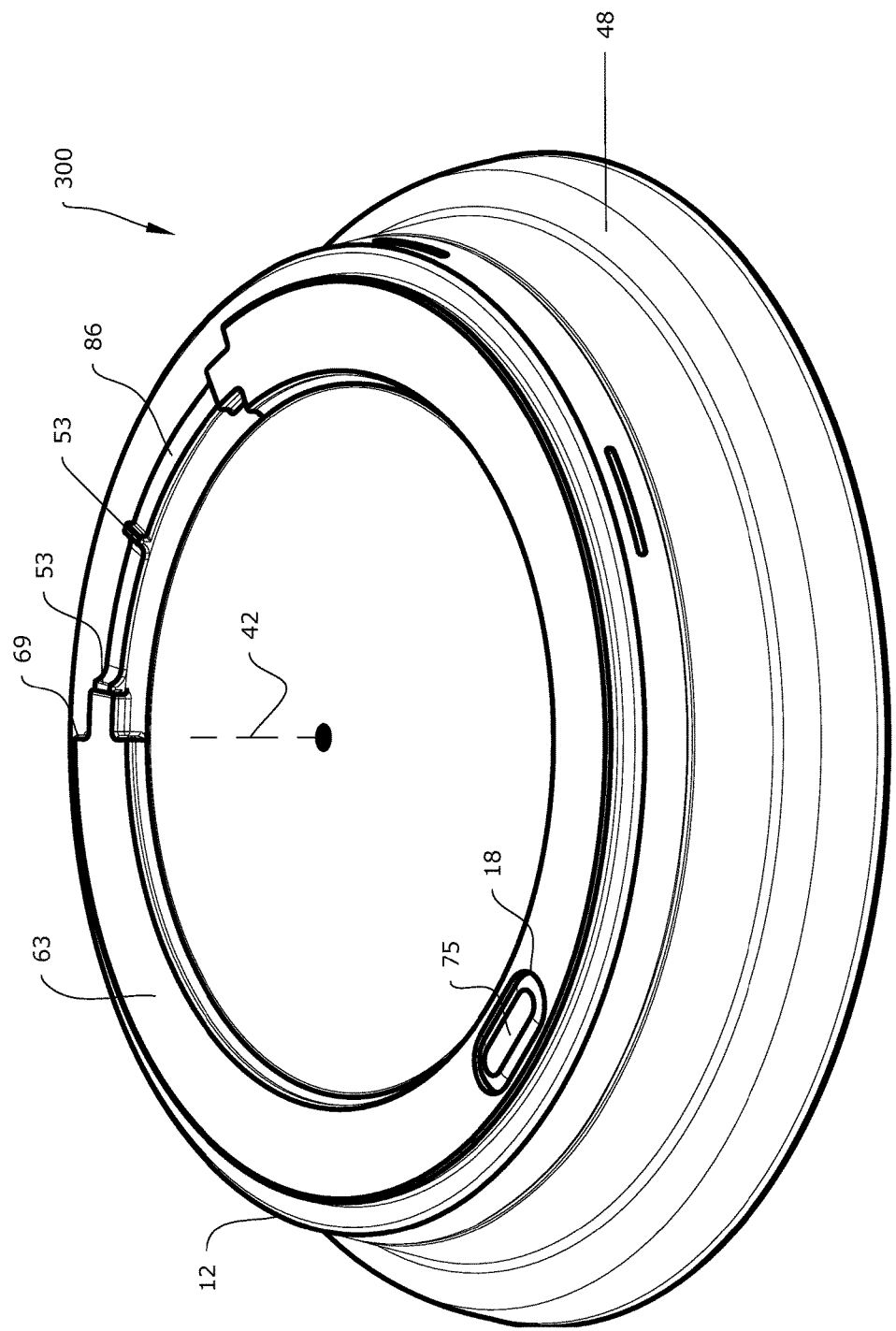

FIG. 19 is an enlarged assembled top perspective view of a third beverage container lid assembly according to the present invention showing the third beverage container lid assembly in a closed configuration.

Figure 20:
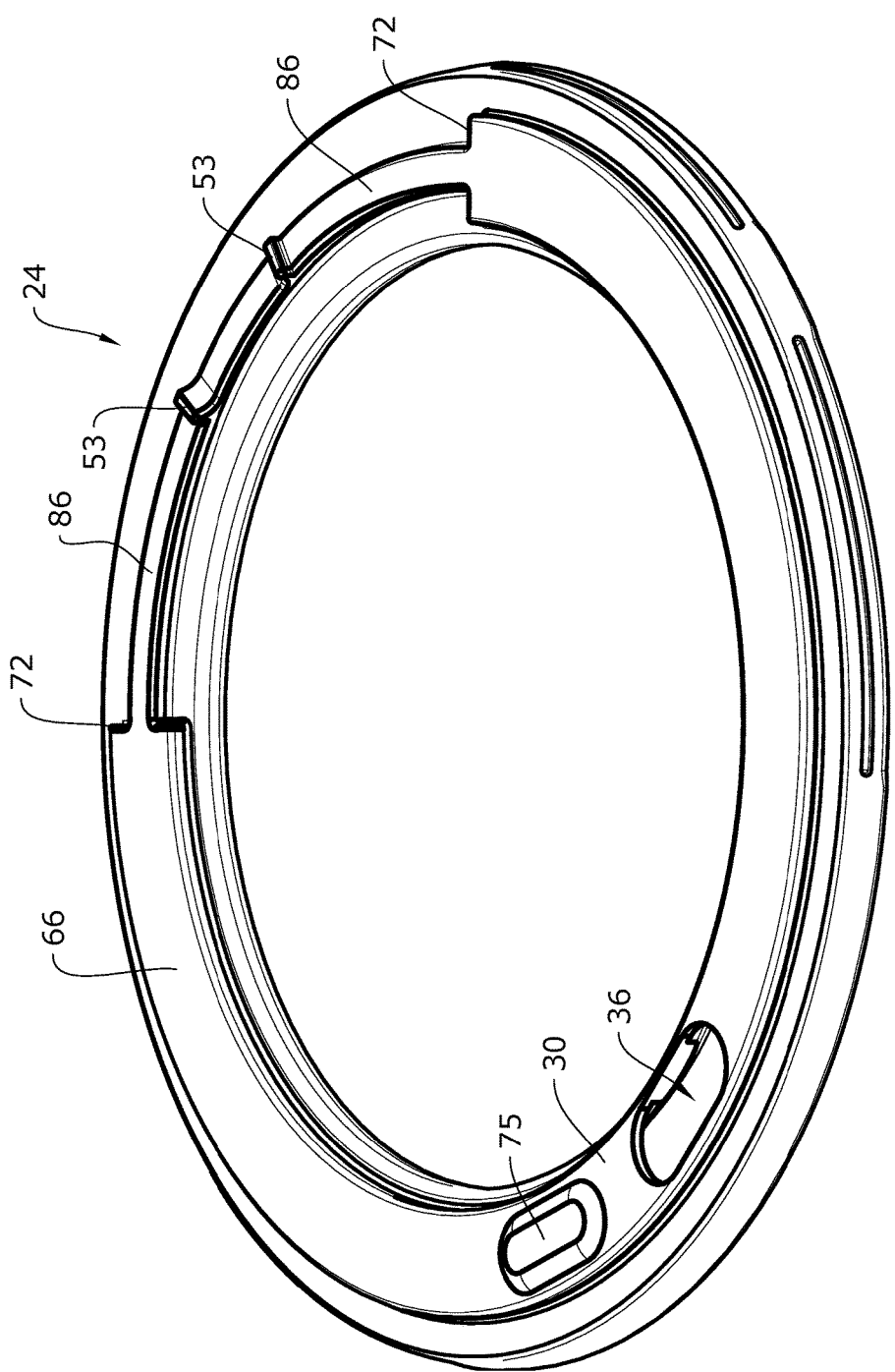

FIG. 20 is a first enlarged top perspective view of a secondary lid attachment of the third beverage container lid assembly according to the present invention showing an anterior letting aperture, an anterior raised flow stop structure, and posterior manual engagement protuberances formed in a raised arc length formation of the secondary lid attachment of the third beverage container lid assembly.

Figure 21:
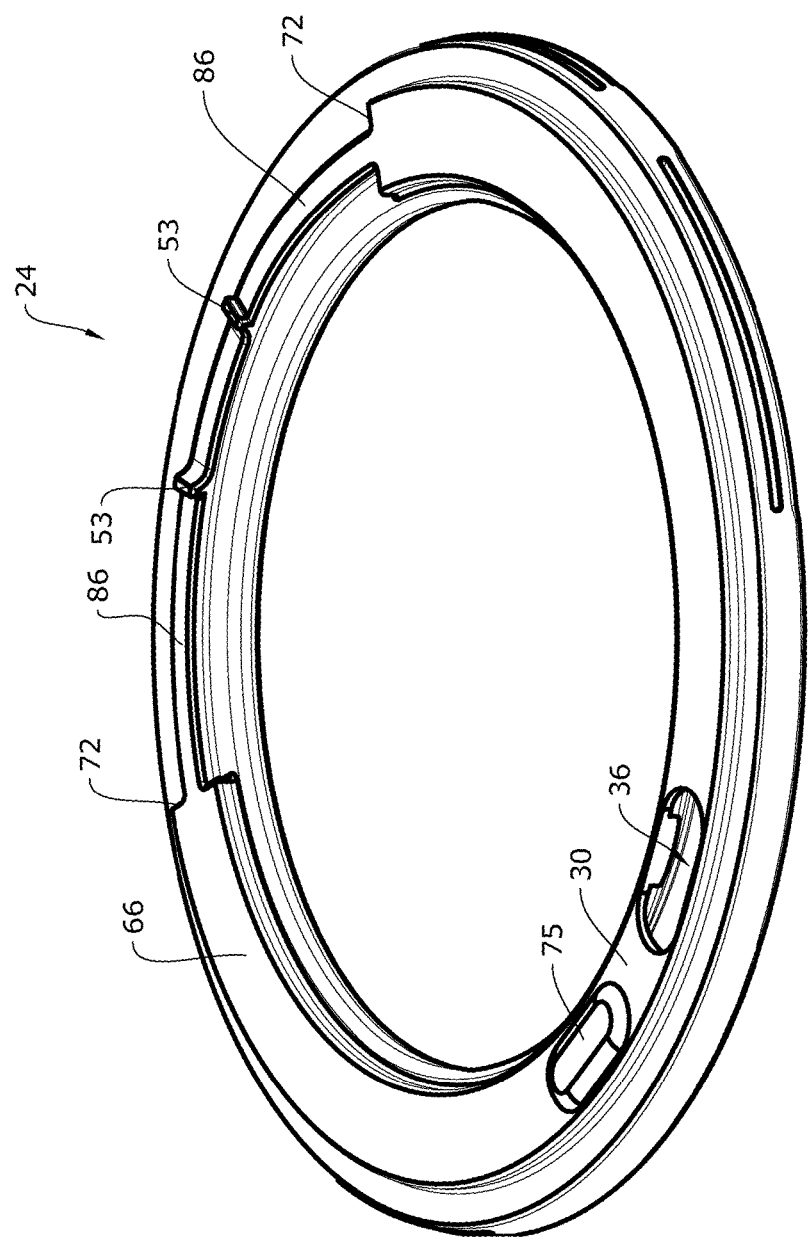

FIG. 21 is a second enlarged top perspective view of the secondary lid attachment of the third beverage container lid assembly according to the present invention showing in a different perspective the letting aperture, the raised flow stop structure, and manual engagement protuberances formed in the raised arc length formation of the secondary lid attachment of the third beverage container lid assembly.

Figure 22:
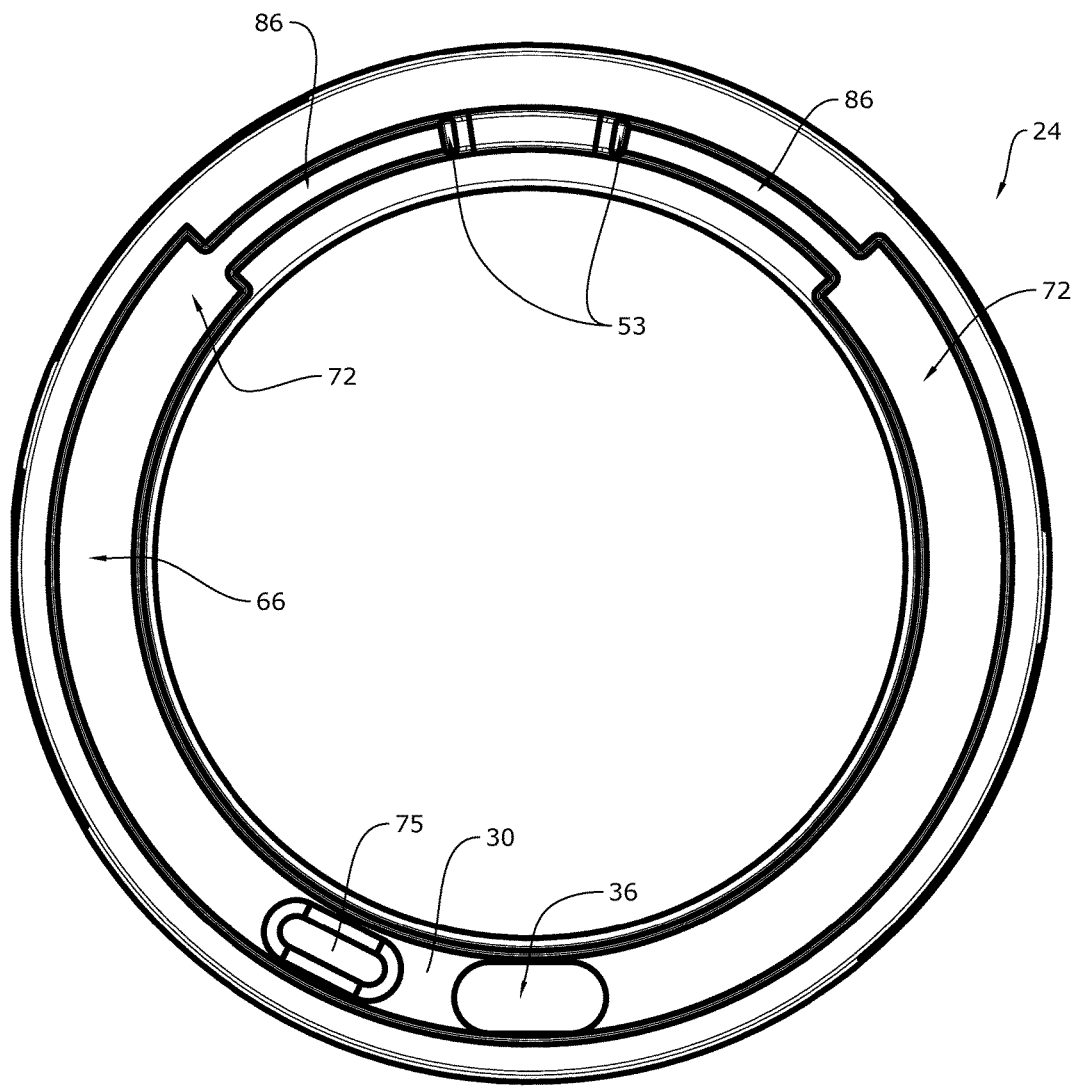

FIG. 22 is an enlarged top plan view of the secondary lid attachment of the third beverage container lid assembly according to the present invention showing the letting aperture, the raised flow stop structure, and manual engagement protuberances formed in the raised arc length formation of the secondary lid attachment.

Figure 23:
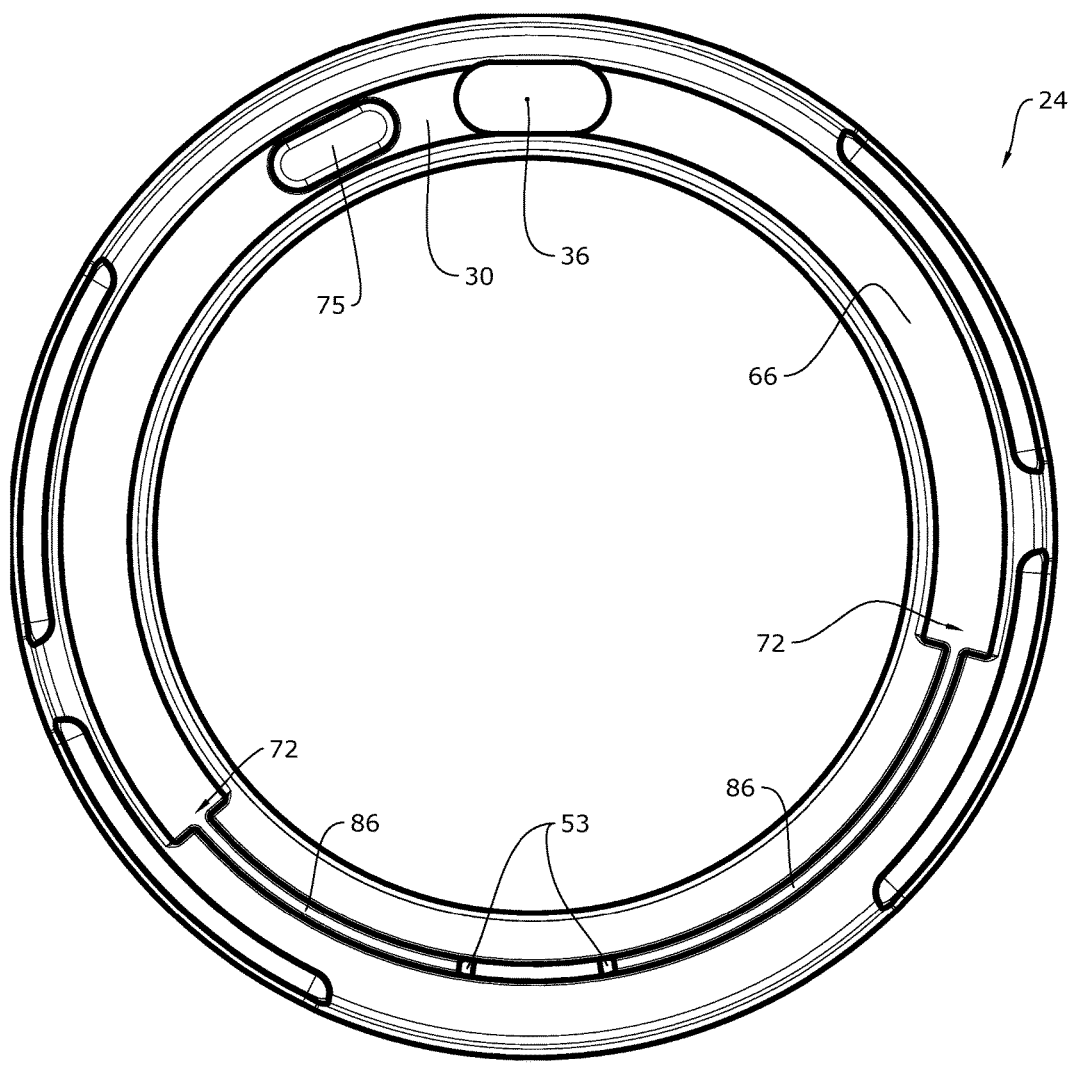

FIG. 23 is an enlarged bottom plan view of the secondary lid attachment of the third beverage container lid assembly according to the present invention showing the letting aperture, the raised flow stop structure, and manual engagement protuberances formed in the raised arc length formation of the secondary lid attachment.

Figure 24:
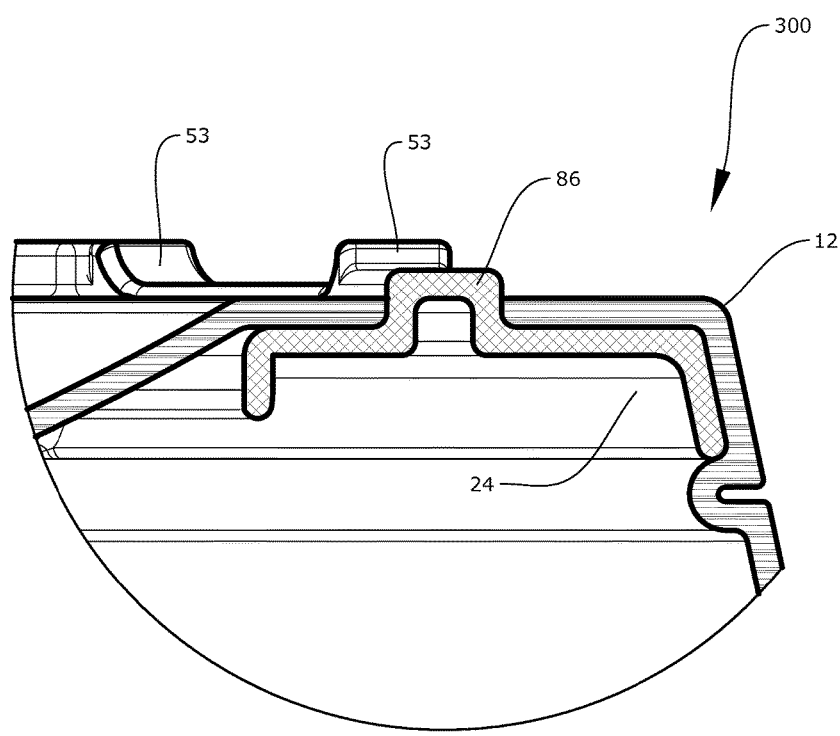
Figure 25:
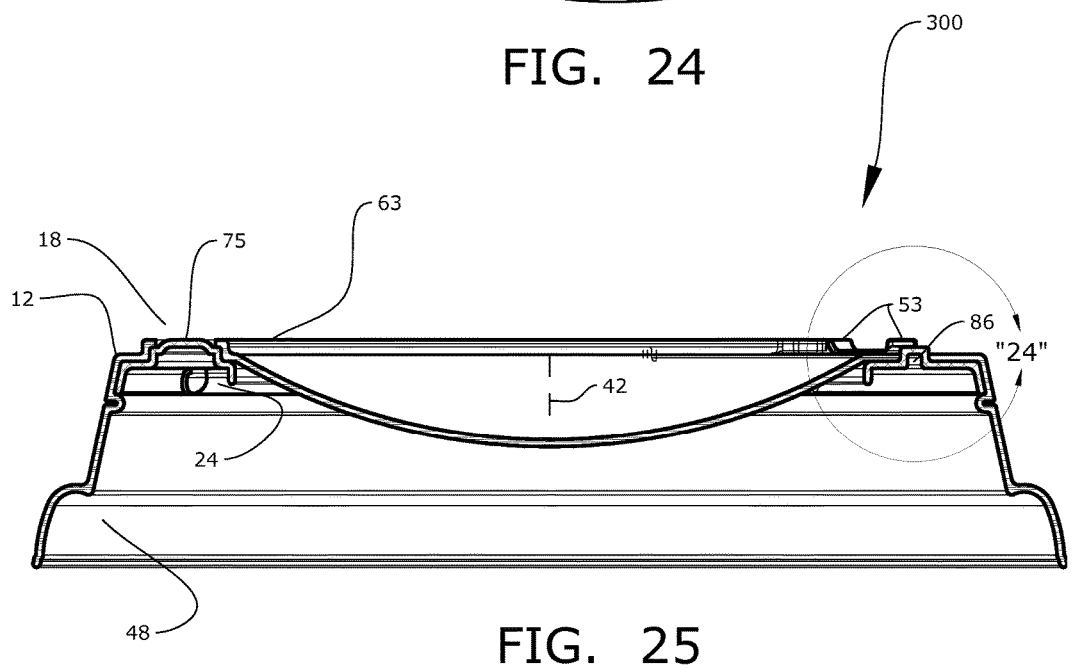

FIG. 24 is an enlarged fragmentary cross-sectional view of a junction site between the upper primary lid form and the lower secondary lid attachment of the third beverage container lid assembly according to the present invention as enlarged and sectioned from FIG. 25.

FIG. 25 is a lateral cross-sectional view of the third beverage container lid assembly according to the present invention as sectioned through the raised flow stop structure.

Figure 26:
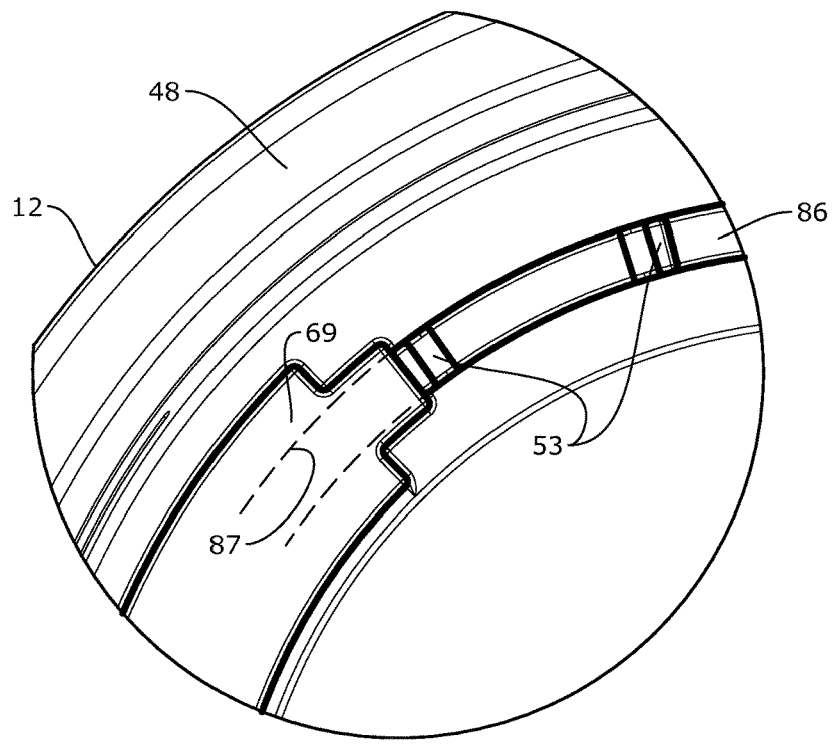
Figure 27:
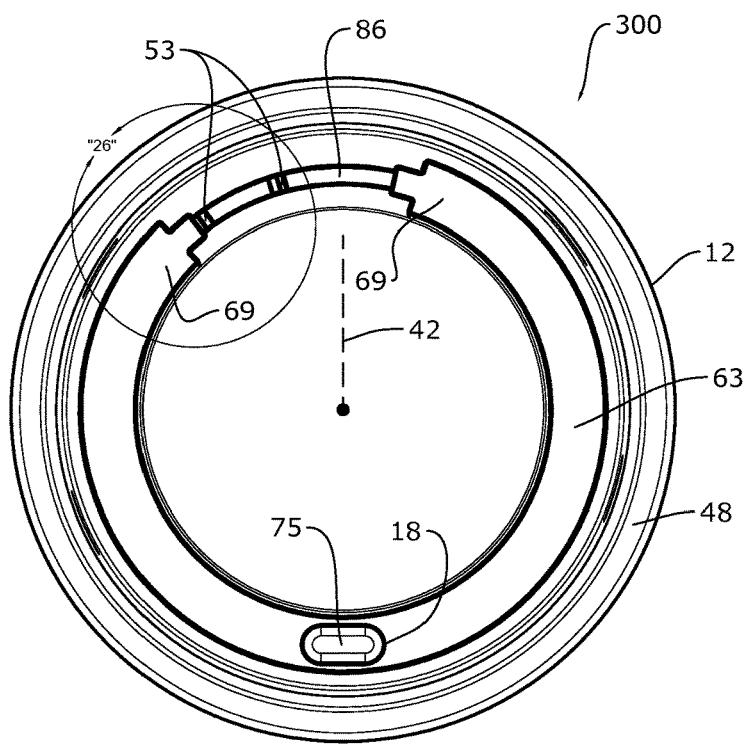

FIG. 26 is an enlarged fragmentary top plan sectional view of a junction site between the upper primary lid form and the lower secondary lid attachment of the third beverage container lid assembly according to the present invention as enlarged and sectioned from FIG. 27.

FIG. 27 is an assembled top plan view of the third beverage container lid assembly according to the present invention showing the third beverage container lid assembly in the closed configuration.

Figure 28:
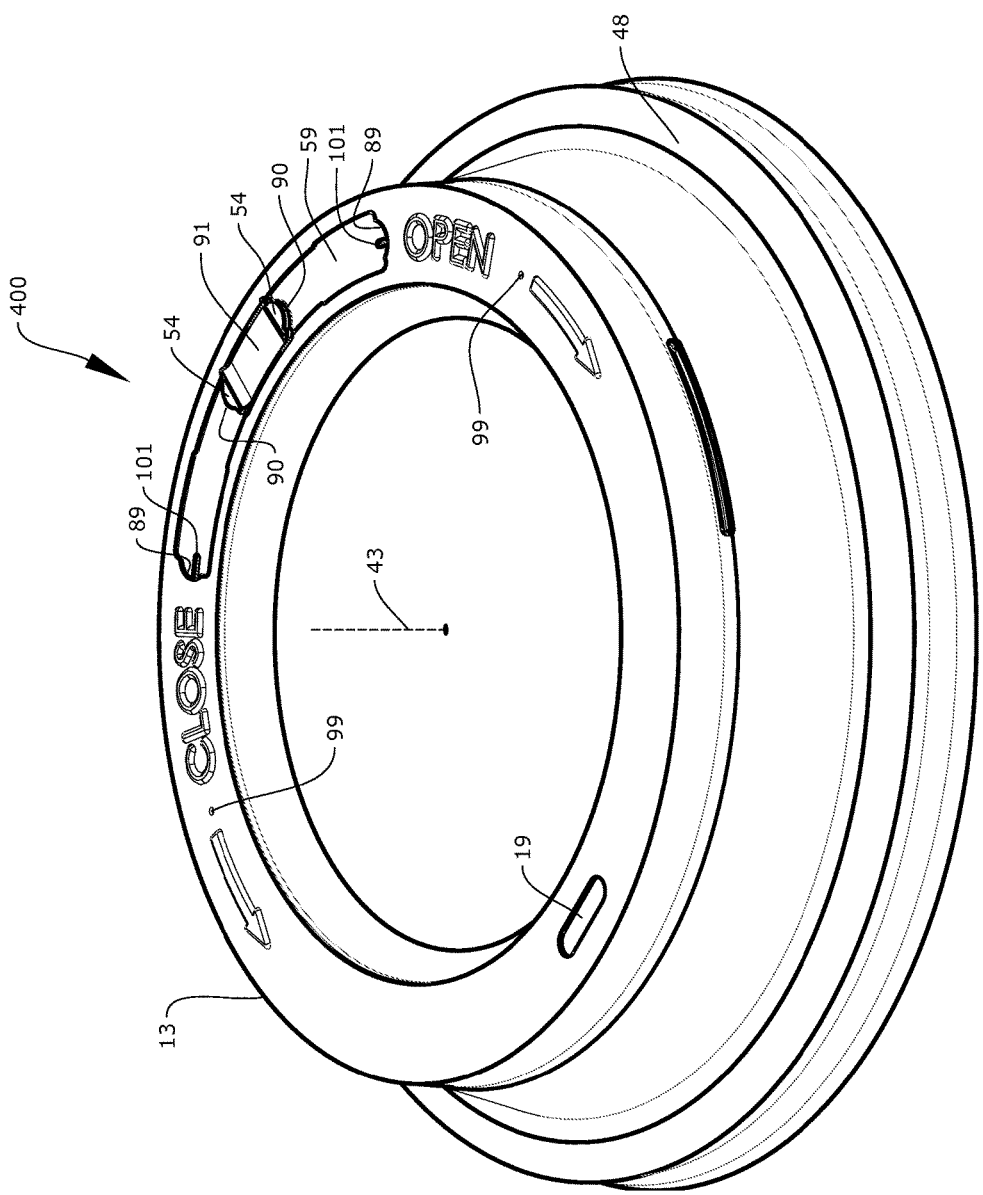

FIG. 28 is an assembled enlarged top perspective view of a fourth beverage container lid assembly according to the present invention showing the fourth beverage container lid assembly in an intermediate beverage-cooling, heat transfer configuration.

Figure 29:
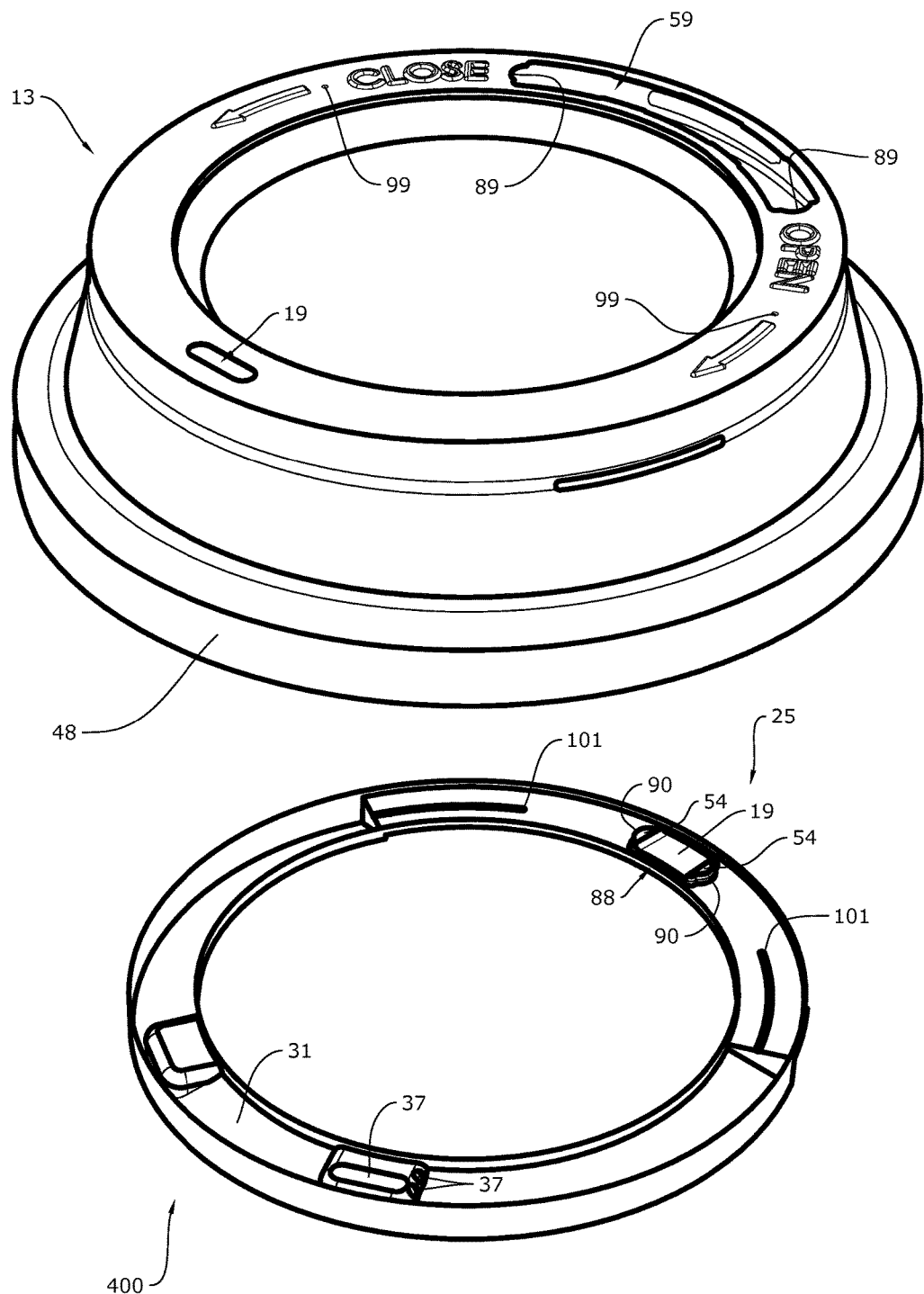

FIG. 29 is a first exploded enlarged top perspective view of the fourth beverage container lid assembly according to the present invention showing an upper primary lid form exploded from a lower secondary lid attachment of the fourth beverage container lid assembly.

Figure 30:
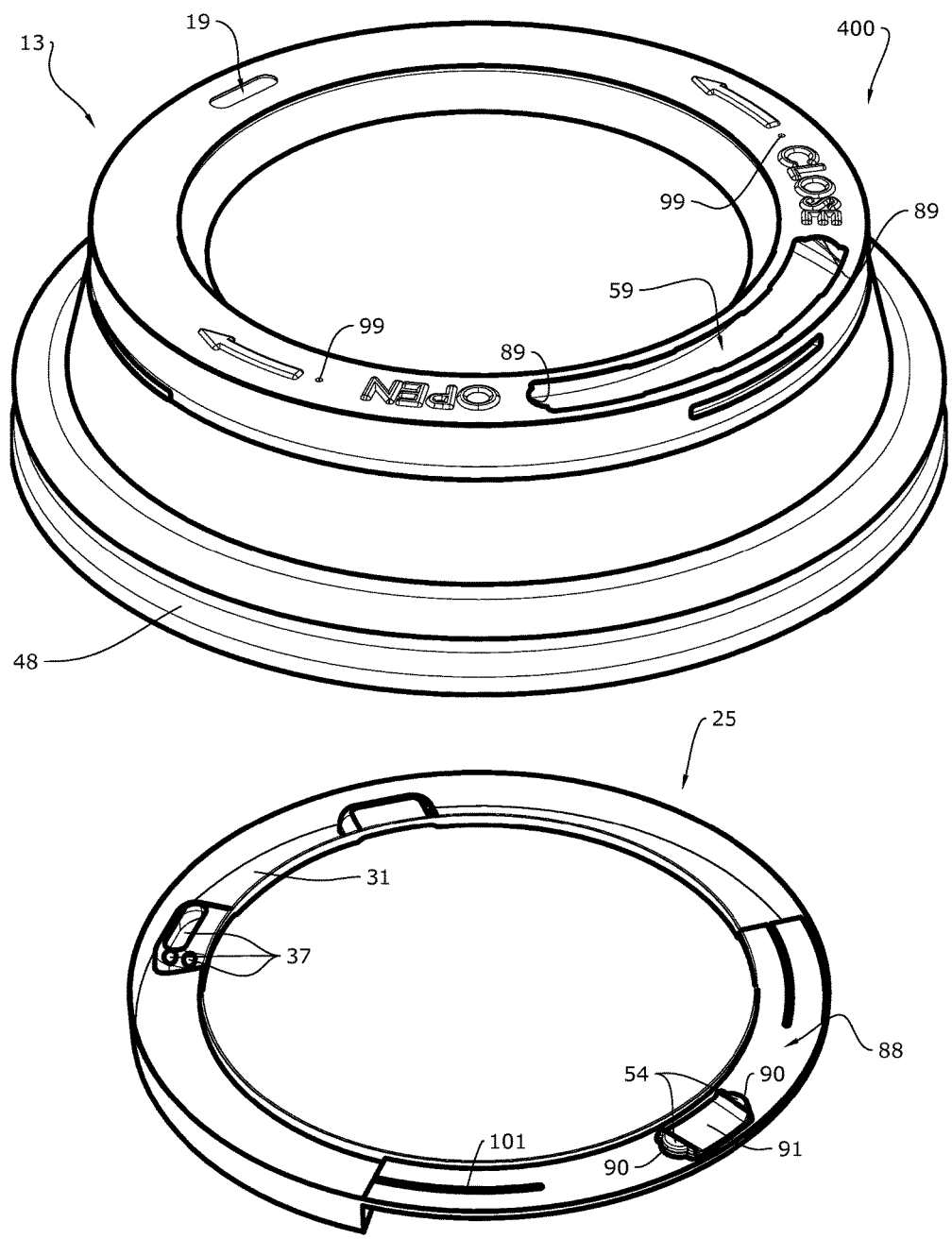

FIG. 30 is a second exploded enlarged top perspective view of the fourth beverage container lid assembly according to the present invention showing in a different perspective the upper primary lid form exploded from the lower secondary lid attachment of the fourth beverage container lid assembly.

Figure 31:
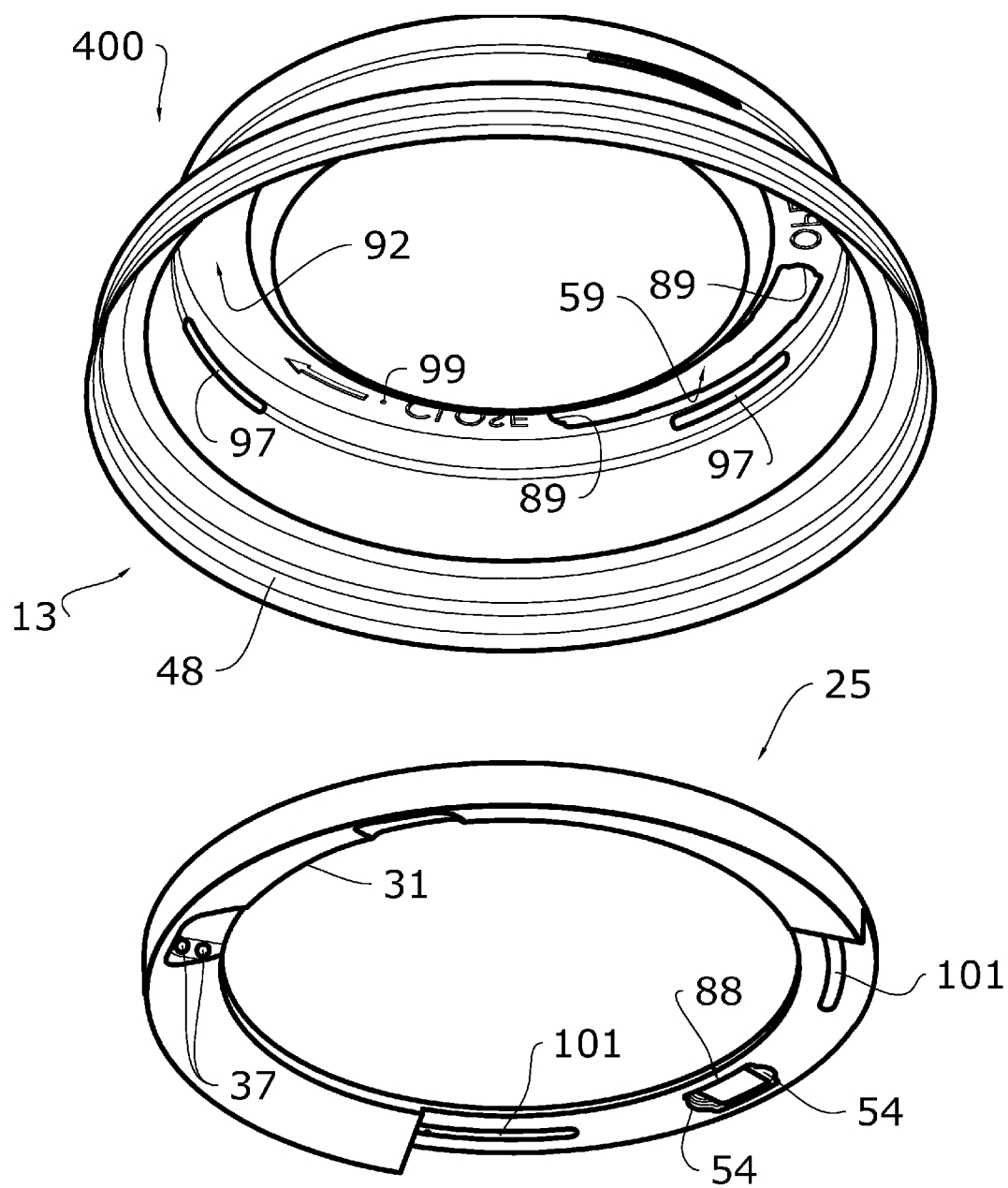

FIG. 31 is an exploded enlarged bottom perspective view of the fourth beverage container lid assembly according to the present invention showing the upper primary lid form exploded from the lower secondary lid attachment of the fourth beverage container lid assembly.

Figure 32:
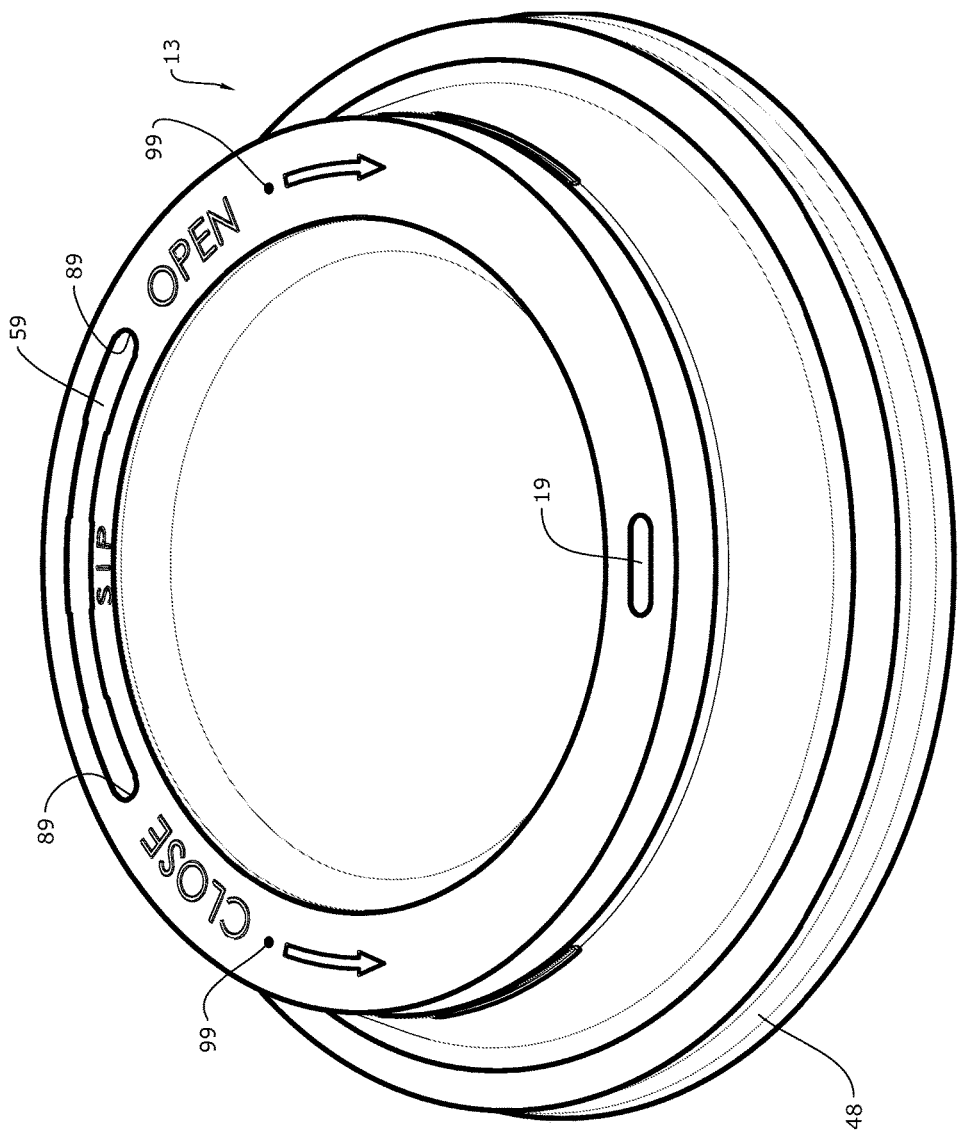

FIG. 32 is an enlarged top perspective view of the primary lid form of the fourth beverage container lid assembly according to the present invention showing an anterior primary beverage outlet and a posterior arc length aperture formed in the primary lid form.

Figure 33:
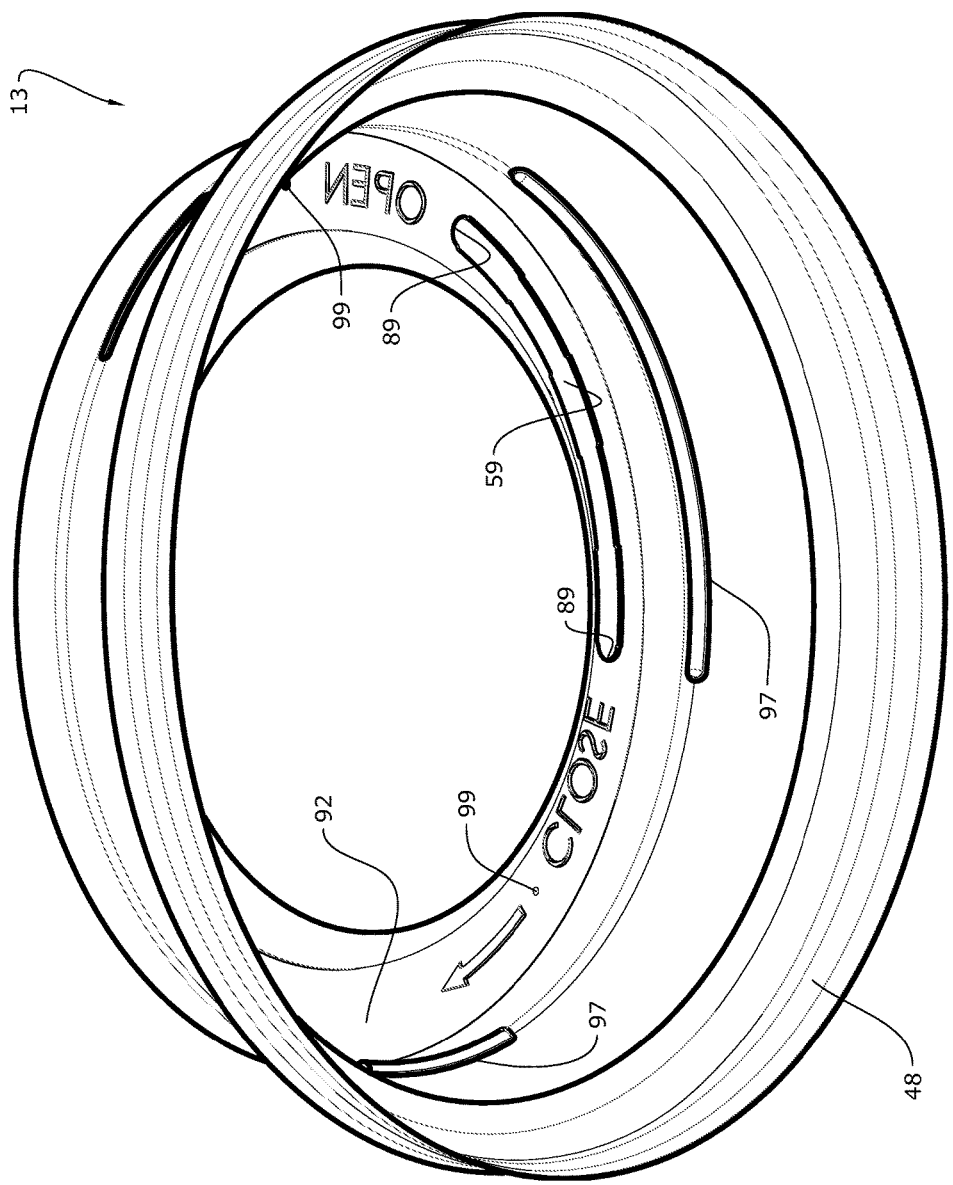

FIG. 33 is an enlarged bottom perspective view of the primary lid form of the fourth beverage container lid assembly according to the present invention showing the posterior arc length aperture and inner attachment supports formed in the primary lid form.

Figure 34:
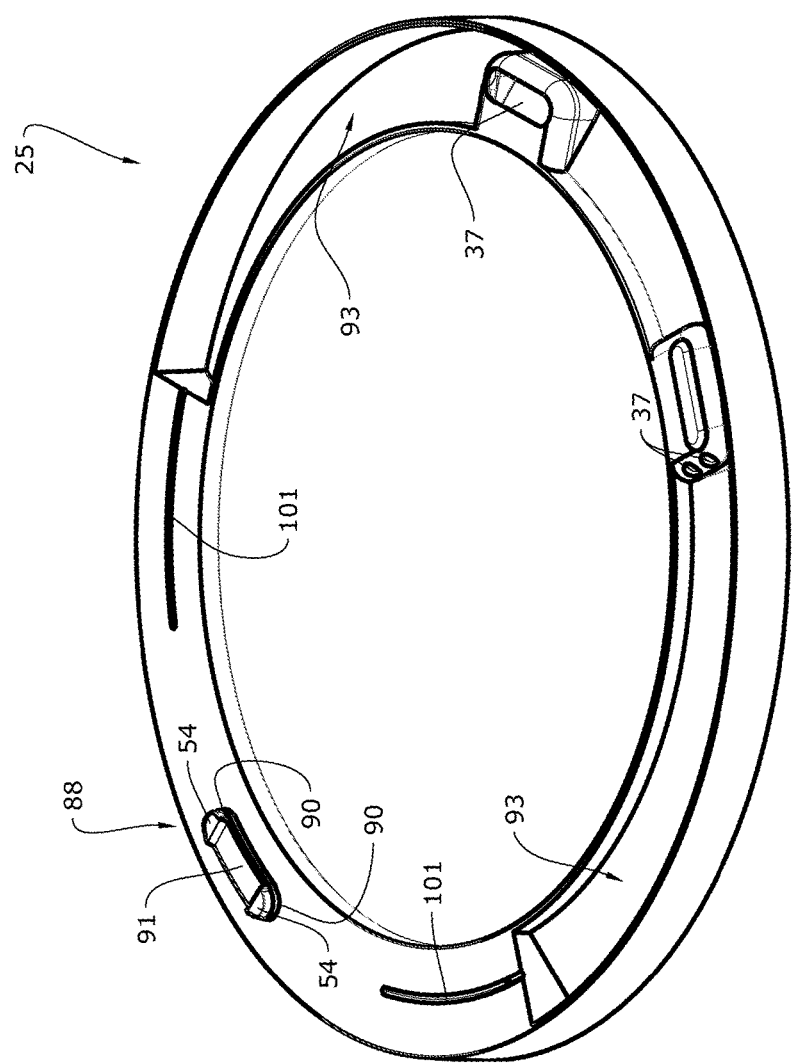

FIG. 34 is an enlarged top perspective view of the secondary lid attachment of the fourth beverage container lid assembly according to the present invention showing anterior letting apertures, an anterior beverage flow stop structure, a peripheral beverage-receiving flow channel, and a posterior manual engagement protuberances formed in the secondary lid attachment.

Figure 35:
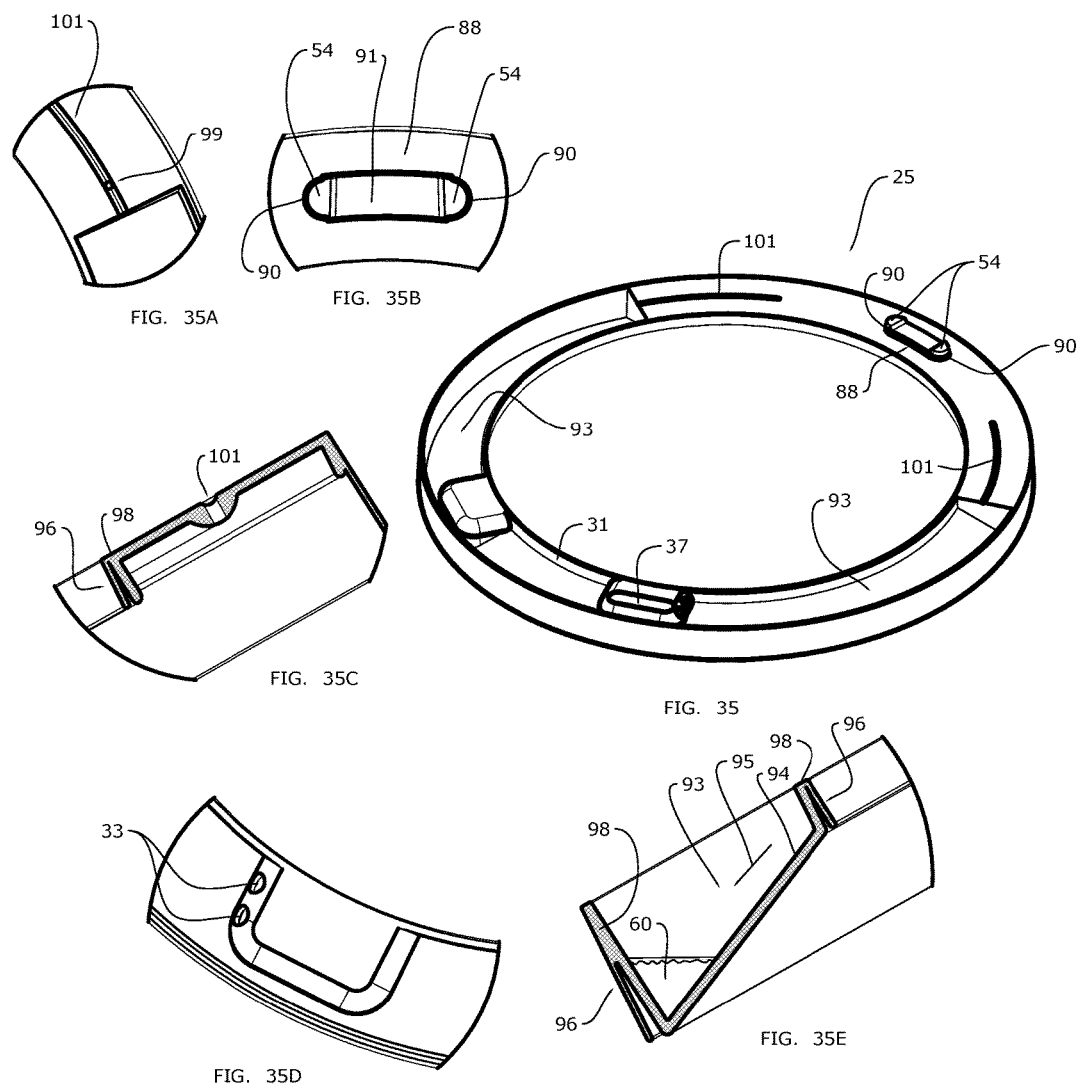

FIG. 35 is a reduced top perspective view of the secondary lid attachment of the fourth beverage container lid assembly according to the present invention showing a primary anterior letting aperture, the anterior beverage flow stop structure, the peripheral beverage-receiving flow channel, and the posterior manual engagement protuberances formed in the secondary lid attachment.

FIG. 35A is an enlarged fragmentary top plan view of a groove-protuberance junction site between the secondary lid attachment and the primary lid form of the fourth beverage container lid assembly according to the present invention, the groove-protuberance junction site schematically depicting a groove-received protuberance (otherwise integrally formed with the primary lid form) and a protuberance-receiving groove formed in the secondary lid attachment.

FIG. 35B is an enlarged fragmentary top plan view of an abbreviated raised arc length formation of the secondary lid attachment of the fourth beverage container lid assembly according to the present invention, the abbreviated raised arc length formation comprising laterally opposed manual engagement protuberances.

FIG. 35C is an enlarged fragmentary cross-sectional view of the secondary lid attachment of the fourth beverage container lid assembly according to the present invention as sectioned laterally through the protuberance-receiving groove formed in the secondary lid attachment.

FIG. 35D is an enlarged fragmentary top plan view of a flow stop structure of the secondary lid attachment of the fourth beverage container lid assembly according to the present invention, the flow stop structure shown outfitted with secondary, laterally offset, letting apertures.

FIG. 35E is an enlarged fragmentary cross-sectional view of the secondary lid attachment of the fourth beverage container lid assembly according to the present invention as sectioned laterally through the peripheral beverage-receiving flow channel.

Figure 36:
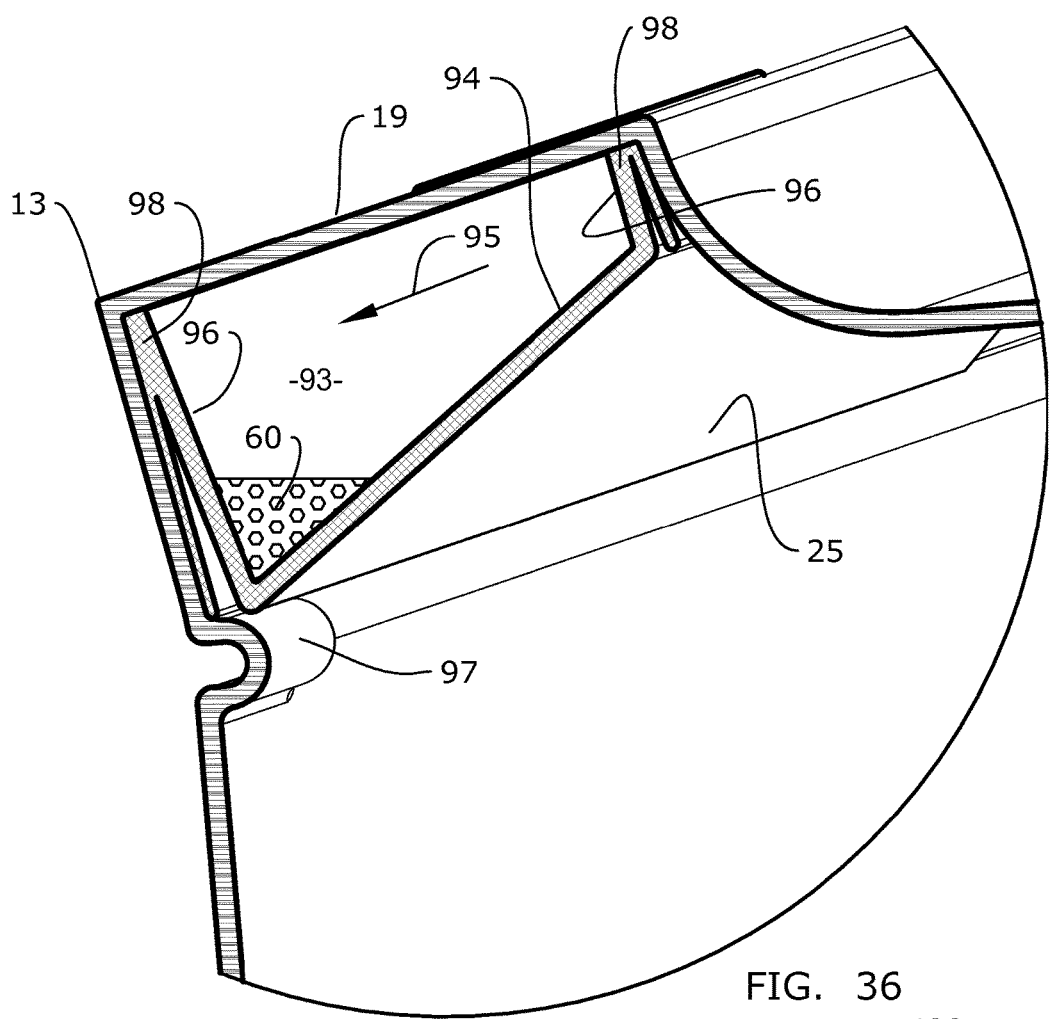
Figure 37:
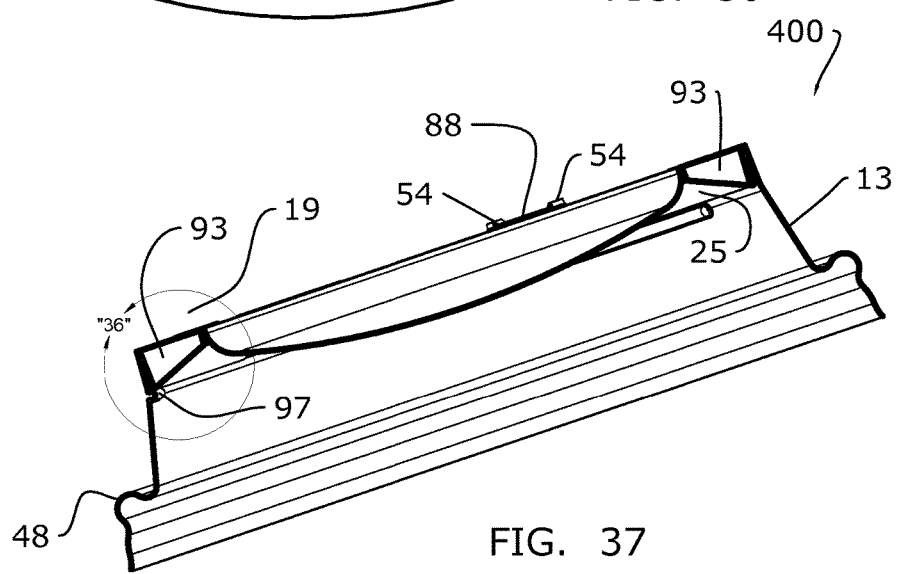

FIG. 36 is an enlarged fragmentary cross-sectional view of an attachment-to-form junction site of the fourth beverage container lid assembly according to the present invention showing the peripheral beverage-receiving flow channel of the secondary lid attachment in engagement with an attachment-receiving channel formed in the primary lid form as sectioned from FIG. 37.

FIG. 37 is an assembled lateral cross-sectional view of the fourth beverage container lid assembly according to the present invention to show the peripheral beverage-receiving flow channel of the secondary lid attachment in engagement with the attachment-receiving channel formed in the primary lid form.

Figure 38:
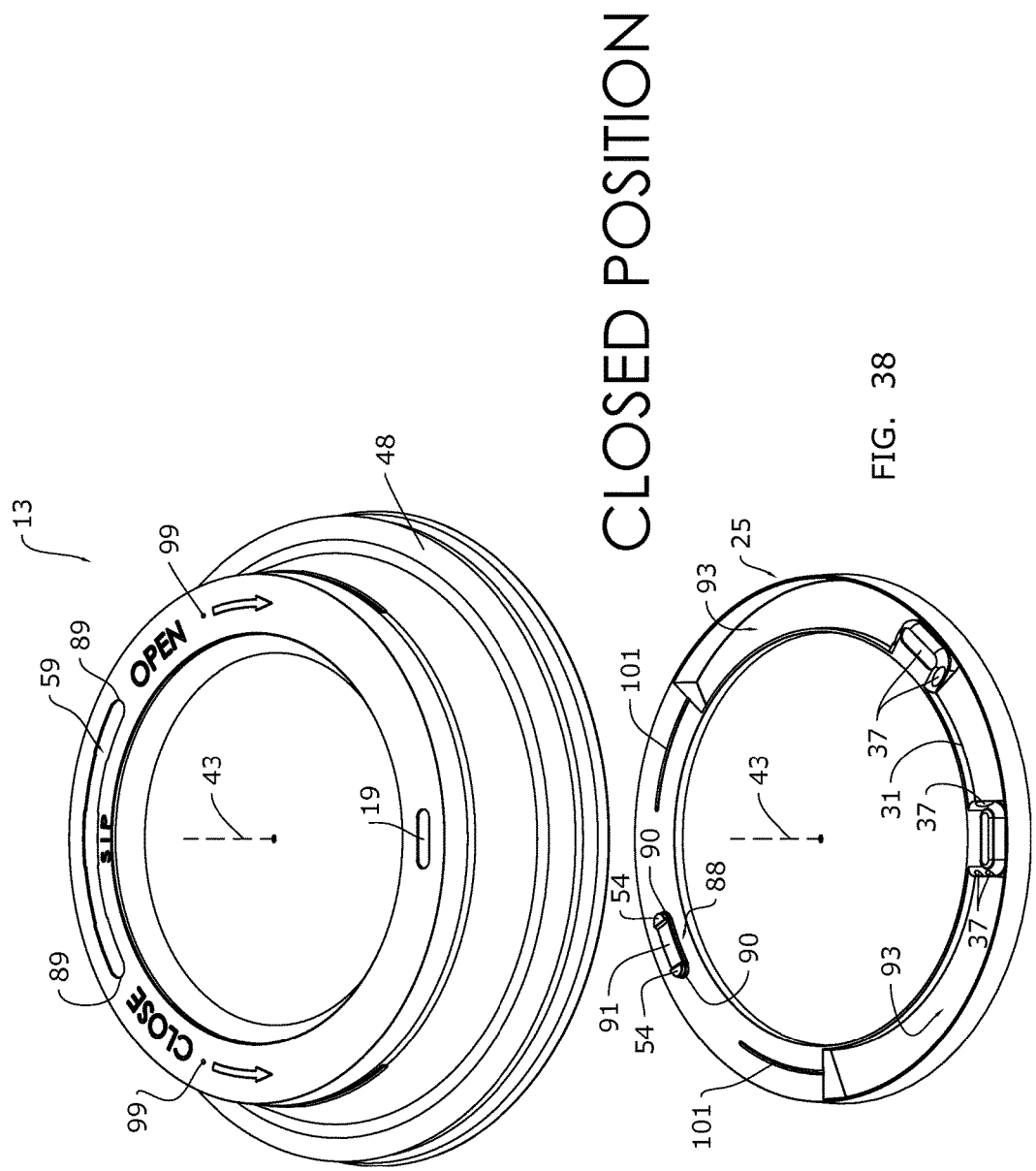

FIG. 38 is a first sequential exploded top perspective view of the fourth beverage container lid assembly according to the present invention showing the upper primary lid form exploded from the lower secondary lid attachment of the fourth beverage container lid assembly in a closed lid configuration.

Figure 39:
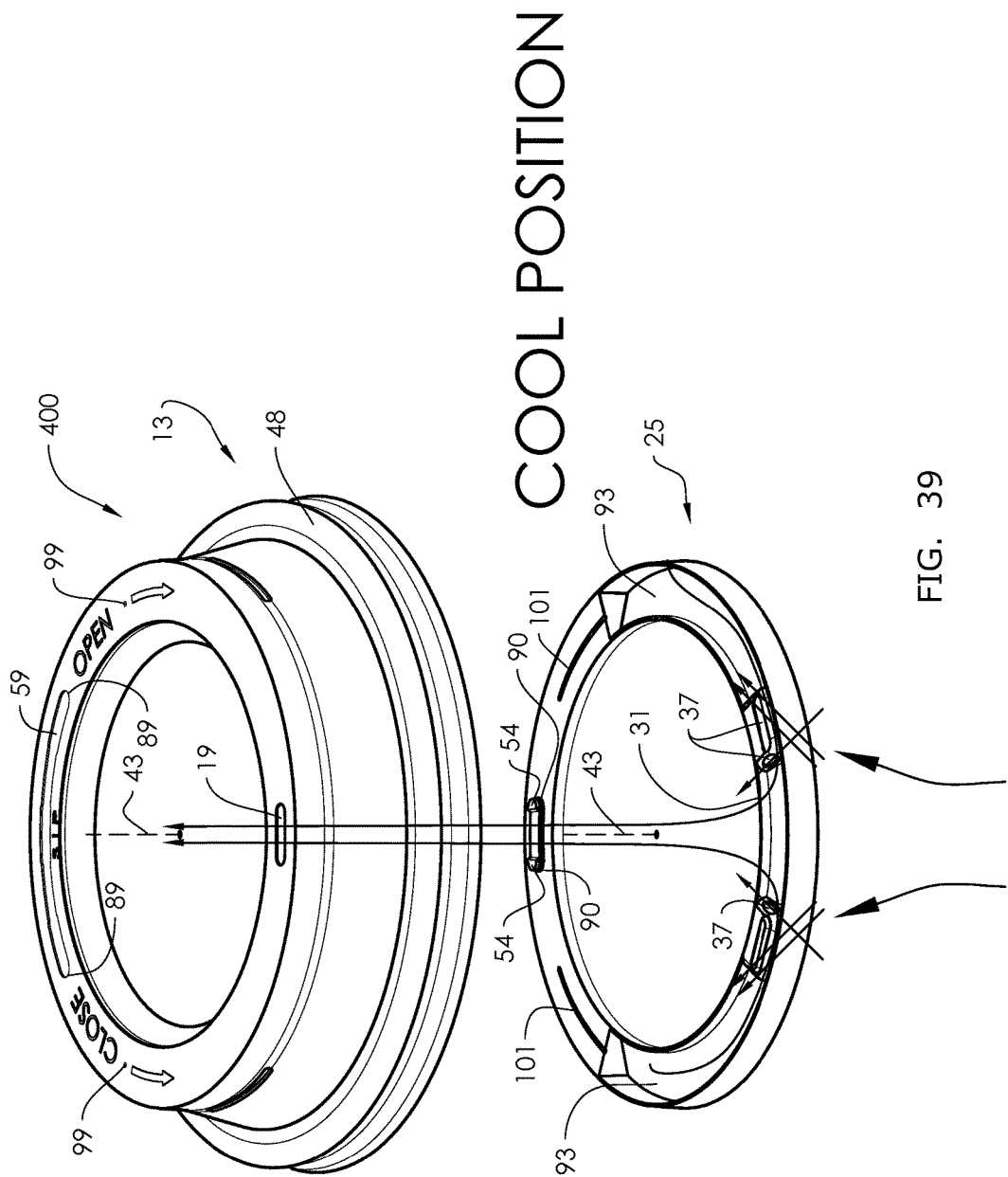

FIG. 39 is a second sequential exploded top perspective view of the fourth beverage container lid assembly according to the present invention showing the upper primary lid form exploded from the lower secondary lid attachment of the fourth beverage container lid assembly in an intermediate, beverage-cooling, heat transfer lid configuration and schematically depicting with bent or curved arrow beverage redirection through the fourth beverage container lid assembly.

Figure 40:
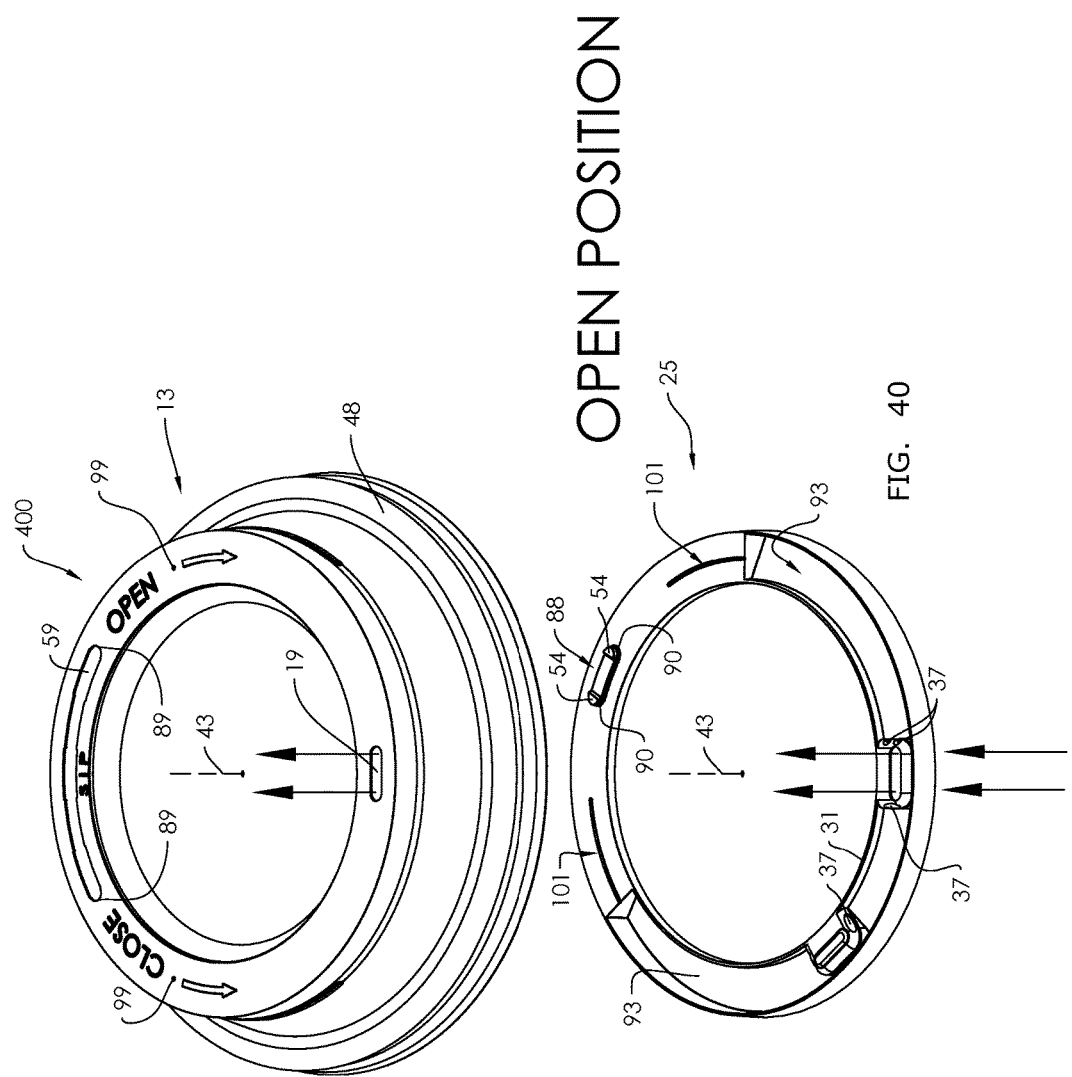

FIG. 40 is a third sequential exploded top perspective view of the fourth beverage container lid assembly according to the present invention showing the upper primary lid form exploded from the lower secondary lid attachment of the fourth beverage container lid assembly in a fully open lid configuration and schematically depicting with straight arrows direct beverage flow through the fourth beverage container lid assembly.

Figure 41:
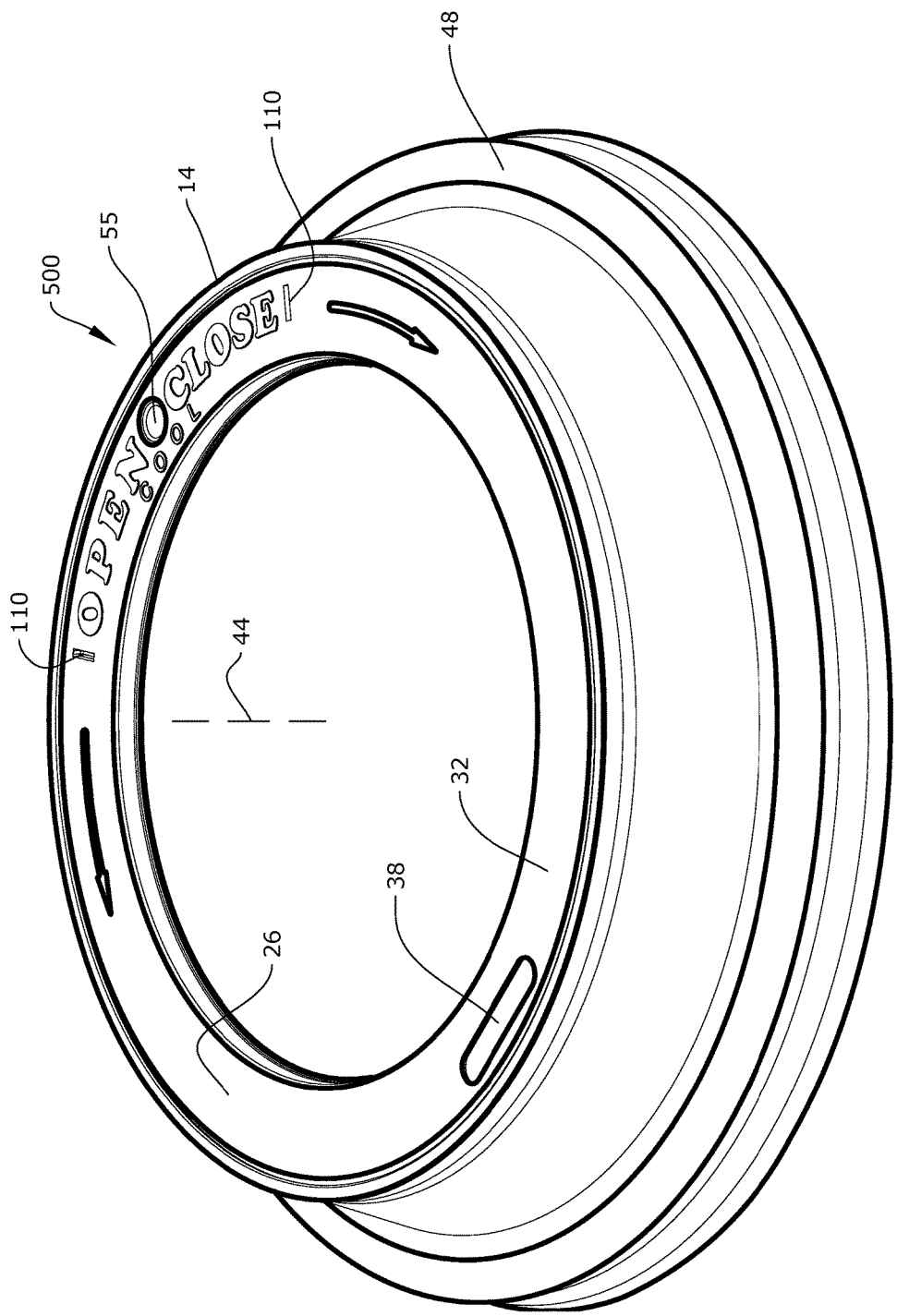

FIG. 41 is an assembled enlarged top perspective view of a fifth beverage container lid assembly according to the present invention showing an anterior letting aperture formed in a secondary lid attachment of the fifth beverage container lid assembly.

Figure 42:
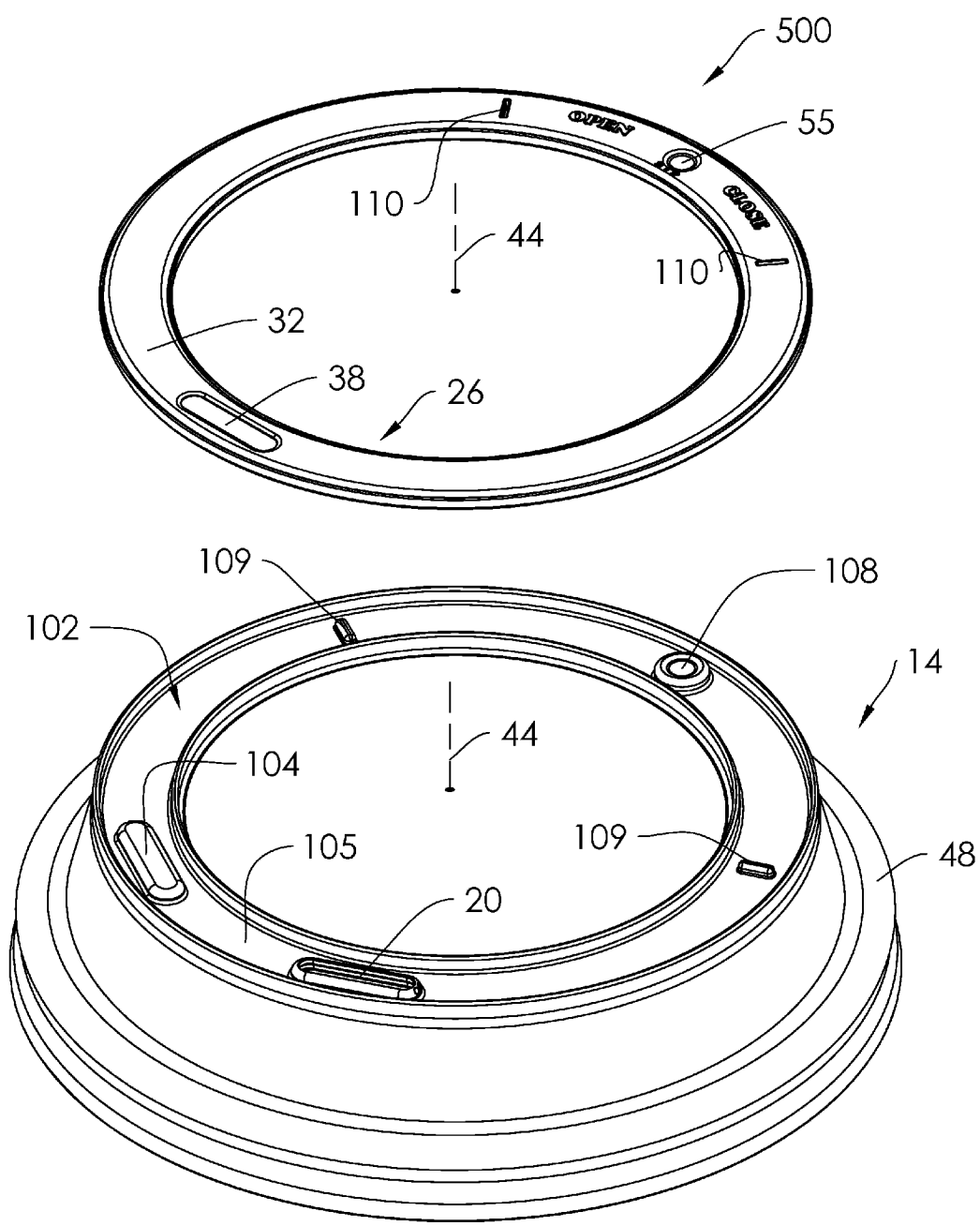

FIG. 42 is an exploded enlarged top perspective view of the fifth beverage container lid assembly according to the present invention showing an upper secondary lid attachment exploded from a lower primary lid form, the secondary lid attachment being positioned in an intermediate, beverage-cooling, heat transfer lid configuration.

Figure 43:
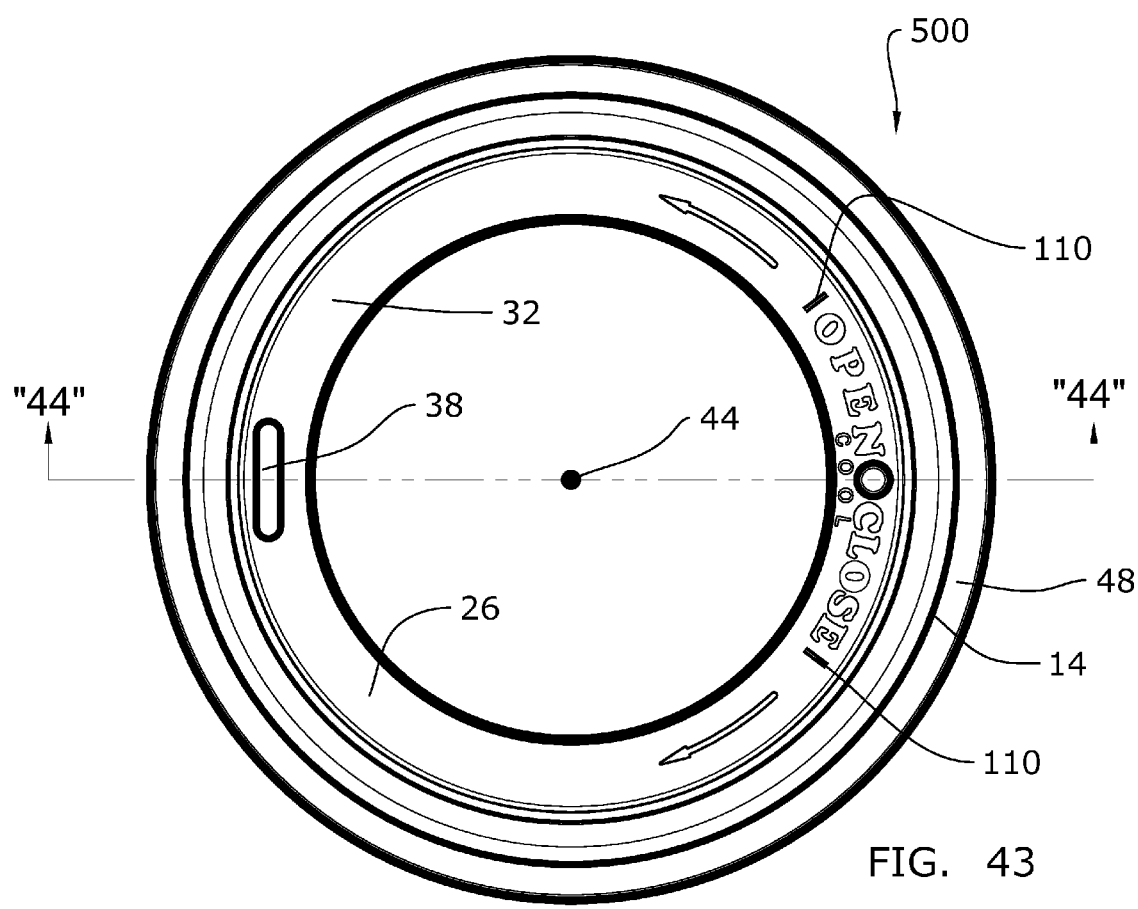

FIG. 43 is an assembled top plan view of the fifth beverage container lid assembly according to the present invention showing the anterior letting aperture formed in the secondary lid attachment of the fifth beverage container lid assembly.

Figure 44:
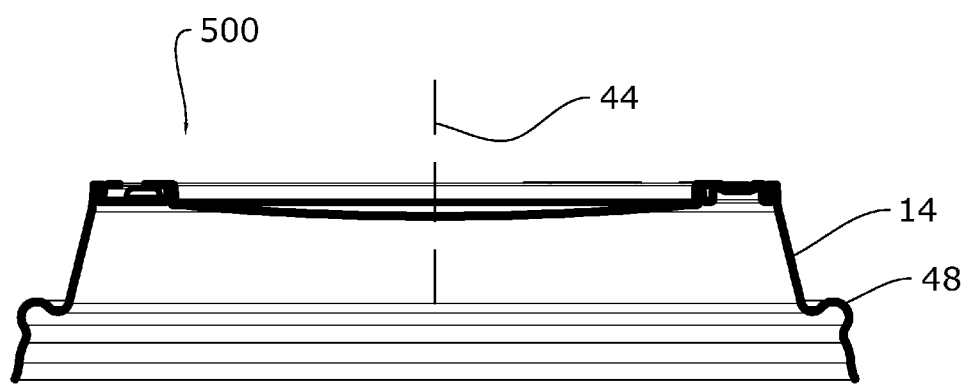

FIG. 44 is a first medial cross-sectional view of the fifth beverage container lid assembly according to the present invention as sectioned from FIG. 43.

Figure 45:
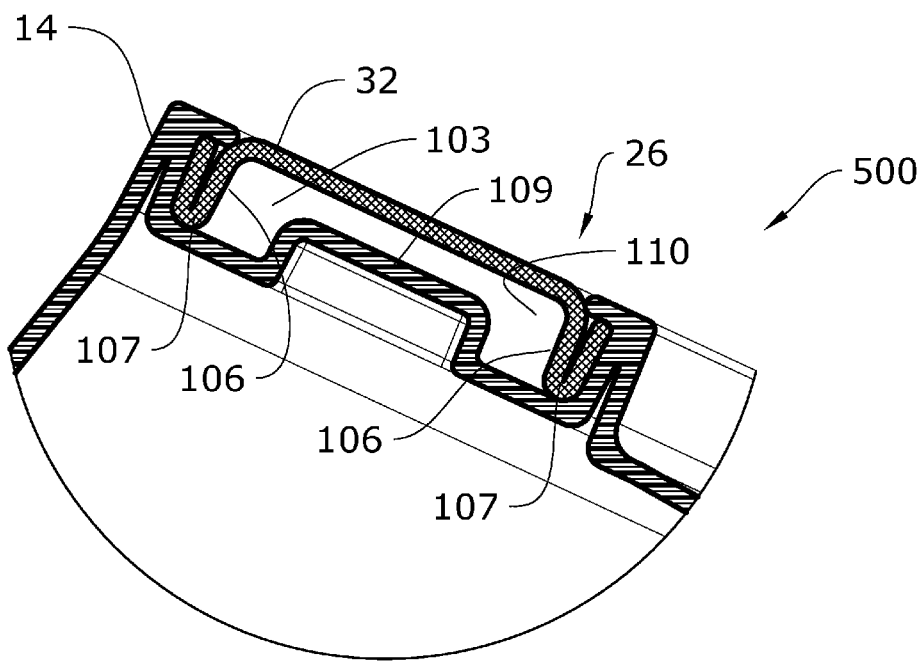
Figure 46:
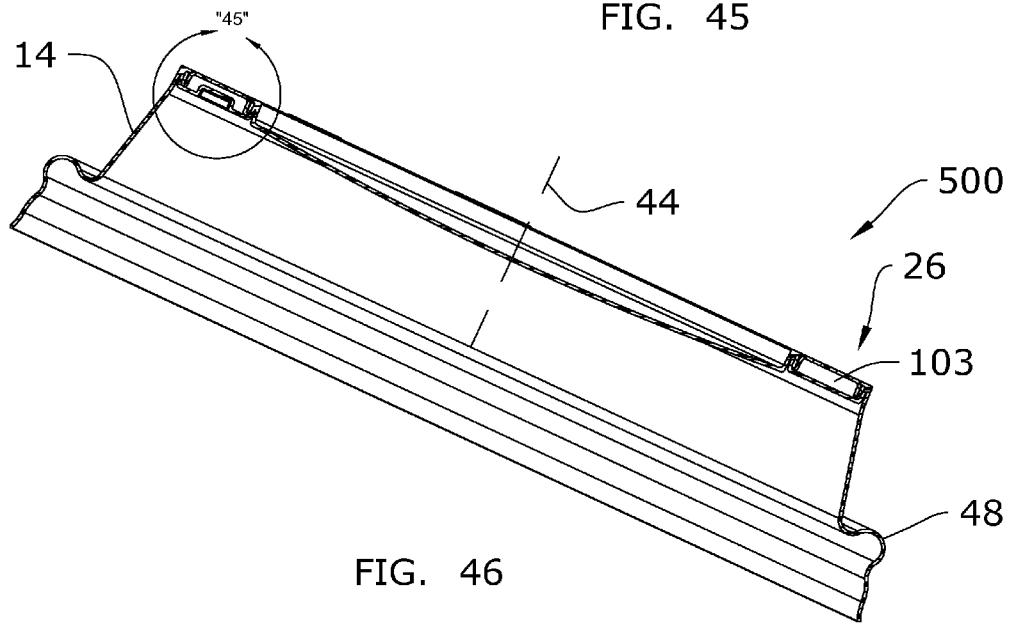

FIG. 45 is an enlarged fragmentary cross-sectional view of an attachment-to-form junction site of the fifth beverage container lid assembly according to the present invention showing the peripheral beverage-receiving flow channel of the secondary lid attachment in engagement with an attachment-receiving channel formed in the primary lid form as sectioned from FIG. 46.

FIG. 46 is an assembled lateral cross-sectional view of the fifth beverage container lid assembly according to the present invention to show the peripheral beverage-receiving flow channel of the secondary lid attachment in engagement with the attachment-receiving channel formed in the primary lid form.

FIG. 47 is a second medial cross-sectional view of the fifth beverage container lid assembly according to the present invention as sectioned from FIG. 43.

FIG. 47A is a first enlarged fragmentary cross-sectional view of an attachment-to-form junction site of the fifth beverage container lid assembly according to the present invention showing (a) the peripheral beverage-receiving flow channel of the secondary lid attachment in engagement with an attachment-receiving channel formed in the primary lid form and (b) a portion of a flow stop structure of the secondary lid attachment as sectioned from FIG. 47.

FIG. 47B is a second enlarged fragmentary cross-sectional view of an attachment-to-form junction site of the fifth beverage container lid assembly according to the present invention showing mated engagement of posterior protuberances cooperably formed with the primary lid form and the secondary lid attachment as sectioned from FIG. 47.

FIG. 48 is a first medial cross-sectional view of the secondary lid attachment of the fifth beverage container lid assembly according to the present invention.

FIG. 48A is a first enlarged fragmentary cross-sectional view of an anterior letting aperture site of the second lid attachment as sectioned from FIG. 48 showing in greater detail (a) the anterior letting aperture and (b) a radially double-walled construction of the secondary lid attachment.

FIG. 48B is a second enlarged fragmentary cross-sectional view of an upright posterior protuberance site of the secondary lid attachment as sectioned from FIG. 48 showing in greater detail (a) a downwardly extending first matable protuberance and (b) the radially double walled construction of the secondary lid attachment.

Figure 49B:
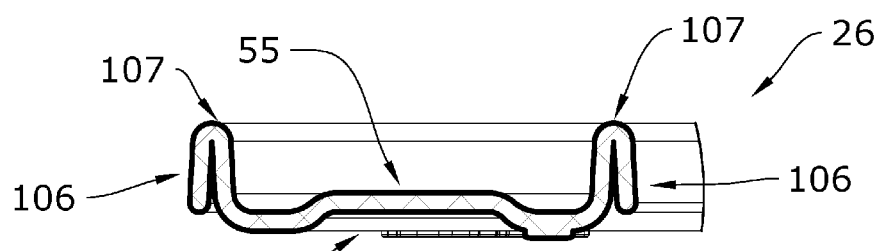
Figure 49A:
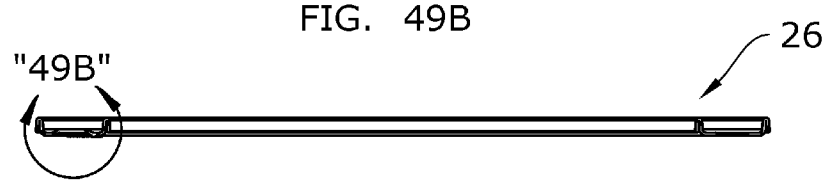
Figure 49:
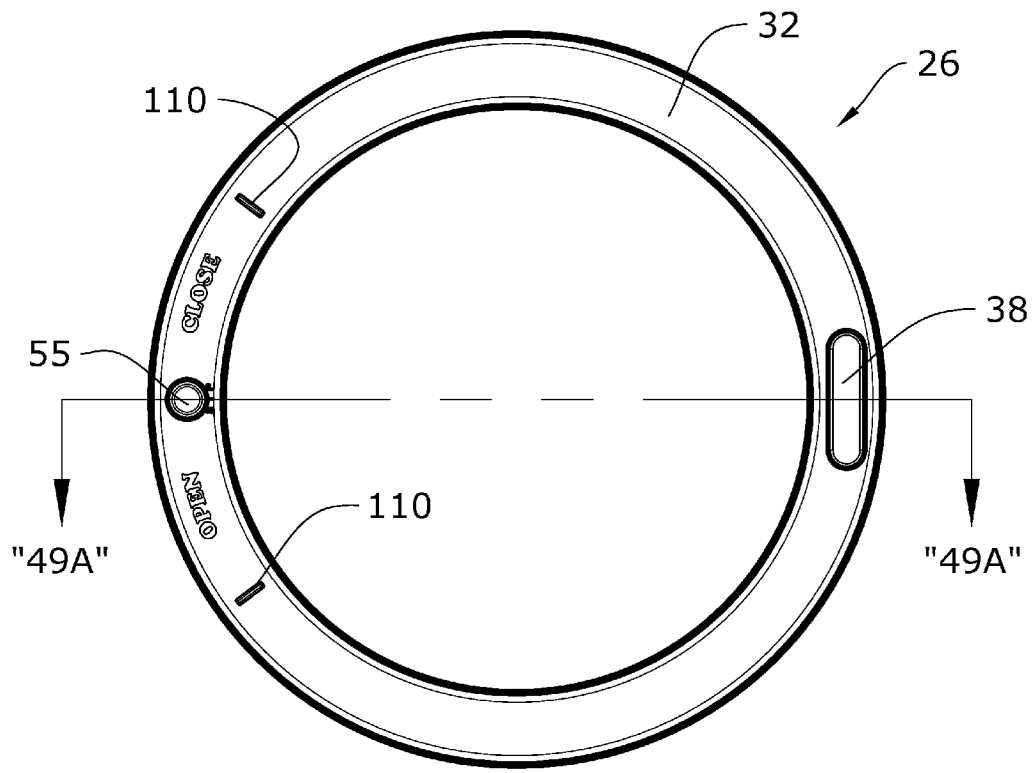

FIG. 49 is a first top plan view of the secondary lid attachment of the fifth beverage container lid assembly according to the present invention showing the anterior letting aperture formed in the secondary lid attachment of the fifth beverage container lid assembly.

FIG. 49A is a second medial cross-sectional view of the secondary lid attachment of the fifth beverage container lid assembly according to the present invention.

FIG. 49B is a second enlarged fragmentary cross-sectional view of an inverted posterior protuberance site of the secondary lid attachment as sectioned from FIG. 49A showing in greater detail (a) the first matable protuberance and (b) the radially double walled construction of the secondary lid attachment.

Figure 50A:
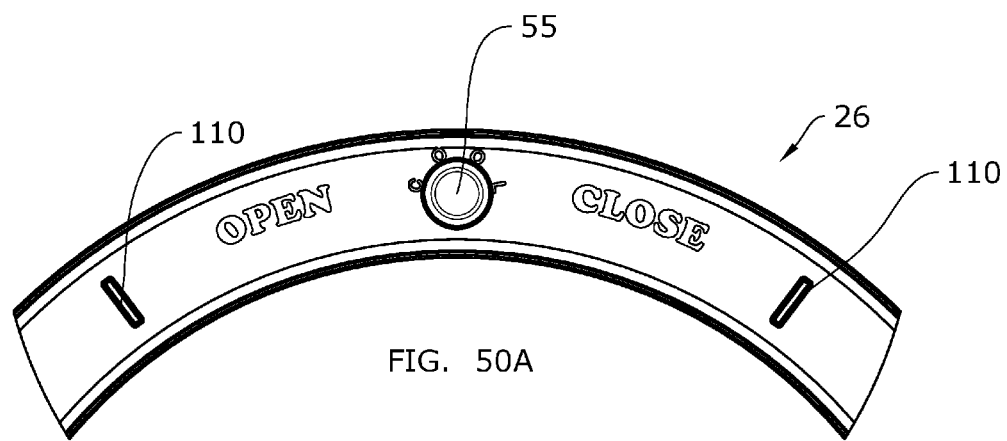
Figure 50:
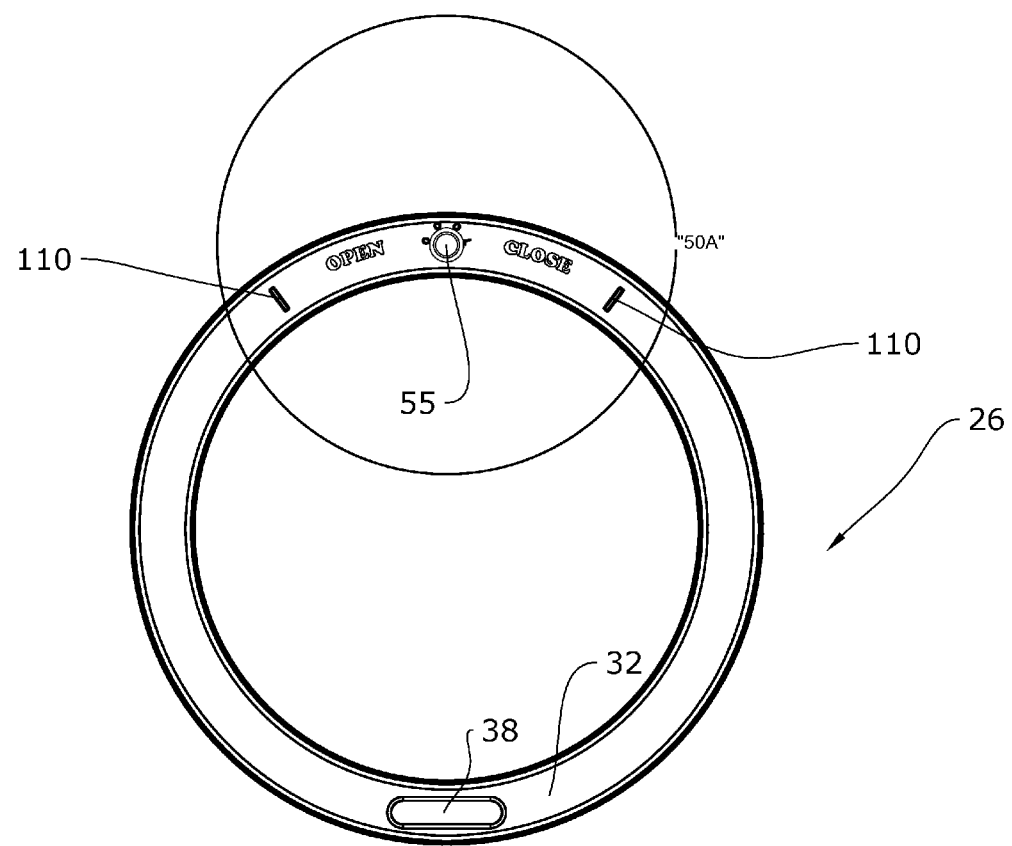

FIG. 50 is a second top plan view of the secondary lid attachment of the fifth beverage container lid assembly according to the present invention showing the anterior letting aperture formed in the secondary lid attachment of the fifth beverage container lid assembly.

FIG. 50A is an enlarged fragmentary sectional view of posterior portions of the secondary lid attachment as sectioned from FIG. 50 showing in greater detail (a) the first matable protuberance site and (b) opposed arc length stop structures of the secondary lid attachment.

Figure 51:
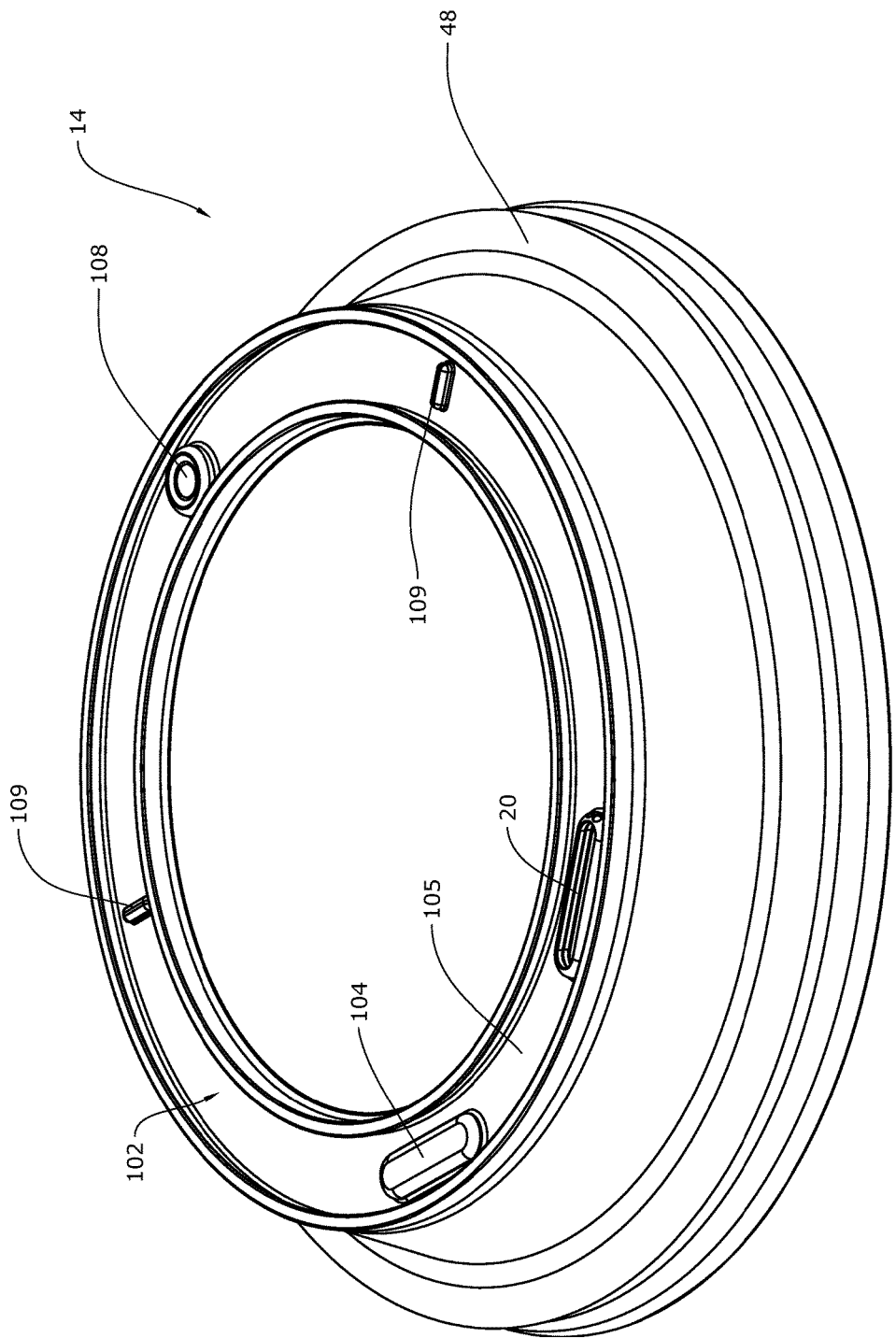

FIG. 51 is an enlarged top perspective view of the primary lid form of the fifth beverage container lid assembly according to the present invention showing an anterior primary beverage outlet, an anterior flow stop structure, a peripheral beverage-receiving flow channel, and a second posterior matable protuberance.

FIG. 52 is a diametric cross-sectional view of the fifth beverage container lid assembly according to the present invention schematically depicting an upper beverage-receiving flow channel.

FIG. 52A is a first enlarged fragmentary sectional view of the beverage-receiving flow channel of the fifth beverage container lid assembly as enlarged and sectioned from FIG. 52 to depict in greater detail the relative narrow top-to-bottom space within which beverage is received intermediate the upper secondary lid attachment and the lower primary lid form of the beverage-receiving flow channel.

Figure 52B:
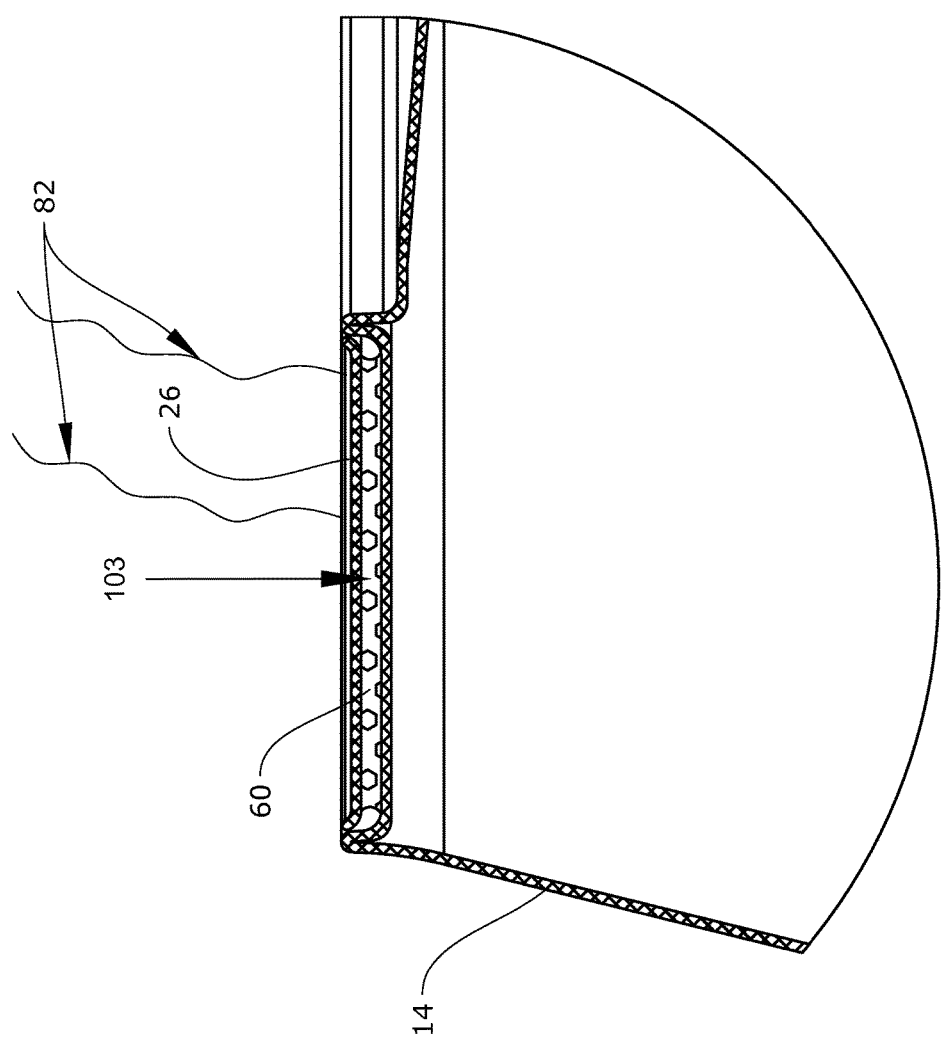

FIG. 52B is a second enlarged fragmentary sectional view of the beverage-receiving flow channel of the fifth beverage container lid assembly as enlarged and sectioned from FIG. 52A to depict in still greater detail the relative narrow top-to-bottom space within which beverage is received intermediate the upper secondary lid attachment and the lower primary lid form of the beverage-receiving flow channel.

FIG. 53 is an anterior edge elevational view of a sixth beverage container lid assembly according to the present invention.

FIG. 54 is a medial cross-sectional view of the sixth beverage container lid assembly according to the present invention showing an upper secondary lid attachment received in an attachment-receiving depression formed in a lower primary lid form of the sixth beverage container lid assembly.

FIG. 55 is a top plan view of the sixth beverage container lid assembly according to the present invention showing the upper secondary lid attachment received in the attachment-receiving depression formed in the lower primary lid form of the sixth beverage container lid assembly.

FIG. 56 is a bottom plan view of the sixth beverage container lid assembly according to the present invention.

FIG. 57 is a first exploded top perspective view of the sixth beverage container lid assembly according to the present invention showing the upper secondary lid attachment in a first rotative closed position relative to the attachment-receiving depression formed in the lower primary lid form of the sixth beverage container lid assembly.

FIG. 58 is a second exploded top perspective view of the sixth beverage container lid assembly according to the present invention showing the upper secondary lid attachment in a second rotative open position relative to the attachment-receiving depression formed in the lower primary lid form of the sixth beverage container lid assembly.

Figure 58A:
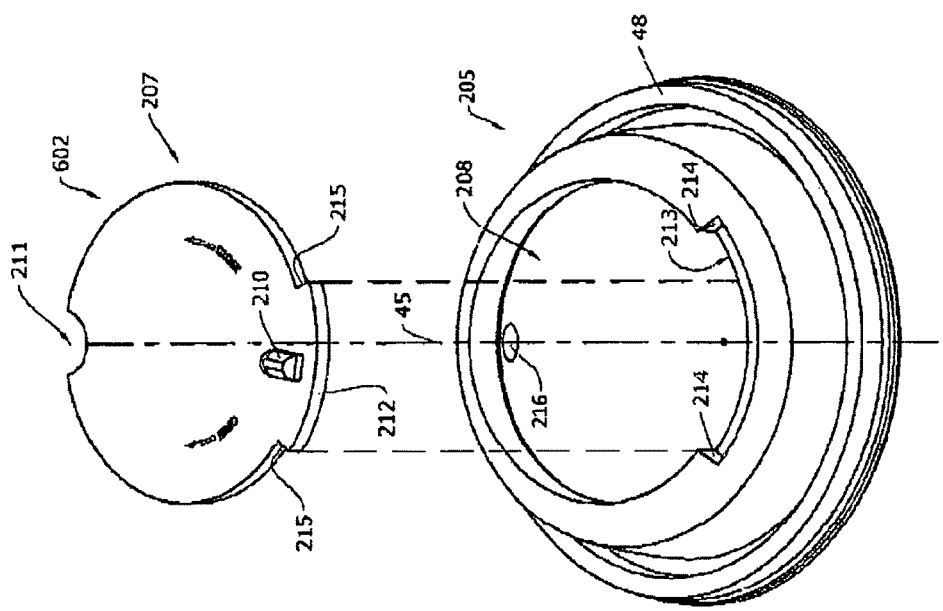

FIG. 58A is an exploded top perspective view of a first alternative sixth beverage container lid assembly according to the present invention showing a first alternative upper secondary lid attachment in an open position relative to the attachment-receiving depression formed in a first alternative lower primary lid form of the first alternative sixth beverage container lid assembly.

Figure 58B:
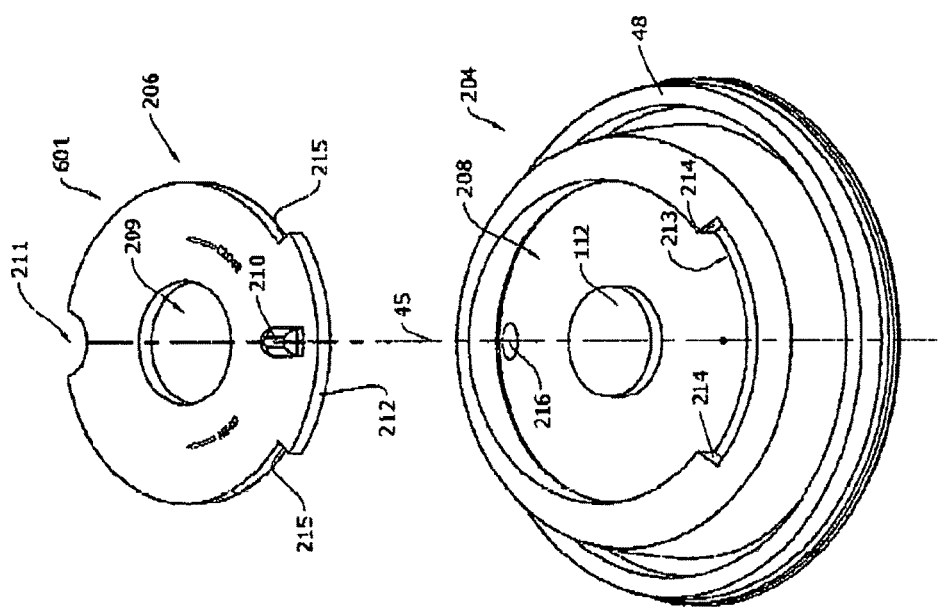

FIG. 58B is an exploded top perspective view of a second alternative sixth beverage container lid assembly according to the present invention showing a second alternative upper secondary lid attachment in an open position relative to the attachment-receiving depression formed in a second alternative lower primary lid form of the second alternative sixth beverage container lid assembly.

FIG. 58C is a top plan view of the first alternative upper secondary lid attachment of the first alternative sixth beverage container lid assembly according to the present invention showing a medial plane and with a tail element and manual engagement protuberance at an offset angle relative to the medial plane.

FIG. 58D is a top plan view of the second alternative upper secondary lid attachment of the second alternative sixth beverage container lid assembly according to the present invention showing a medial plane and with a tail element and manual engagement protuberance at an offset angle relative to the medial plane.

Figure 59:
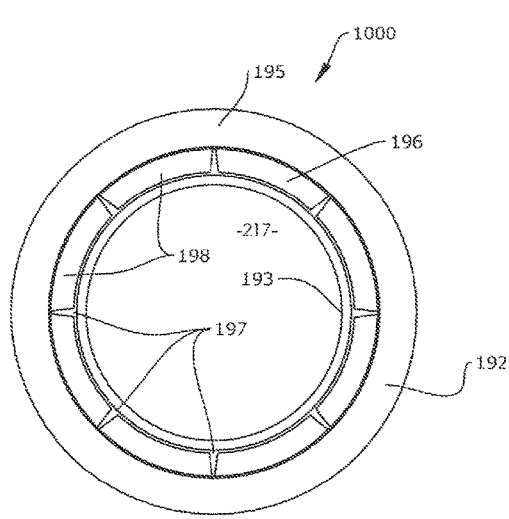

FIG. 59 is a(n exploded) top plan view of a first beverage container insert assembly according to the present invention.

Figure 60:
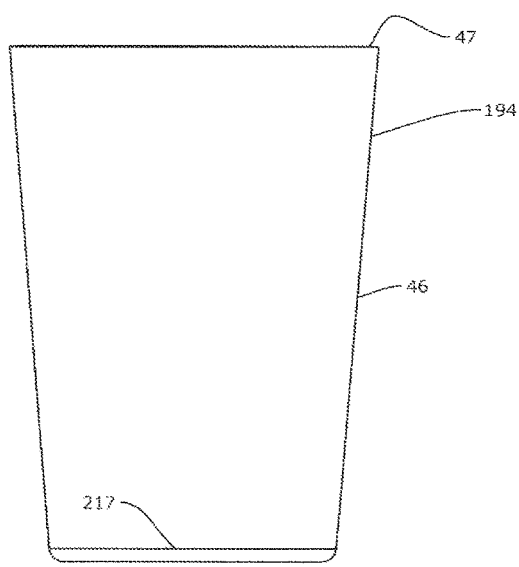

FIG. 60 is an exploded side elevational view of the first beverage container insert assembly according to the present invention showing a first upper container insert exploded from a first lower beverage container.

Figure 61:
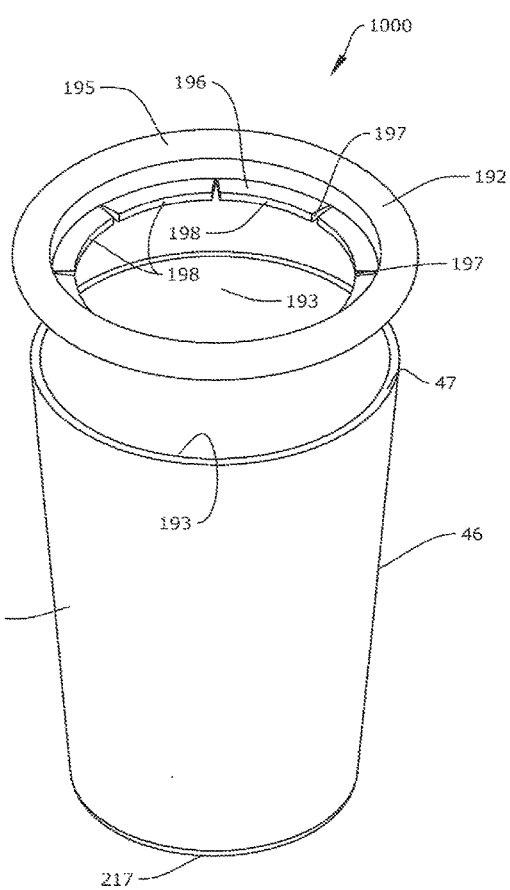

FIG. 61 is an exploded top perspective view of the first beverage container insert assembly according to the present invention showing the first upper container insert exploded from the first lower beverage container.

Figure 62:
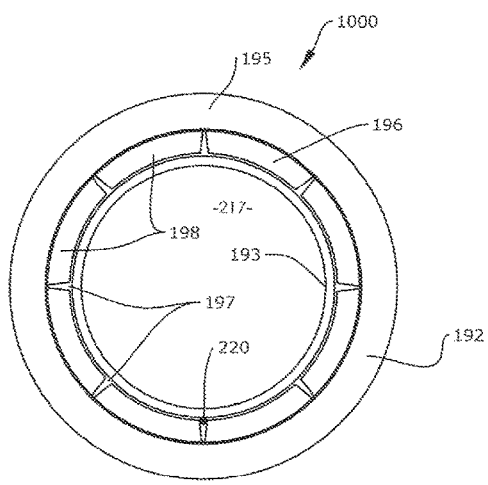

FIG. 62 is a(n assembled) top plan view of the first beverage container insert assembly according to the present invention with a beverage-damping second portion of a container insert of the first beverage container insert assembly being depicted in a relaxed configuration.

Figure 63:
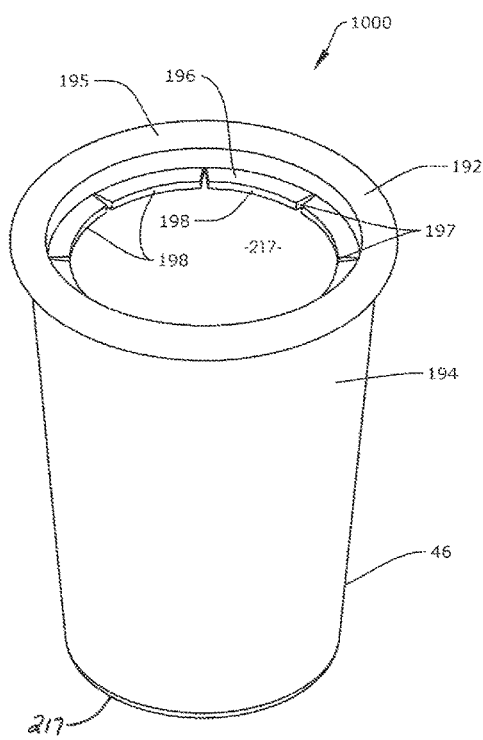

FIG. 63 is a first assembled top perspective view of the first beverage container insert assembly according to the present invention showing the first upper container insert in assembled relation relative to the first lower beverage container with the beverage-damping second portion of the container insert of the first beverage container insert assembly being depicted in the relaxed configuration.

Figure 64:
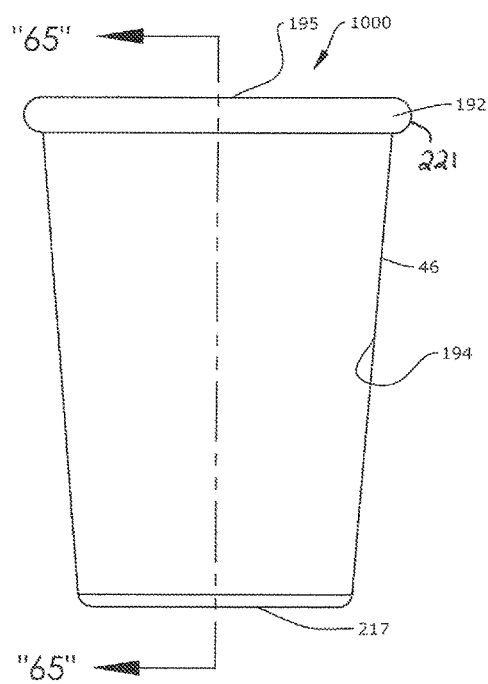

FIG. 64 is a first assembled side elevational view of the first beverage container insert assembly according to the present invention showing the first upper container insert in assembled relation relative the first lower beverage container.

Figure 65:
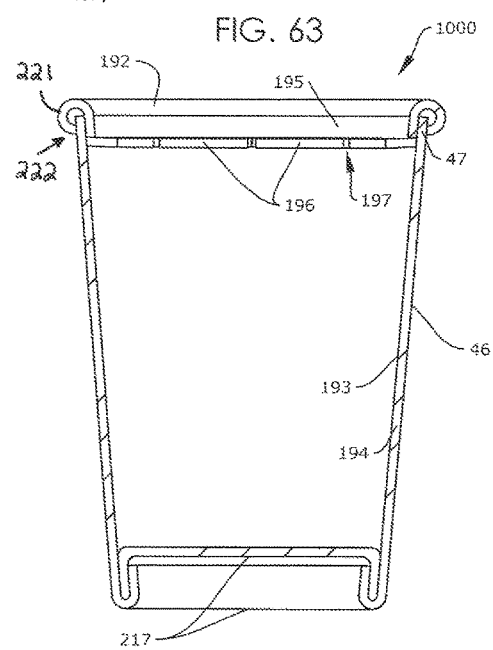

FIG. 65 is a first assembled longitudinal cross-sectional view of the first beverage container insert assembly according to the present invention showing the first upper container insert in assembled relation relative the first lower beverage container with the beverage-damping second portion of the container insert of the first beverage container insert assembly being depicted in the relaxed configuration.

FIG. 66 is a side elevational view of a series of four of the first beverage container insert assemblies according to the present invention.

FIG. 67 is a longitudinal cross-sectional view the series of four first beverage container insert assemblies according to the present invention as sectioned from FIG. 66, the top most beverage-damping second portion being depicted in the relaxed configuration, and the bottom three beverage-damping second portions being depicted in an resiliently actuated configuration.

FIG. 68 is a top perspective view of the series of four first beverage container insert assemblies according to the present invention, the top most beverage-damping second portion being depicted in the relaxed configuration.

FIG. 69 is a second assembled side elevational view of the first beverage container insert assembly according to the present invention showing the first upper container insert in assembled relation relative the first lower beverage container.

FIG. 70 is a second assembled longitudinal cross-sectional view of the first beverage container insert assembly according to the present invention showing the first upper container insert in assembled relation relative the first lower beverage container with the beverage-damping second portion of the container insert of the first beverage container insert assembly being depicted in the resiliently actuated configuration.

FIG. 71 is a second assembled top perspective view side elevational of the first beverage container insert assembly according to the present invention showing the first upper container insert in assembled relation relative to the first lower beverage container with the beverage-damping second portion of the container insert of the first beverage container insert assembly being depicted in the resiliently actuated configuration.

FIG. 72 is a third assembled side elevational view of the first beverage container insert assembly according to the present invention showing the first upper container insert in assembled relation relative the first lower beverage container.

FIG. 73 is a third assembled longitudinal cross-sectional view of the first beverage container insert assembly according to the present invention showing the first upper container insert in assembled relation relative the first lower beverage container with the beverage-damping second portion of the container insert of the first beverage container insert assembly being depicted resiliently returning to the relaxed configuration and with beverage being schematically depicted deflecting therefrom.

Figure 74:
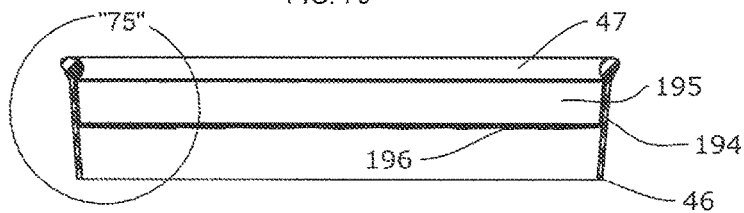

FIG. 74 is a fragmentary longitudinal cross-sectional view of upper portions of a second beverage container insert assembly according to the present invention showing the second upper container insert in assembled relation relative the second lower beverage container with the beverage-damping second portion of the container insert of the second beverage container insert assembly being depicted in a relaxed configuration.

Figure 75:
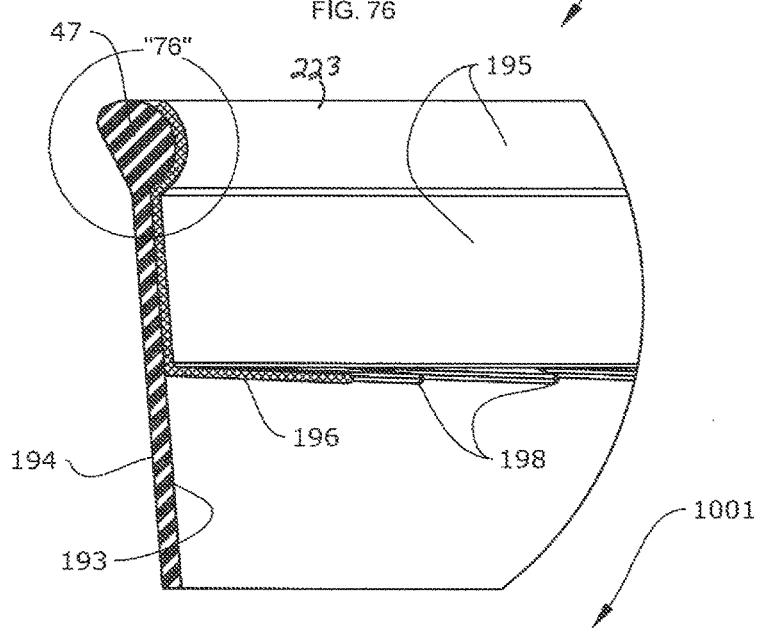

FIG. 75 is an enlarged fragmentary sectional view of an insert-to-container junction site of the second beverage container insert assembly as sectioned from FIG. 74 and showing the container-engaging or wall-engaging first portion of the container insert attached to the inner container surfacing in inferior adjacency to the upper container rim of the beverage container.

Figure 76:
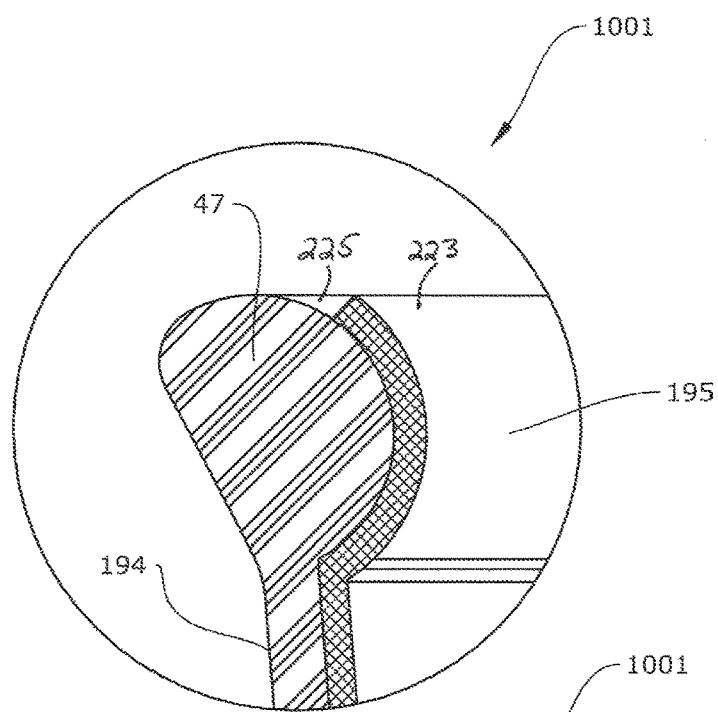

FIG. 76 is a fragmentary longitudinal cross-sectional view of upper portions of a third beverage container insert assembly according to the present invention showing the third upper container insert in assembled relation relative the third lower beverage container with the beverage-damping second portion of the container insert of the third beverage container insert assembly being depicted in a relaxed configuration.

FIG. 77 is a fragmentary longitudinal cross-sectional view of upper portions of a third beverage container insert assembly according to the present invention showing the third upper container insert in assembled relation relative the third lower beverage container with the beverage-damping second portion of the container insert of the third beverage container insert assembly being depicted in a relaxed configuration.

FIG. 78 is an enlarged fragmentary sectional view of an insert-to-container junction site of the third beverage container insert assembly as sectioned from FIG. 77 and showing the container-engaging or wall-engaging first portion of the container insert attached to the inner container surfacing in inferior adjacency to lower portions of a rim bead of the upper container rim of the beverage container.

Figure 79:
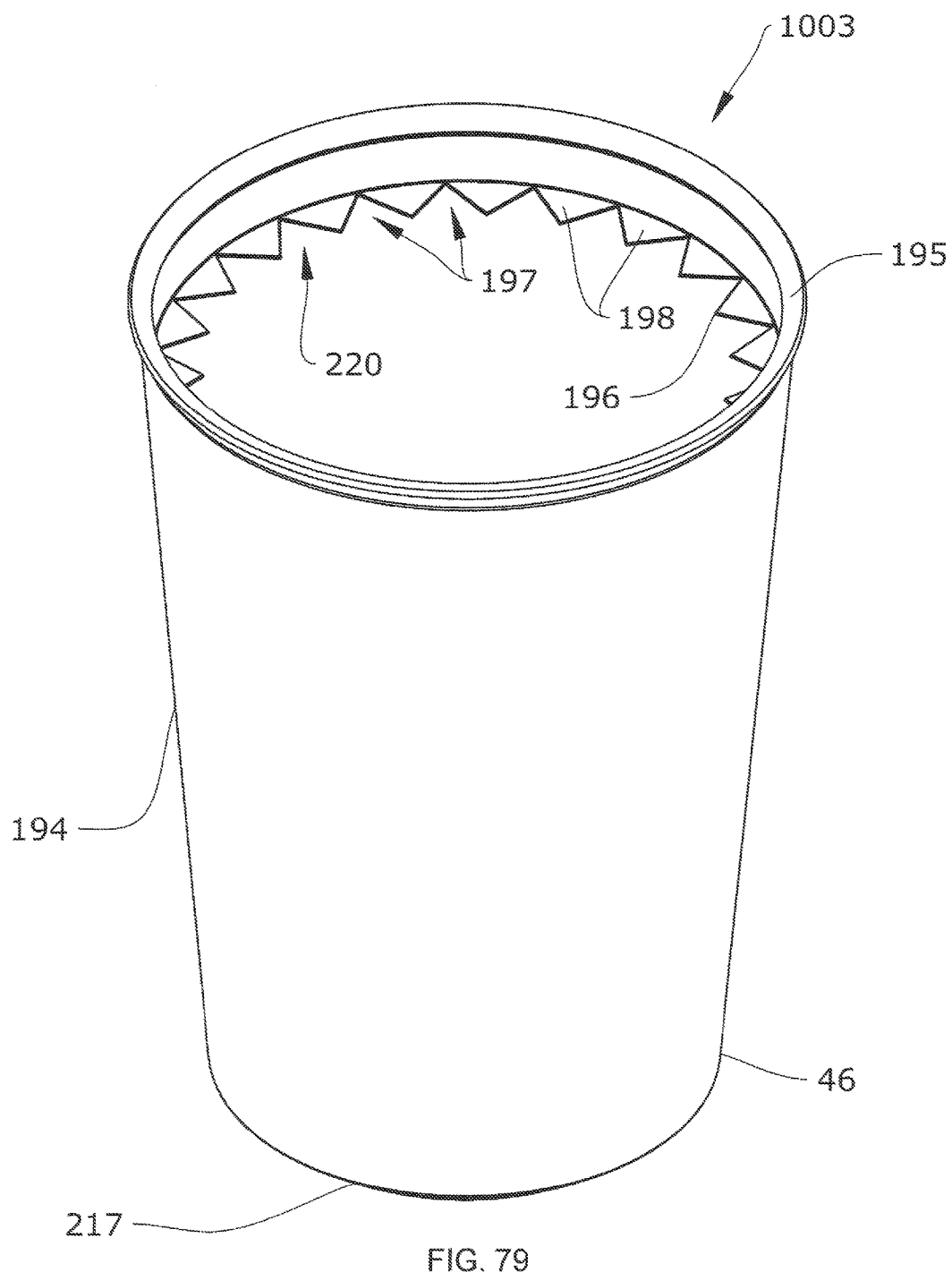

FIG. 79 is an enlarged assembled top perspective view of a fourth beverage container insert assembly according to the present invention showing the fourth upper container insert in assembled relation relative to the fourth lower beverage container with the beverage-damping second portion of the container insert of the fourth beverage container insert assembly being depicted in the relaxed configuration.

Figure 80A:
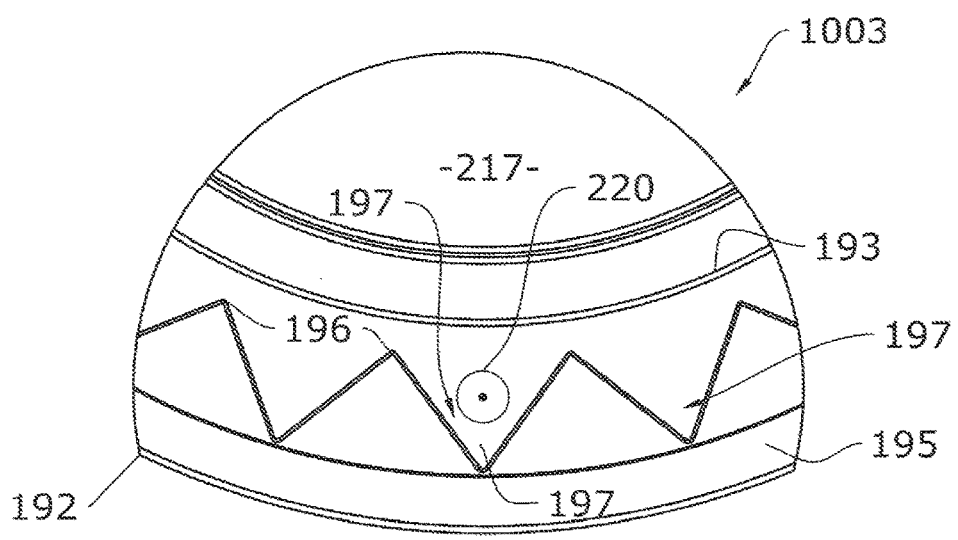
Figure 80:
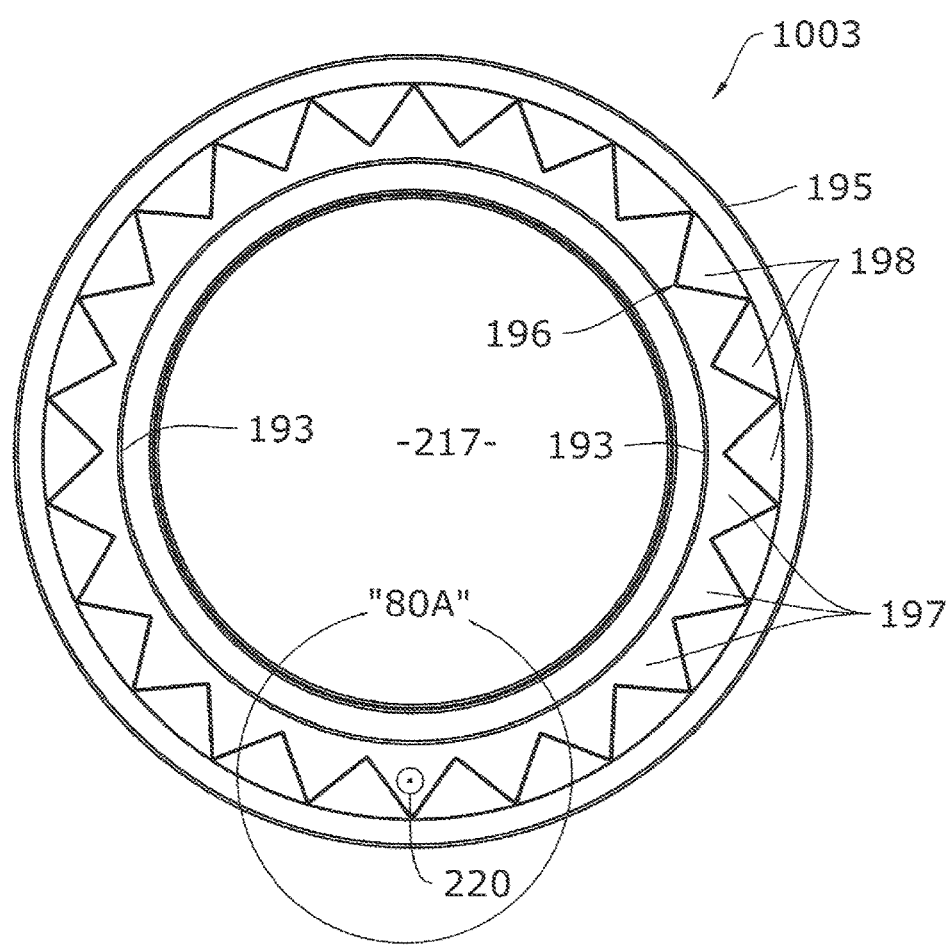

FIG. 80 is a top plan view of the fourth beverage container insert assembly according to the present invention with a beverage-damping second portion of the container insert of the fourth beverage container insert assembly being depicted in a relaxed configuration.

FIG. 80A is an enlarged fragmentary sectional view of an upper section of the fourth beverage container insert assembly as sectioned from FIG. 80 and showing in greater detail the serrated peak and trough formation of the beverage-damping second portion of the container insert of the fourth beverage container insert assembly being depicted in a relaxed configuration.

DETAILED DESCRIPTION OF THE PREFERRED EMBODIMENTS

Referring now to the drawings with more specificity, the following specifications generally describe a number of categorical (hot) beverage container lid assemblies or insert constructions for enabling a user to selectively and/or manually control beverage movement(s) from the stage of beverage containment to beverage consumption. The key aspects of all embodiments attempt thus to impart to the user an ability to more effectively control beverage movements for the purpose of effecting enhanced heat transfers and spillage prevention. Key categorical embodiments described hereinafter include a number of embodiments incorporating manual means for effecting rotation of a secondary lid element relative to a primary lid element and a number of means for damping beverage oscillations or redirecting beverage movements within a beverage container.

With regard to those embodiments incorporating certain manual means for effecting rotation of a secondary lid element relative to a primary lid element, the presently described invention provides beverage container lid assemblies or constructions as at 100, 200, 300, 400, 500, and 600 for enabling a user to selectively control beverage movement(s) therethrough. The beverage container lid assemblies 100, 200, 300, 400, 500, and 600 may all be said to essentially and preferably comprise a foundational, primary lid form as variously depicted and referenced at 10, 11, 12, 13, 14, and 15. Each of the primary lid forms 10, 11, 12, 13, 14, and 15 preferably and essentially comprises a primary beverage outlet as at outlet(s) 16, 17, 18, 19, 20, and 21, and a circular transverse cross-section as generally depicted in FIGS. 1, 27, 43, 53, and 59.

The rotational type beverage lid assemblies 100, 200, 300, 400, 500, and 600 according to the present invention all further preferably comprise a secondary lid attachment as at attachments 22, 23, 24, 25, 26 and 27. All of the secondary lid attachments 22, 23, 24, 25, 26, and 27 are cooperably and respectively attached to some portion of the circular transverse cross-section of the primary lid form(s) 10, 11, 12, 13, 14, and 15, and provide at least one beverage flow diversion or beverage-damming structure as at structures 28, 29, 30, 31, 32, and 33. Each of the structures 28, 29, 30, 31, 32, and 33 preferably comprises at least one letting aperture as at apertures 34, 35, 36, 37, 38, and 39.

Involving some rotational aspect, the rotational type beverage lid assemblies 100, 200, 300, 400, 500, and 600 according to the present invention all further preferably and respectively comprise a lid axis of rotation as at axes 40, 41, 42, 43, 44, and 45. The secondary lid attachments as at attachments 22, 23, 24, 25, 26, and 27 are respectively rotatable relative to the primary lid form 10, 11, 12, 13, 14, and 15 about the lid axes of rotation 40, 41, 42, 43, 44, and 45.

Usable in combination with a beverage container as generically depicted at 46, the rotational type beverage lid assemblies 100, 200, 300, 400, 500, and 600 according to the present invention all further preferably and respectively comprise certain container attachment means for non-rotatably attaching a select structure to an upper rim 47 of the beverage container 46, which select structure is respectively selected from the group consisting of either a primary lid form as selected from the forms 10, 11, 12, 13, 14, and 15 or a secondary lid attachment as selected from the attachment(s) 22, 23, 24, 25, 26, and 27. In other words, either a select primary lid form non-rotatably attaches to the container 46 directly or a select secondary lid attachment non-rotatably attaches to the container 46 directly.

It is contemplated that the container attachment means for non-rotatably attaching a select structure to an upper rim 47 of the beverage container 46 may be preferably exemplified by a primary rim-receiving groove or rim-engaging structure as at 48 formed in the select structure. In the case of embodiment assemblies 100, 300, 400, 500, and 600, it is contemplated that the container attachment means as exemplified by a primary rim-receiving groove 48 may be preferably and cooperably associated with the primary lid forms 10, 12, 13, 14, and 15; and that the container attachment means exemplified by a primary rim-receiving groove 48 are preferably and cooperably associated with the secondary lid attachment 23 of assembly 200.

It will thus be understood that assemblies 100, 300, 400, 500 and 600 may be viewed as preferably attaching to the upper rim(s) 47 of the beverage container(s) 46 by way of the primary rim-engaging groove or structure 48 cooperably associated or formed as part of the primary lid forms 10, 12, 13, 14, and 15 and that lid assembly 200 may be viewed as preferably attaching to the upper rim 47 of a beverage container 46 by way of the rim-engaging groove or structure 48 cooperably associated or formed as part of the secondary lid attachment 23. In other words, the primary lid forms 10, 12, 13, 14, and 15 and secondary lid attachment 23 preferably do not rotate relative to the beverage container(s) 46.

It will thus be understood that of the several beverage container lid assemblies, beverage container lid assembly 200 is the only illustrated assembly that attaches to a beverage container directly via the secondary lid attachment as at attachment 23 and not the primary lid form as at form 11. The lid assembly 200 thus preferably comprises a primary lid form 11 that rotates relative to the secondary lid attachment 23, which primary lid form 11 comprises an upper, secondary rim-receiving groove or rim-engaging structure as at 49. The upper, secondary rim-receiving or rim-engaging structure 49 mimics the form and function of the lower, primary rim-receiving or rim-engaging structure 48 but is rotative relative to the upper-outer surfacing 50 of primary rim-receiving groove or rim-engaging structure 48 of the secondary lid attachment 23.

In other words, the container attachment means of assembly 200 non-rotatably attach the secondary lid attachment 23 to the beverage container 46, and certain manually operable means enable the user to manually locate the at least one beverage flow diversion structure 29 relative to the primary beverage outlet 17. In the case of assembly 200, the outer lid surfacing 51 of the primary lid form 11 may be frictionally engaged by a user's hand and rotated relative to the secondary lid attachment 23 for manually (via one's hand) orienting the beverage flow diversion structure 29 relative to the primary beverage outlet 17.

The reader may well consider that certain manually operable means are cooperably associated with each of the assemblies 100, 200, 300, 400, 500, and 600, which means enable the user to selectively and respectively, rotatably and manually locate the at least one beverage flow diversion structure(s) 28, 29, 30, 31, 32, and 33 relative to the primary beverage outlet(s) 16, 17, 18, 19, 20, and 21. The manually operable means are operable via manual (or hand) engagement of certain outer lid surfacing, and thus the beverage container lid assemblies 100, 200, 300, 400, 500, and 600 according to the present invention enable the user to selectively control beverage flow rates or movements from the beverage container 46 via the beverage flow diversion structure(s) 28, 29, 30, 31, 32, and 33.

In the cases of beverage container lid assemblies 100, 300, 400, 500 and 600, the preferred container attachment means are exemplified by primary rim-receiving groove(s) or rim-engaging structures 48 associated with or integrally formed with primary lid forms 10, 12, 13, 14, and 15, which structures 48 non-rotatably attach the primary lid form(s) 10, 12, 13, 14, and 15 to upper rims 47 of the beverage container(s) 46. The manually operable means of assemblies 100, 300, 400, 500, and 600 further enable the user to manually locate the beverage flow diversion structure(s) 28, 29, 30, 31, 32, and 33 relative to the primary beverage outlet(s) 16, 18, 19, 20, and 21.

The manually operable means of assemblies 100, 300, 400, 500, and 600 may be preferably defined by at least one manually engageable protuberance such as a knob or raised construction. The manually engageable protuberances of lid assemblies 100, 300, 400, 500, and 600 are preferably and cooperably associated or integrally formed with the secondary lid attachments 22, 24, 25, 26, and 27 and respectively depicted and referenced at protuberances 52, 53, 54, 55, and 56.

In the case of assembly 500, the protuberance 55 extends or protrudes downwardly and provides a hollow 57 upwardly into which one's finger may be inserted and force(s) exerted thereby, whereas the protuberances 52, 53, 54 and 56 all extend or protrude upwardly for manual engagement. The element or protuberance 55 cooperably associated with the secondary lid attachment 26 mates with structure or a protuberance 108 having an upper hollow and cooperably associated with the primary lid form 14 as generally depicted in FIG. 47B. The matable protuberances or elements 55 and 108 enhance the user's ability to rotatably locate the secondary lid attachment 26 relative to primary lid form 14 in an intermediate position for cooling beverage 60 prior to consumption.

The manually operable means cooperably associated with assemblies 100, 300, 400, and 600 enable the user to manually locate the respective beverage flow diversion structure(s) 28, 30, 31, and 33 relative to the primary beverage outlet(s) 16, 18, 19, and 21 are each further preferably defined by at least two circumferentially-spaced upwardly-extending protuberances (as at protuberances 52, 53, 54 and 56) attached to or integrally formed with the secondary lid attachment(s) 22, 24, 25, and 27. In the case of lid assembly 100, the at least two circumferentially spaced upwardly extending protuberances 52 are received in at least two circumferentially spaced arc length apertures as at 58 formed in the primary lid form 10. In the case of lid assembly 400, the upwardly extending protuberances 54 are received in a single arc length aperture as at 59 formed in the primary lid form 13.

In the case of assembly 300, the upwardly extending protuberances 53 extend upwardly intermediate the opposed arc length termini 69 of a raised upper arc length formation or form 63 of primary lid form 12. The opposed arc length termini 60 basically provide stop structure for limiting the user ability to rotate the secondary lid attachment 24 relative to the primary lid form 12. These structural arrangements enhance the user's ability to selectively open and close the beverage container lid assembly 300. The beverage container lid assembly 300 is depicted in the closed position in FIGS. 19, 25, and 27.

It will be understood that the primary lid forms 10, 11, and 12 each preferably comprise a raised upper arc length form as at 61, 62, and 63, and that the secondary lid attachments 22, 23, and 24 each preferably comprise at least one raised lower arc length form as at 64, 65, and 66. The raised upper arc length forms 61, 62, 63 and raised lower arc length forms 64, 65, and 66 are respectively nestable and each respectively comprise opposed arc length termini as at upper termini 67, 68, and 69, and lower termini 70, 71, and 72. The opposed arc length termini as at upper termini 67, 68, and 69 and lower termini 70, 71, and 72 together cooperatively provide rotational stop structure for limiting rotation of the secondary lid attachment(s) 22, 23, and 24 relative to the primary lid form(s) 10, 11, and 12.

The raised lower arc length forms 64, 65, and 66 each further preferably comprise at least one beverage flow stop or plug structure as at stop or plug structures 73, 74, and 75.

The letting aperture(s) as at 34, 35, and 36, and the flow stop or plug structure(s) as at 73, 74, and 75 are preferably located intermediate the opposed arc length termini as at termini 70, 71, and 72 of the lower arc length form(s) 64, 65, and 66 for enabling the user to selectively close the lid assemblies 100, 200, and 300. The circumferentially spaced upwardly extending protuberances 52 of assembly 100 are in circumferentially spaced adjacency to the opposed arc length termini as at upper termini 67 for enhancing the effective moment of force and thus the user's ability to selectively open and close the lid assembly 100.

In the case of assemblies 100 and 200, the lower arc length form(s) each preferably comprise a radially directed beverage flow return slope structure as at 76 and 77 respectively. The radially directed beverage flow return slope(s) 76 and 77 basically function to respectively direct compartmentalized beverage flow 60 toward beverage-receiving flow channel(s) 78 and 79. In this regard, it will be noted that the primary lid form(s) 10 and 11, and the secondary lid attachments 22 and 23 each preferably comprise a radially centralized, downwardly-bowed portion as at 80 and 81, respectively.

The secondary lid attachment(s) 22 and 23 are attached in inferior adjacency to the primary lid form(s) 10 and 11, and the radially centralized, downwardly-bowed portions 80 and 81 of the primary lid form(s) 10 and 11, and the secondary lid attachments 22 and 23 provide an upper lid boundary and a lower lid boundary, which upper and lower lid boundaries define the beverage-receiving flow channel(s) 78 and 79. The beverage-receiving flow channel(s) 78 and 79 basically function to effect or cause heat transfer as at 82 from compartmentalized beverage 60 received therein (via the letting aperture(s) 34 and 35) prior to outletting as at arrows 85 outlet beverage 83 via the primary beverage outlet(s) 16 and 17 for beverage consumption by the user.

The secondary lid attachments 22 and 23 according to the present invention are preferably outfitted upon the primary lid forms 10 and 11 so as to form beverage-receiving flow channels as at 78 and 79 intermediate the secondary lid attachments 22 and 23 and the primary lid forms 10 and 11 for directing hot compartmentalized beverage 60 through the channels 78 and 79 for effecting heat transfer as at 82 from the hot beverage 60 through the material constructions of the secondary lid attachments 22 and 23 and primary lid forms 10 and 11. The beverage-receiving flow channels 78 and 79 are believed to enhance and/or expedite heat transfer 82 from the hot compartmentalized beverage 60 prior to exiting the primary beverage outlets 16 and 17.

The assemblies 100 and 200 thus define certain beverage-receiving flow channels as at 78 and 79, which beverage-receiving flow channels 78 and 79 are located intermediate an upper-outer material layer as may be exemplified by the material construction of the primary lid forms 10 and 11 and a lower-inner material layer as may be exemplified by the material construction of the secondary lid attachments 22 and 23. In sum, together the primary lid forms 10 and 11 and secondary lid attachments 22 and 23 define beverage-receiving flow channels 78 and 79 designed to effect enhanced heat transfer 82 from the hot beverage 60 prior to exiting the primary beverage outlets 16 and 17.

The lower-inner material layer(s) or portion(s) 81 of the secondary lid attachments 22 and 23 preferably mimic the contour of the upper-outer material layer(s) or portion(s) 80 of the primary lid forms 10 and 11 in cross-section as generally and comparatively depicted in FIGS. 4, 7, 12, and 15-18. The mimicking lower-inner material layer(s) as at portion(s) 81 and upper-outer material layer(s) or portions 80 essentially minimize the volumetric space of the beverage-receiving flow channels 78 and 79 and provide a relatively narrow or tight for effecting enhanced heat transfer 82 from the beverage 60 prior to its outlet from the primary beverage outlets 16 and 17.

Figure 2:
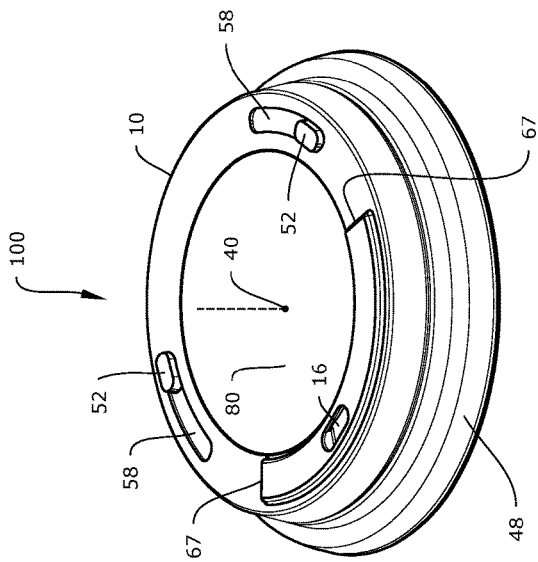
FIG. 2 is an assembled top perspective view of the first beverage container lid assembly according to the present invention showing the first beverage container lid assembly in the first open configuration.
Figure 4:
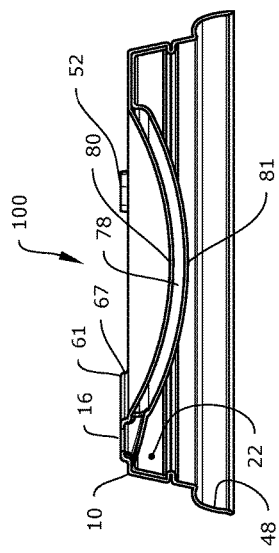
FIG. 4 is an assembled lateral cross-sectional view of the first beverage container lid assembly according to the present invention as sectioned from FIG. 3 to show in greater detail a beverage flow-receiving channel between an upper primary lid form and a lower secondary lid attachment of the first beverage container lid assembly.
Figure 1:
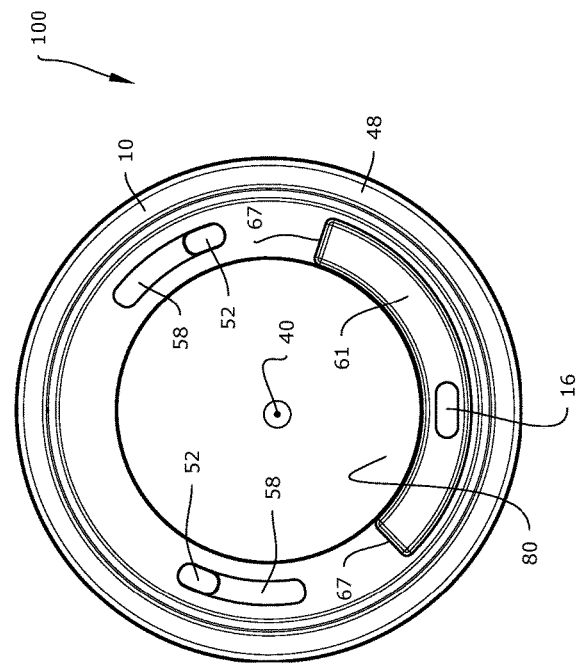
FIG. 1 is an assembled top plan view of a first beverage container lid assembly according to the present invention showing the first beverage container lid assembly in a first open configuration.
Figure 3:
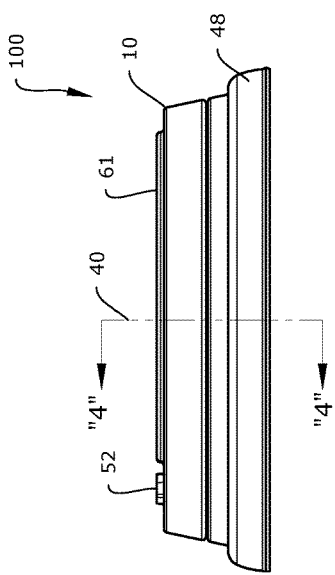
FIG. 3 is an assembled anterior edge elevational view of the first beverage container lid assembly according to the present invention showing the first beverage container lid assembly in the first open configuration.
Figure 8:
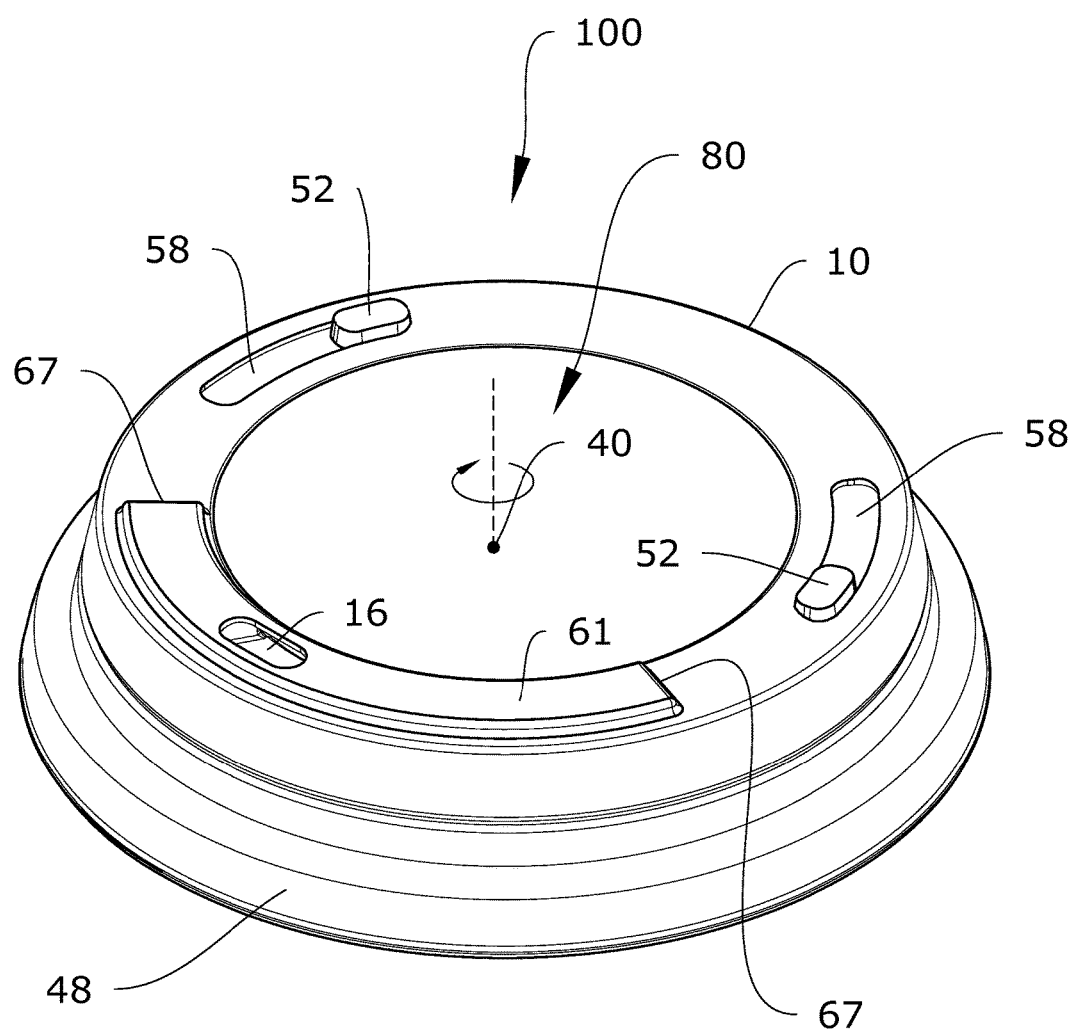
FIG. 8 is an enlarged assembled top perspective view of the first beverage container lid assembly according to the present invention showing the first beverage container lid assembly in the first open configuration.
Figure 9:
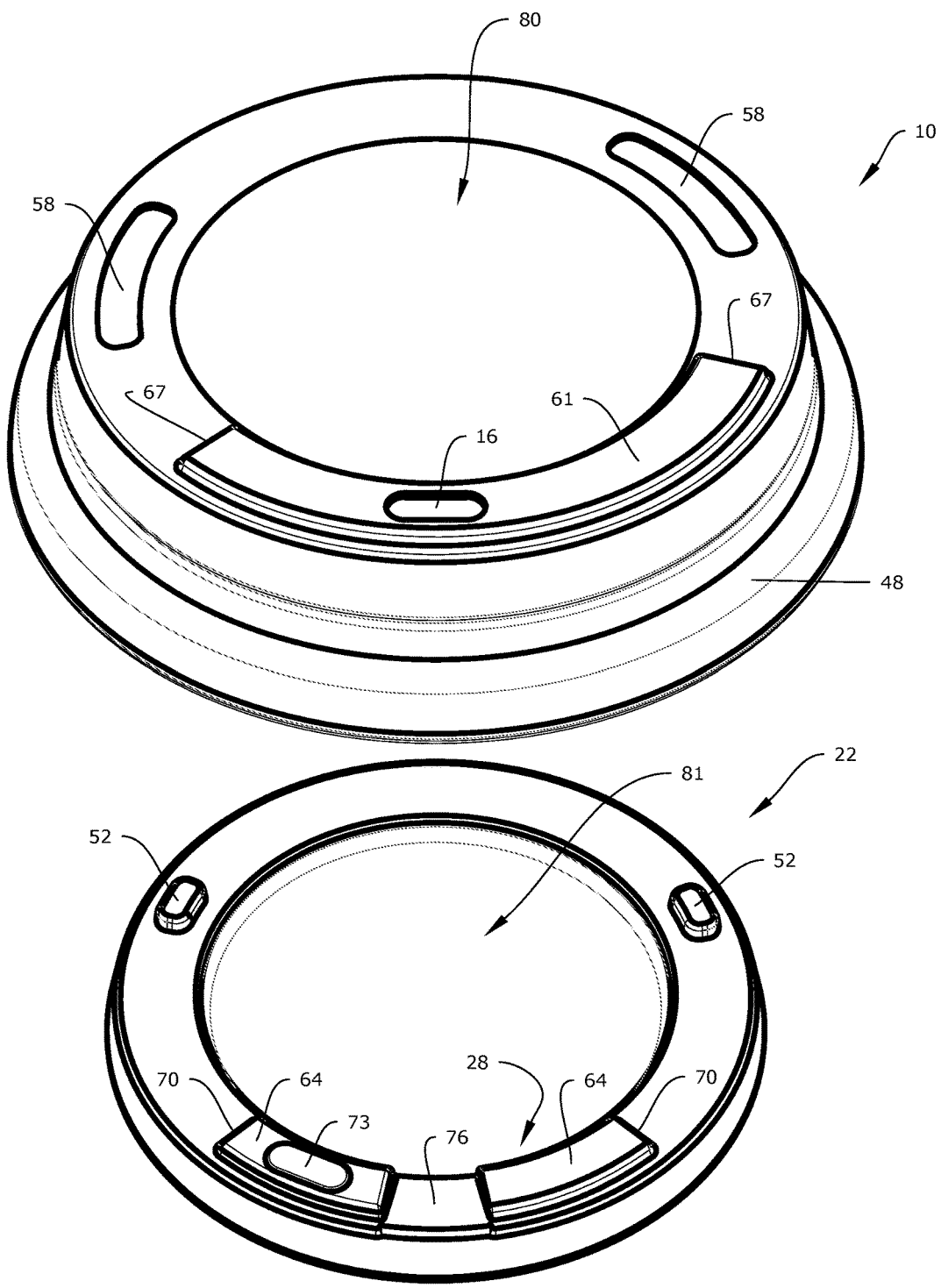
FIG. 9 is an enlarged exploded top perspective view of the first beverage container lid assembly according to the present invention showing the upper primary lid form exploded from the lower secondary lid attachment of the first beverage container lid assembly.
Figure 13:
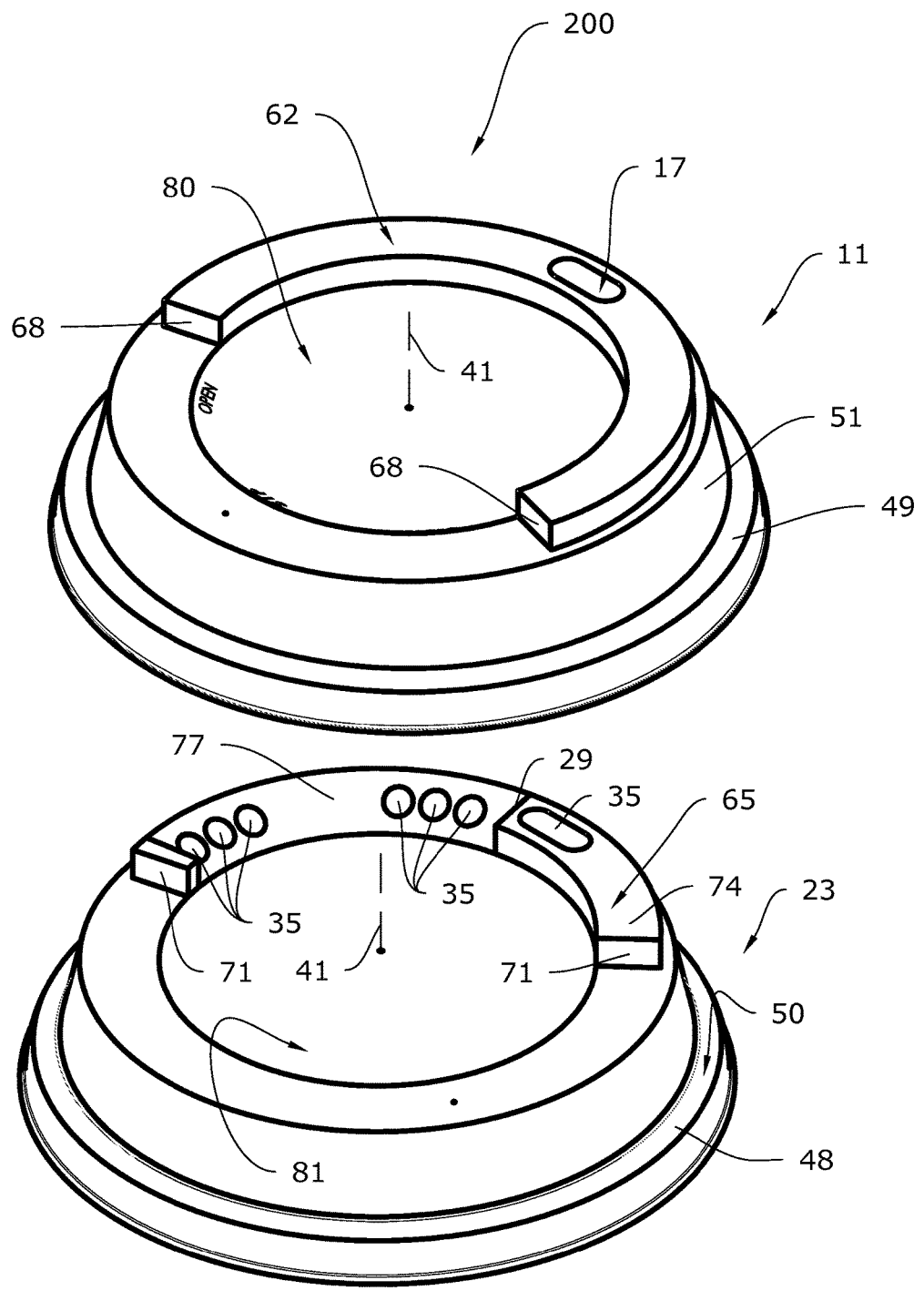
FIG. 13 is an enlarged exploded top perspective view of the second beverage container lid assembly according to the present invention showing the upper primary lid form exploded from the lower secondary lid attachment of the second beverage container lid assembly.
Figure 15:
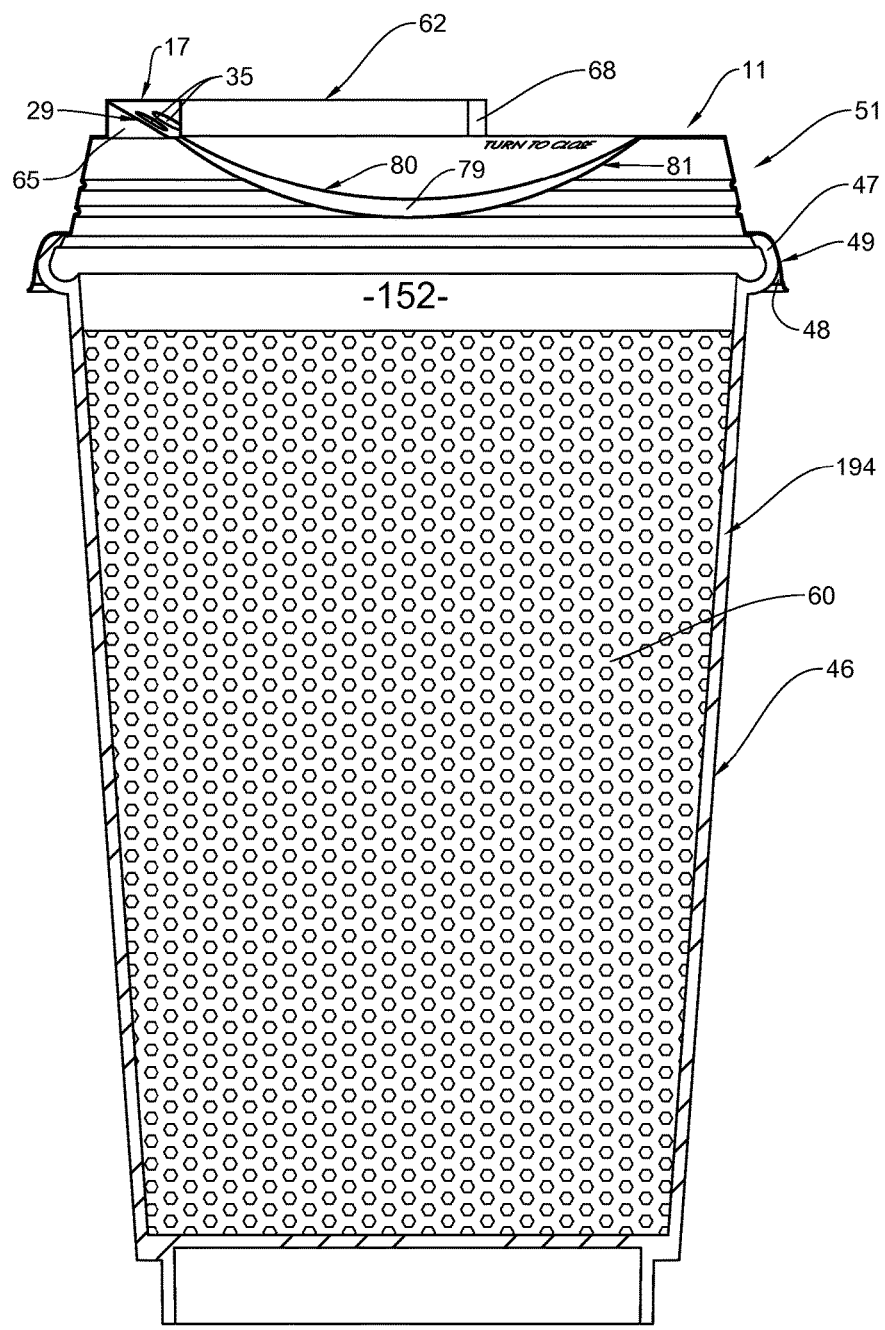
FIG. 15 is a first sequential schematic longitudinal cross-sectional type depiction of a beverage container outfitted with the second beverage container lid assembly according to the present invention shown in a vertical orientation before beverage is redirected toward the primary beverage outlet.

Referencing FIGS. 15-18, the reader will consider a number of sequential views depicting the function of the beverage-flow channel(s) 78 and 79 as exemplified by channel 79 according to the present invention. FIG. 15 is a first sequential diagrammatic longitudinal cross-sectional type depiction of a beverage container 46 outfitted with lid assembly 200 according to the present invention shown in a vertical orientation before beverage 60 is redirected toward the primary beverage outlet 17. FIG. 16 is a second sequential diagrammatic longitudinal cross-sectional type depiction of a beverage container 46 outfitted with the lid assembly 200 shown in a first angle of inclination off of a vertical orientation for inletting (as at arrow 84) beverage 60 via letting apertures 35 into the beverage-cooling or beverage-receiving flow channel 79.

FIG. 17 is a third sequential diagrammatic longitudinal cross-sectional type depiction of the beverage container 46 outfitted with the beverage container lid assembly 200 again shown in a vertical orientation with beverage 60 received and pooled within the beverage-cooling or beverage-receiving flow channel 79. FIG. 18 is a fourth sequential diagrammatic longitudinal cross-sectional type depiction of the beverage container 46 outfitted with the beverage container lid assembly 200 shown in an angle of inclination off of a vertical orientation for outletting (as at arrows 85) cooled beverage 83 via the primary beverage outlet 17.

Turning now to beverage container lid assembly 300, the reader may well consider that the raised lower arc length form 66 of secondary lid attachment 24 preferably comprises circumferentially spaced rail portions 86 intermediate the opposed arc length (lower) termini 72 and the circumferentially spaced upwardly extending protuberances 53. The opposed arc length termini 69 of the raised upper arc length form 63 preferably comprise rail-receiving notches as at 87. The circumferentially spaced rail portions 86 are received in the rail-receiving notches 87 and guidable thereby for enhancing the user's ability to selectively open and close the lid assembly 300.

As indicated above, the primary lid form 13 of beverage container lid assembly 400 preferably comprises an arc length aperture as at aperture 59, and the secondary lid attachment 25 may further preferably comprise a raised lower arc length form 88 upon which may be formed the protuberances 54. The raised lower arc length form 88 is received in the arc length aperture 59. The arc length aperture 59 may preferably comprise opposed arc length termini as at 89, and the raised lower arc length form 88 may preferably comprise opposed arc length termini as at 90.

Together, the opposed arc length termini 89 and 90 provide rotational stop structure for limiting rotation of the secondary lid attachment 25 relative to the primary lid form 13 of the beverage container lid assembly 400. The raised lower arc length form 88 may further preferably comprise a centralized hollow 91 intermediate the protuberances 54, which centralized hollow 91 enables the user to insert form-engaging structure such as one's finger for enhancing the user's ability to manually rotate the secondary lid attachment 25 relative to the foundational, primary lid form 13.

The secondary lid attachment 25 of assembly 400 is preferably ring-shaped and may be alternatively constructed from thermoformed polymeric material or stamped from polymeric or paper-based material construction. The primary lid form 13 comprises an annular, ring-receiving channel as at 92. The secondary lid attachment may thus be received in the ring-receiving channel 92 in inferior adjacency to the primary lid form 13. Circumferentially spaced or peripherally extending ring-retention ledges, ridges, or protrusions as at 97 preferably extend radially inwardly and function to retain the ring-shaped secondary lid attachment 25 in the ring-receiving channel 92.

The beverage flow diversion structure 31 preferably provides a radially peripheral beverage-receiving flow channel as at 93 for effecting heat transfer 82 from beverage 60 received therein via the at least one letting aperture 37 prior to outletting via the primary beverage outlet 19. The radially peripheral beverage-receiving flow channel 93 is preferably sloped downwardly radially outwardly as at 94 for maximizing flow volume peripherally as at arrow 95 and enhancing heat transfer 82 from beverage 60 prior to outletting via the primary beverage outlet 19.

The secondary lid attachment 25 may preferably be constructed so as to be radially double-walled as at 96 with a resilient or spring-like junction as at 98. The radially double-walled secondary lid attachment 25 thus functions to provide resilient attachment-to-form frictional engagement within the ring-receiving channel 92. The resilient attachment-to-form frictional engagement between the secondary lid attachment 25 and the primary lid form 13 enhances the user's ability to selectively control beverage flow or movements through the lid assembly 400 by providing a snugger fit therebetween for minimizing leakage and the like.

The primary lid form 13 of the beverage container lid assembly 400 further preferably comprises at least one downwardly extending protuberance as at 99 and the secondary lid attachment 25 of the beverage container lid assembly 400 preferably comprises at least one arc length groove structure as at 101. The downwardly extending protuberance(s) 99 are received in the arc length groove(s) 101 and guidable thereby as perhaps most clearly depicted in FIG. 35A for enhancing the user's ability to controllably open and close the beverage container lid assembly 400.

The secondary lid attachment 26 of the beverage container lid assembly 500 is also preferably ring-shaped and may be alternatively constructed from thermoformed polymeric material or stamped from polymeric or paper-based material construction. The primary lid form 14 of the beverage container lid assembly 500 preferably comprises an annular, ring-receiving channel as at 102. In the case of the beverage container lid assembly 500, the ring-shaped secondary lid attachment 26 is received in the ring-receiving channel 102 in superior adjacency to the primary lid form 14 thereby forming an upper, peripheral, beverage-receiving flow channel as at 103 for effecting heat transfer 82 from beverage 60 received therein.

The primary lid form 14 of the beverage container lid assembly 500 preferably comprises an upwardly extending protuberance or beverage flow stop or plug structure as at 104 in circumferentially spaced relation to the primary beverage outlet 20. The letting aperture 38 of the secondary lid attachment 26 preferably defines a single beverage outlet or letting aperture. The user is enabled to selectively open and close the beverage container lid assembly 500 by reorienting the single beverage letting aperture as at 38 relative to the primary beverage outlet 20.

When the primary beverage outlet 20 and the single beverage outlet or letting aperture 38 are aligned, the beverage container lid assembly 500 is in a fully open configuration or state, and when the flow stop or plug structure 104 is aligned with the single beverage outlet or letting aperture 38, the lid assembly 500 is in a fully closed configuration or state. When the single beverage outlet or letting aperture 38 is oriented in superior adjacency to that portion 105 of the primary lid form 14 intermediate the primary beverage outlet 20 and the flow stop structure 104, beverage progressing through the primary beverage outlet 20 is diverted or deflected by the beverage flow diversion structure 32 and thus serves to effect heat transfer 82 from the beverage 60 prior to consumption via the single beverage outlet or letting aperture 38.

The secondary lid attachment 26 of the beverage container lid assembly 500 is also preferably radially double-walled as at 106 with a resilient or spring-like junction as at 107. The radially double-walled secondary lid attachment 26 also provides resilient attachment-to-form frictional engagement within the ring-receiving channel 102. The resilient attachment-to-form frictional engagement between the secondary lid attachment 26 and the primary lid form 14 enhances the user's ability to selectively control beverage flow or movements through the beverage container lid assembly 500 by providing a snugger fit therebetween for minimizing leakage and the like.

The ring-receiving channel 102 of the primary lid form 14 preferably further comprises circumferentially-spaced upwardly- (and radially-) extending ring-stop structures as at 109. The secondary lid attachment 26 further preferably comprises circumferentially-spaced downwardly- (and radially-) extending ring-stop structures as at 110. The upwardly and downwardly extending ring-stop structures 109 and 110 limit the user's ability to rotate the secondary lid attachment 26 relative to the primary lid form 14 for enhancing the user's ability to controllably open and close the beverage container lid assembly 500.

The primary lid form 15 of the beverage container lid assembly 600 preferably comprises a circular upper beverage outlet depression as at 111 and a radially central attachment-locating hub as at 112. The secondary lid attachment 27 of the beverage container lid assembly 600 is received in the circular upper beverage outlet depression 111 intermediate the radially central attachment-locating hub 112 and an inner lid wall 113 extending upwardly from the circular upper beverage outlet depression 111. The secondary lid attachment 27 is pivotal about the axis of rotation 45 at the attachment-locating hub 112.

The secondary lid attachment 27 of the beverage container lid assembly 600 is preferably and roughly crescent-shaped having opposed crescent ends as at 114. As prefaced above, the manually operable means for enabling the user to manually locate the beverage flow diversion structure (exemplified by structure 33) relative to the primary beverage outlet(s) 21 are exemplified by protuberances 56, which protuberances 56 are preferably located at the crescent ends 114. Protuberances 56 preferably extend upwardly and radially within the circular upper beverage outlet depression 111.

The circular upper beverage outlet depression 111 may further preferably comprise a radially defined-segment-shaped depression as at 115, which depression 115 may be preferably outfitted with a lid insert or tertiary lid attachment structure as at 116. The radially defined-segment shaped depression 115 may further comprise a chord-defined-segment shaped depression as at 117. The tertiary lid attachment structure or lid insert 116 covers the chord-defined-segment shaped depression 117 and comprises a letting aperture or cutout as at 118.

The secondary lid attachment 27 pivots about the lid insert 116 in superior adjacency thereto and enables the user to selectively open and close the lid assembly 600 by orienting the letting aperture or outlet 39 in alignment with the letting aperture or cutout 118. It will thus be understood that the lid insert or tertiary lid attachment structure 116 provides beverage-diverting or beverage-damming functionality and dams beverage within the depression 117 prior to letting beverage 60 via the aperture or cutout 118. Secondary lid attachment 27 either lets beverage flow as generally depicted in the arrangement depicted in FIG. 58 or stops beverage flow as generally depicted in the arrangement depicted in FIG. 57. The lid assembly embodiment referenced at lid assembly 600 may preferably comprise a lid insert or tertiary lid attachment structure as at 116, and essentially comprises a secondary lid attachment as at 27. Both of the structures 27 and 116 are cooperable with the primary lid form 15 and are received in depression formations as at 111 and 115, respectively.

Alternative beverage container lid assembly embodiments 601 and 602 as generally and comparatively depicted in FIGS. 58A and 58B respectively comprise primary lid forms as at 204 and 205, and secondary lid attachments as at 206 and 207. The secondary lid attachments are further comparatively depicted in FIGS. 58C and 58D in side by side relation. The reader may well consider that both of the secondary lid attachments 206 and 207 may preferably comprise a medial plane as at 218. A tail element 212 and a manual engagement protuberance 210 on both the secondary lid attachments 206 and 207 may preferably be located at an offset angle 219 from the medial plane(s) 218. By contrast, FIG. 58A depicts alternative tail element 212 and protuberance 210 arrangement in general alignment with the medial plane.

When ring-shaped secondary lid attachment 206 is received in the depression 208 of the primary lid form 204, the attachment-locating hub as at 112 is received in a hub-receiving aperture 209. The ring-shaped secondary lid attachment 206 is pivotable about the axis of rotation 45 and manually operable via a protrusion or protuberance 210.

The ring-shaped secondary lid attachment 206 comprises a letting aperture as at 211 and a rotation-limiting tail element as at 212. Primary lid form 204 comprises a tail-receiving depression as at 213 with opposed arc length termini as at 214. The arc length of tail element 212 is lesser than the arc length of the tail-receiving depression 213 and thus the ring-shaped element may pivot about axis 45, but is limited in doing so via engagement of the termini 215 of the tail element 212 and the opposed arc length termini 214. The letting aperture 211 is thus selectively orientable in superior adjacency to the primary beverage outlet 216 formed in the primary lid form 204 for selectively letting beverage therethrough.

When fish-shaped or disc-shaped secondary lid attachment 207 is received in the depression 208 of the primary lid form 205, the disc-shaped secondary lid attachment 207 is also pivotable about the axis of rotation 45 and also manually operable via protrusion or protuberance 210. The disc-shaped secondary lid attachment 207 also preferably comprises a letting aperture as at 211 and a rotation-limiting tail element as at 212. Primary lid form 205 also comprises tail-receiving depression as at 213 with opposed arc length termini as at 214.

The arc length of tail element 212 is lesser than the arc length of the tail-receiving depression 213 and thus the disc-shaped element may pivot about axis 45, but is limited in doing so via engagement of the termini 215 of the tail element 212 and the opposed arc length termini 214. The letting aperture 211 is thus selectively orientable in superior adjacency to the primary beverage outlet 216 formed in the primary lid form 205 for selectively letting beverage therethrough. Alternative lid assemblies 601 and 602 basically differ in that assembly 602 eliminates the attachment hub 112 and hub-receiving aperture 209 features otherwise present in assembly 601.

A number of beverage container assemblies 1000, 1001, 1002, and 1003 according to the present invention is generally depicted and referenced in FIGS. 59-80A. All of the beverage container assemblies 1000, 1001, 1002, and 1003 according to the present invention incorporate an inventive container insert 192 usable in combination with a (state of the art) beverage container as at 46. In other words, the container insert 192 is designed for use in combination with a beverage container 46 for controlling beverage movement(s) within the space or compartment 152 defined by inner container surfacing 193 and/or the container wall 194 of the beverage container 46.

The beverage container insert 192 according to the present invention preferably comprises a rim-engaging or wall-engaging first portion as at 195 and a beverage-damping or beverage-diverting second portion as at 196. The beverage-damping second portion 196 preferably extends (radially) inwardly relative to the wall-engaging first portion 195 and functions to deflect or redirect (as at arrows 183) upwardly directed beverage 60 as diagrammatically depicted in FIGS. 73 and 78. The beverage-damping second portion 196 thus helps the user control beverage movement such as preventing beverage splashing or beverage oscillations within the space or compartment 152.

The beverage-damping second portion 196 may be serrated or divided into serrations, sections, or peaks as at 198 with troughs or gaps 197 extending therebetween. The serrations or peaks 198 and trough 197 structural arrangement(s) of the serrated beverage-damping second portion 196 enable beverage 60 to flow through (as at vector head 220 in FIGS. 62, 79 80, and 80A) the beverage-letting troughs or gaps 197 formed in the serrated beverage-damping second portion 196.

The beverage-damping second portion 196 may be resiliently actuable relative to the first portion 195 such that when a second container (as at 199) is inserted into an outfitted first container (as at 201) for stacking the first and second containers 199 and 200 as generally depicted in FIGS. 66-68, the beverage-damping second portion 196 is actuated downwardly into an actuated configuration (as generally further depicted in FIGS. 70 and 71), and resiliently returns to a relaxed, beverage-damping or deflecting or diverting position or configuration (as generally depicted in FIGS. 59, 61, 62, 63, 65, 74, 75, and 77-80A) when the second container 199 is removed from the first container 201. FIG. 73 generally depicts the beverage-damping second portion 196 resiliently returning (as at arrow 226) to the relaxed configuration from the actuated configuration The beverage container insert 192 according to the present invention may further preferably be used in combination with a beverage container 46 having a radially inwardly sloped inner container wall 194 such that the wall-engaging first portion 195 also has a sloped contour to mimic the sloped inner container wall 194 and provide wedged engagement therewith when outfitted at the sloped inner container wall 194 as generally depicted in FIG. 73. Comparatively inspecting the upper container rim 47 versus the container bottom 217, the reader will note that the container wall 194 is sloped and angled radially inwardly from rim 47 to bottom 217.

In addition to adding beverage-damping or deflecting functionality, the container insert 192, preferably of polymeric material construction provides added rigidity at the upper end of the insert-outfitted beverage container (typically of paper-based material construction) of the beverage container assemblies 1000, 1001, 1002, and 1003 according to the present invention.

In assembly 1000, the reader will note that the container-engaging or wall engaging-first portion 195 preferably comprises a beveled upper portion 221, which portion 221 may preferably overlap the upper container rim 47 as at 222 in FIGS. 65, 70, and 73. The container insert 192 of assembly 1000 is thus designed for insertion by the customer, merchant or other end user at the time of serving hot beverage although such an insert 192 could also be pre-installed by the manufacturer. Assembly 1003 is similar to assembly 1000 at least insofar as the insert 192 is preferably separately insertable or installable into the beverage container 46.

Assemblies 1001 and 1002 depart from assemblies 1000 and 1003 by providing a container-engaging first portion 195 that does not traverse the upper container rim 47, but rather is attached, for example, adhesively, the inner container surfacing as at 193. In both assemblies 1001 and 1002, the upper edge 223 of the container-engaging first portion 195 is preferably positioned in inferior adjacency to the upper rim 47. In the case of assembly 1002, the upper edge 223 of the container-engaging first portion 195 is preferably positioned in inferior adjacency to a lower portion 224 of a bead 225 of the upper rim 47. Assemblies 1001 and 1002 are thus preferably assembled by the manufacturer in view of the portion-to-wall attachment(s).

While the above descriptions contain much specificity, this specificity should not be construed as limitations on the scope of the invention, but rather as an exemplification of the invention. In certain embodiments, the basic invention may be said to essentially teach or disclose a beverage or liquid container lid assembly for enabling a user to selectively control beverage or liquid movement(s) therethrough.

The beverage or liquid container lid assembly according to the present invention may be said to essentially comprise a primary lid form; a secondary lid attachment rotatable relative to the primary lid form; container attachment means for non-rotatably attaching either the primary lid form or the secondary lid attachment to a beverage or liquid container; and manually operable means for enabling the user to manually rotate the secondary lid attachment relative to the primary lid form.

The primary lid form essentially comprises a primary beverage outlet and the secondary lid attachment essentially comprises at least one beverage flow diversion structure. The secondary lid attachment is cooperably engaged with the primary lid form and provides at least one beverage flow or liquid diversion structure having at least one letting aperture. The secondary lid attachment is rotatable relative to the primary lid form about a lid axis of rotation.

The container attachment means are preferably exemplified by a rim-engaging groove and function to non-rotatably attach a select structure to a beverage or liquid container depending on the particular embodiment in question. Thus, the select structure may be preferably selected from the group consisting of the primary lid form and the secondary lid attachment. Manually operable means operable via outer lid surfacing enable the user to manually locate via rotation of the secondary lid attachment relative to the primary lid form the beverage or liquid diversion structure relative to the primary beverage or liquid outlet. The foregoing definitions are believed to cover all embodiments referenced at 100, 200, 300, 400, 500, 600, 601, and 602.

When the container attachment means non-rotatably attach the secondary lid attachment to the beverage or liquid container as in lid assembly 200, the manually operable means are preferably defined by outer lid surfacing of the primary lid form. When the container attachment means non-rotatably attaching the primary lid form to the beverage or liquid container as in lid assemblies 100, 300, 400, 500, 600, 601, and 602, the manually operable means are preferably defined by outer surfacing of the secondary lid attachment exemplified by at least one protuberance.

In the case of lid assemblies, 100 and 200, the primary lid forms and the secondary lid attachments each comprise a radially centralized, downwardly-bowed portion, and the secondary lid attachment is structurally engaged in inferior adjacency with the primary lid form. The radially centralized, downwardly-bowed portions of the primary lid form and the secondary lid attachment provide an upper lid boundary and a lower lid boundary such that the upper and lower lid boundaries define a beverage-receiving flow channel for effecting heat transfer from beverage received therein prior to outletting via the primary beverage outlet.

In the case of lid assemblies 100, 200, and 300, the primary lid forms all comprise a raised upper arc length form and the secondary lid attachments all comprise a raised lower arc length form. The raised upper and lower arc length forms are nestable and comprise opposed (upper and lower) arc length termini. The opposed arc length termini together cooperably provide rotational stop structure for limiting rotation of the secondary lid attachments relative to the primary lid forms.

In the case of lid assemblies 100 and 200, the lower arc length forms both comprise a radially directed flow return slope structure for directing beverage flow toward the beverage-receiving flow channel. In the case of lid assembly 300, the raised lower arc length form comprises circumferentially spaced rail portions intermediate the opposed arc length termini. The opposed arc length termini of the raised upper arc length form comprise rail-receiving notches, and the circumferentially spaced rail portions are received in the rail-receiving notches and guided thereby for enhancing the user's ability to selectively open and close the beverage container lid assembly.

In the case of the beverage container lid assembly 400, the secondary lid attachment is ring-shaped and the primary lid form comprises an annular, ring-receiving channel. The ring-shaped secondary lid attachment is received in the ring-receiving channel in inferior adjacency to the primary lid form. The beverage flow or liquid diversion structure provides a radially peripheral beverage-receiving flow channel for effecting heat transfer from beverage received therein prior to outletting via the primary beverage outlet.

The radially peripheral beverage-receiving flow channel is preferably sloped downwardly and radially outwardly for maximizing flow volume peripherally and thus enhances heat transfer from beverage prior to outletting via the primary beverage outlet. The secondary lid attachment of lid assembly 400 is preferably radially double-walled. The radially double-walled secondary lid attachment provides resilient attachment-to-form engagement within the ring-receiving channel for enhancing beverage flow or liquid diversion control of the lid assembly 400.

In the case of lid assembly 500, the secondary lid attachment is also ring-shaped and the primary lid form also comprises an annular, ring-receiving channel. In structural distinction to lid assembly 400, however, the secondary lid attachment of lid assembly 500 is received in the ring-receiving channel in superior adjacency to the primary lid form thereby forming an upper, peripheral, beverage-receiving flow channel for effecting heat transfer from beverage received therein. Similar to the lid assembly 400, the lid assembly 500 preferably comprises a secondary lid attachment that is radially double-walled for providing resilient attachment-to-form engagement within the ring-receiving channel.

The lid assemblies 600, 601, and 602 are to be considered among the preferred embodiments of the present specifications and are believed to all be essentially characterized by an insert-receiving depression formed in the primary lid form into which depression the respective secondary lid attachments are pivotally received. Assemblies 600 and 601 are characterized by a ring-shaped secondary lid attachments and an attachment-locating hub also formed as part of the primary lid form within the depression. Assembly 602 eliminates the attachment-locating hub and thus the secondary lid attachment of assembly 602 is disc-shaped.

Assemblies 600 and 601, being the central focus of the present specifications, both provide a beverage or liquid container lid assembly for enabling a user to selectively control beverage movement therethrough. The beverage or liquid container lid assemblies may be said to essentially comprise primary lid forms as at 15/204 and secondary lid attachments as at 27/206.

The primary lid forms 15/204 preferably comprise a circular, upper beverage outlet depression as at 111/208, an attachment-locating hub as at 112 radially central to the circular, upper beverage outlet depression 111/208, a primary beverage outlet as at 21 formed in the circular, upper beverage outlet depression 111/208, and a rim-receiving groove as at 48 for non-rotatably attaching the primary lid form 15/204 to a beverage container as at 46.

The secondary lid attachments 27/206 are preferably cooperably engaged with the primary lid forms 15/204 by being received in superior adjacency to at least a portion of the circular, upper beverage or liquid outlet depression 111/208 in radially outer adjacency to the attachment-locating hub 112. The secondary lid attachments 27/206 providing at least one beverage or liquid flow diversion structure and a letting aperture as at 39/211.

The secondary lid attachments 27/206 are rotatable relative to the primary lid forms 15/204 about a lid axis of rotation as at 45 extending through the attachment-locating hub 112 for enabling the user to selectively control beverage or liquid movement from the beverage or liquid container 46 via the at least one beverage or liquid flow diversion structure, the primary beverage or liquid outlet 21 and the letting apertures 39/211.

The circular, upper beverage or liquid outlet depression 111/208 is preferably annular about the attachment-locating hub, and the attachment-locating hub 112 is preferably raised relative to upper most portions of the annular, circular, upper beverage or liquid outlet depression 111/208 as generally depicted in FIG. 54. The circular, upper beverage or liquid outlet depression 111/208 is preferably off-centered relative to the rim-receiving groove 48 as generally depicted in FIGS. 54-56.

The circular, upper beverage or liquid outlet depression 111 preferably comprises a first depression formation as at 115, which first depression formation 115 extends downwardly relative to the secondary lid attachment 27 for forming a beverage or liquid-receiving compartment in inferior adjacency to the secondary lid attachment 27. The primary beverage outlet 21 lets beverage or liquid into the beverage or liquid-receiving compartment.

A lid insert as at 116 may be preferably positioned intermediate the primary lid form 15 and the secondary lid attachment 27 for covering at least a portion of the first depression formation 115 for providing additional beverage or liquid flow diversion structure. The lid insert 116 preferably comprises a radially outer arc length as at 120 and a letting cutout as t 118 formed at the outer arc length 120 for letting beverage or liquid.

The first depression formation 115 extends downwardly intermediate first and second depression end portions as at 121, which first and second depression end portions 121 extend radially from the attachment-locating hub 112. The lid insert 116 further preferably comprises a radially inner arc length as at 122, and opposed linear terminal portions as at 123. The radially inner arc length 122 accommodates an outer periphery of the attachment-locating hub, and the opposed linear terminal portions 123 are received adjacent the first and second depression end portions 121.

The circular, upper beverage outlet depression 111 may further preferably comprise a second depression formation as at 117, which second depression formation 117 extends downwardly from the first depression formation 115 and is radially inwardly defined by a chord-like portion as at 124. The second depression formation 117 is thus segment-shaped and the primary beverage outlet 21 is preferably formed in the second depression formation 117 for letting beverage or liquid thereinto.

The secondary lid attachment 206 is preferably ring-shaped and comprises a hub-receiving aperture as at 209, which hub-receiving aperture 209 receives the attachment-locating hub 112 when the secondary lid attachment 206 is cooperably engaged with the primary lid form 204. The secondary lid attachment 206 may further preferably comprise a letting aperture as at 211 and a tail element as at 212. The primary lid form 204 may preferably comprise a tail-receiving depression as at 213 coextensive with the circular, upper beverage outlet depression 208.

The tail element 212 comprises tail element termini as at 215 and the tail-receiving depression 213 comprises opposed arc length termini as at 214. The tail element 212 is received in the tail-receiving depression 213, and the secondary lid attachment 206 is limited in pivotal movement via engagement of the tail element termini 215 and the opposed arc length termini 214. The letting aperture 211 is thus being selectively orientable relative to the primary lid form 204 for selectively letting beverage or liquid therethrough. The secondary lid attachment 206 may further comprise a medial plane as at 218 such that a center portion of the tail element 212 is preferably located at an offset angle 219 from the medial plane 218.

The beverage container insert assembly generally depicted and referenced at 1000 provides a beverage container insert for use in combination with a beverage container and for controlling beverage movements within the beverage container. The beverage container insert according to the present invention preferably and essentially comprises a container-engaging first portion (as at 195) and a beverage-damping second portion (as at 196). The beverage-damping second portion is extendable inwardly relative to the wall-engaging first portion and basically functions to deflect upwardly directed beverage for controlling beverage movement within an insert-outfitted beverage container.

Certain preferable options for the beverage container insert include a serrated or sectioned beverage-damping second portion for enabling beverage or liquid to flow through beverage-letting or liquid-letting troughs formed in the serrated beverage-damping second portion. The beverage-damping second portion may be resiliently actuable relative to the container-engaging first portion, and thus the beverage-damping second portion may be (a) resiliently actuable for enabling a stacked insert-outfitted beverage container arrangement as generally depicted in FIGS. 66-68 and (b) resiliently relaxable for deflecting upwardly directed beverage as generally depicted in FIG. 73.

Although the inventive beverage or liquid container lid assemblies and beverage or liquid container inserts according to the present invention have been described by reference to a number of different embodiments, it is not intended that the novel combinations or assemblies be limited thereby, but that modifications thereof are intended to be included as falling within the broad scope and spirit of the foregoing disclosure, the appended drawings, and perhaps most importantly, the following claims.

I claim:

1. A beverage container lid assembly for enabling a user to selectively control beverage movement therethrough, the beverage container lid assembly comprising:
   a primary lid form, the primary lid form comprising a circular, upper beverage outlet depression, an attachment-locating hub radially central to the circular, upper beverage outlet depression, a primary beverage outlet formed in the circular, upper beverage outlet depression, and a rim-receiving groove for non-rotatably attaching the primary lid form to a beverage container, the circular, upper beverage outlet depression being off-centered relative to the rim-receiving groove; and
   a secondary lid attachment, the secondary lid attachment being cooperably engaged with the primary lid form by being received in superior adjacency to at least a portion of the circular, upper beverage outlet depression in radially outer adjacency to the attachment-locating hub, the secondary lid attachment providing at least one beverage flow diversion structure and a letting aperture, the secondary lid attachment being rotatable relative to the primary lid form about a lid axis of rotation extending through the attachment-locating hub for enabling the user to selectively control beverage movement from the beverage container via the at least one beverage flow diversion structure, the primary beverage outlet and the letting aperture.

2. The beverage container lid assembly of claim 1 wherein the circular, upper beverage outlet depression is annular about the attachment-locating hub, the attachment-locating hub being raised relative to upper most portions of the annular, circular, upper beverage outlet depression.

3. The beverage container lid assembly of claim 1 wherein the circular, upper beverage outlet depression comprises a first depression formation, the first depression formation extending downwardly relative to the secondary lid attachment for forming a beverage-receiving compartment in inferior adjacency to the secondary lid attachment, the primary beverage outlet for letting beverage into the beverage-receiving compartment.

4. The beverage container lid assembly of claim 3 comprising a lid insert positioned intermediate the primary lid form and the secondary lid attachment, the lid insert for covering at least a portion of the first depression formation for providing additional beverage flow diversion structure.

5. The beverage container lid assembly of claim 4 wherein the lid insert comprises a radially outer arc length and a letting cutout formed at the outer arc length for letting beverage.

6. The beverage container lid assembly of claim 5 wherein the first depression formation extends downwardly intermediate first and second depression end portions, the first and second depression end portions extending radially from the attachment-locating hub, the lid insert comprising a radially inner arc length, and opposed linear terminal portions, the radially inner arc length for accommodating an outer periphery of the attachment-locating hub, the opposed linear terminal portions being received adjacent the first and second depression end portions.

7. The beverage container lid assembly of claim 6 wherein the circular, upper beverage outlet depression comprises a second depression formation, the second depression formation extending downwardly from the first depression formation and being radially inwardly defined by a chord-like portion, the second depression formation thus being segment-shaped, the primary beverage outlet being formed in the second depression formation for letting beverage thereinto.

8. The beverage container lid assembly of claim 1 wherein the secondary lid attachment is ring-shaped and comprises a hub-receiving aperture, the hub-receiving aperture receiving the attachment-locating hub when the secondary lid attachment is cooperably engaged with the primary lid form.

9. The beverage container lid assembly of claim 8 wherein the secondary lid attachment comprises a tail element, the primary lid form comprising a tail-receiving depression coextensive with the circular, upper beverage outlet depression, the tail element comprising tail element termini and the tail-receiving depression comprising opposed arc length termini, the tail element being received in the tail-receiving depression, the secondary lid attachment being limited in pivotal movement via engagement of the tail element termini and the opposed arc length termini, the letting aperture thus being selectively orientable relative to the primary lid form for selectively letting beverage therethrough.

10. The beverage container lid assembly of claim 9 wherein the secondary lid attachment comprises a medial plane, a center portion of the tail element being located at an offset angle from the medial plane.

11. A liquid container lid assembly for enabling a user to selectively control liquid movement therethrough, the liquid container lid assembly comprising:
a primary lid form, the primary lid form comprising a circular, upper liquid outlet depression, an attachment-locating hub radially central to the circular, upper liquid outlet depression, a primary liquid outlet formed in the circular, upper liquid outlet depression, and a rim-receiving groove for non-rotatably attaching the primary lid form to a liquid container;
a secondary lid attachment, the secondary lid attachment being cooperably engaged with the primary lid form by being received in superior adjacency to at least a portion of the circular, upper liquid outlet depression in radially outer adjacency to the attachment-locating hub, the secondary lid attachment providing at least one liquid flow diversion structure and a letting aperture, the secondary lid attachment being rotatable relative to the primary lid form about a lid axis of rotation extending through the attachment-locating hub for enabling the user to selectively control liquid movement from the liquid container via the at least one liquid flow diversion structure, the primary liquid outlet and the letting aperture; and
a lid insert positioned intermediate the primary lid form and the secondary lid attachment, the circular, upper liquid outlet depression comprising a first depression formation, the first depression formation extending downwardly relative to the secondary lid attachment for forming a liquid-receiving compartment in inferior adjacency to the secondary lid attachment, the primary liquid outlet for letting liquid into the liquid-receiving compartment, the lid insert for covering at least a portion of the first depression formation for providing additional liquid flow diversion structure.

12. The liquid container lid assembly of claim 11 wherein the circular, upper liquid outlet depression is annular about the attachment-locating hub, the attachment-locating hub being raised relative to upper most portions of the annular, circular, upper liquid outlet depression.

13. The liquid container lid assembly of claim 11 wherein the first depression formation extends downwardly intermediate first and second depression end portions, the first and second depression end portions extending radially from the attachment-locating hub, the lid insert comprising a radially inner arc length, and opposed linear terminal portions, the radially inner arc length for accommodating an outer periphery of the attachment-locating hub, the opposed linear terminal portions being received adjacent the first and second depression end portions.

14. The liquid container lid assembly of claim 13 wherein the circular, upper liquid outlet depression comprises a second depression formation, the second depression formation extending downwardly from the first depression formation and being radially inwardly defined by a chord-like portion, the second depression formation thus being segment-shaped, the primary liquid outlet being formed in the second depression formation for letting liquid thereinto.

15. The liquid container lid assembly of claim 11 wherein the secondary lid attachment is ring-shaped and comprises a hub-receiving aperture, the hub-receiving aperture receiving the attachment-locating hub when the secondary lid attachment is cooperably engaged with the primary lid form.

16. The liquid container lid assembly of claim 15 wherein the secondary lid attachment comprises a tail element, the primary lid form comprising a tail-receiving depression coextensive with the circular, upper liquid outlet depression, the tail element comprising tail element termini and the tail-receiving depression comprising opposed arc length termini, the tail element being received in the tail-receiving depression, the secondary lid attachment being limited in pivotal movement via engagement of the tail element termini and the opposed arc length termini, the letting aperture thus being selectively orientable relative to the primary lid form for selectively letting liquid therethrough.

17. The liquid container lid assembly of claim 16 wherein the secondary lid attachment comprises a medial plane, a center portion of the tail element being located at an offset angle from the medial plane.

* * * * *